US012608082B2

(12) United States Patent
Drucker

(10) Patent No.: US 12,608,082 B2
(45) Date of Patent: Apr. 21, 2026

(54) WEARABLE HAND INTERFACE DEVICE AND METHODS

(71) Applicant: Sam Drucker, Plantation, FL (US)

(72) Inventor: Sam Drucker, Plantation, FL (US)

( * ) Notice: Subject to any disclaimer, the term of this patent is extended or adjusted under 35 U.S.C. 154(b) by 0 days.

(21) Appl. No.: 18/123,966

(22) Filed: Mar. 20, 2023

(65) Prior Publication Data

US 2024/0184360 A1     Jun. 6, 2024

Related U.S. Application Data

(63) Continuation-in-part of application No. 17/860,067, filed on Jul. 7, 2022.

(60) Provisional application No. 63/321,739, filed on Mar. 20, 2022, provisional application No. 63/219,016, filed on Jul. 7, 2021.

(51) Int. Cl.
G06F 3/01          (2006.01)

(52) U.S. Cl.
CPC .................................... G06F 3/014 (2013.01)

(58) Field of Classification Search
CPC ....................................................... G06F 3/014
See application file for complete search history.

(56) References Cited

U.S. PATENT DOCUMENTS

| | | | | |
|---|---|---|---|---|
| 4,414,537 A | * | 11/1983 | Grimes | G09B 21/009 |
| | | | | 400/479.2 |
| 5,281,966 A | * | 1/1994 | Walsh | G06F 3/0235 |
| | | | | 400/100 |
| 5,493,654 A | * | 2/1996 | Gopher | G06F 3/0235 |
| | | | | 708/142 |
| 5,993,089 A | * | 11/1999 | Burrell, IV | G09B 21/002 |
| | | | | 708/145 |
| 7,161,579 B2 | * | 1/2007 | Daniel | G06F 3/016 |
| | | | | 345/157 |
| 9,715,286 B2 | * | 7/2017 | Charlton | G06F 3/0354 |
| 10,838,499 B2 | * | 11/2020 | Wang | G06F 3/014 |
| 10,845,876 B2 | * | 11/2020 | Buchanan | G06F 3/011 |
| 11,006,861 B2 | * | 5/2021 | Di Pardo | A61B 5/225 |
| 11,237,642 B2 | * | 2/2022 | Stouffer | H01H 3/00 |
| 11,537,219 B2 | * | 12/2022 | Borodin | G06F 3/0383 |
| 2003/0117371 A1 | * | 6/2003 | Roberts | G06F 3/03543 |
| | | | | 345/156 |
| 2005/0151673 A1 | * | 7/2005 | Mercier | G06F 1/163 |
| | | | | 341/20 |
| 2005/0264522 A1 | * | 12/2005 | Abe | G06F 3/014 |
| | | | | 345/156 |

(Continued)

*Primary Examiner* — Bryan Earles

(57)          ABSTRACT

Methods were formulated and applied to create and use a wearable hand interface device that is physically and digitally sculpted to accommodate the geometry of the human palm in a resting position while requiring minimal movement on behalf of the user. Comfortable harnessing material spans over the top of the hand. Structures which may be rigid or adjustable place input contact surfaces directly underneath and slightly above each fingertip of a user so that only a slight twitch of the fingers is needed to operate the device The precisely sculpted palm receiving surface and placement of contact surfaces in the natural curl path of the fingers ensures the hand does not move around during use. Refreshable braille cells may be mounted at the user's fingertips if desired. The nature of this device allows its user to activate sensor switches in a wide range of hand positions.

1 Claim, 70 Drawing Sheets

(56) References Cited

U.S. PATENT DOCUMENTS

| 2013/0207890 A1* | 8/2013 | Young | G06F 3/014 |
| | | | 345/156 |
| 2018/0307313 A1* | 10/2018 | Belomoev | G09B 21/04 |
| 2020/0012344 A1* | 1/2020 | McMillen | G06F 3/016 |
| 2023/0020111 A1* | 1/2023 | Zhu | G06F 3/014 |

* cited by examiner

47

43

45

57    42    41    44    43

39

11

1

| l | h | w |
|---|---|---|
| | | .62 |
| | | .65 |
| | | .70 |
| .55 | .67 | .70 |
| .8 | .67 | .71 |
| .21 | .72 | .74 |
| | | .76 |
| .78 | .81 | | t@.00-.56 w@.00=.62
t@      .63 w@   =.65
t@.55=.67 w@.55=.70
t@.8 -.67 w@.8=.71
t@.21=.72 w@.21=.74
t@.45=.77

| .00 | .79 | .96 |
|-----|-----|-----|
| l | h | w |
| .2 | .88 | .94 |
|    |     | .94 |
| .6 | .91 | .96 |
| .89 | .89 | .99 |

@.00, t=.79
@.2, t=.88
@.4, t=.91
@.6, t=.91
@.89, t=.89

WEARABLE HAND INTERFACE DEVICE AND METHODS

BACKGROUND

The present invention addresses the following problems:
1) Activation of sensor switches via force and contact applied by the hand relative to an object or assembly of objects and receiving data via the fingertips and thumb while simultaneously:
   holding the same assembly of objects
   and
   re-positioning a hand on that very same assembly of objects' surface(s), is intense physiological multi-tasking for the hand, thus making this process require more effort on behalf of a user relative to the amount of effort required to push said buttons and/or receive said data without having to hold said object.
2) Worn objects need to be of the right size and geometric form relative to a user's hand.
3) The elements of the hand do not scale uniformly. For ex
4) Worn objects must be designed for harnessing to and movement of a user's hand
5) "Captive" posturing, where a user is forced to maintain a restricted physiological [hand and/or arm, torso, leg, neck, eye posture] during often—lengthy data interface tasks
"#" is to be used in the following background definitions,
"#"-D is equivalent to "#"-Dimensional, where #is the number of orthogonal dimensions
Drawings will be referenced in the following specification of "the present invention" as either "FIGURE "#" or "#", where drawing feature or component "#" is labeled by a leader connected to an encircled number "#".

The Present Invention

Figure 1:
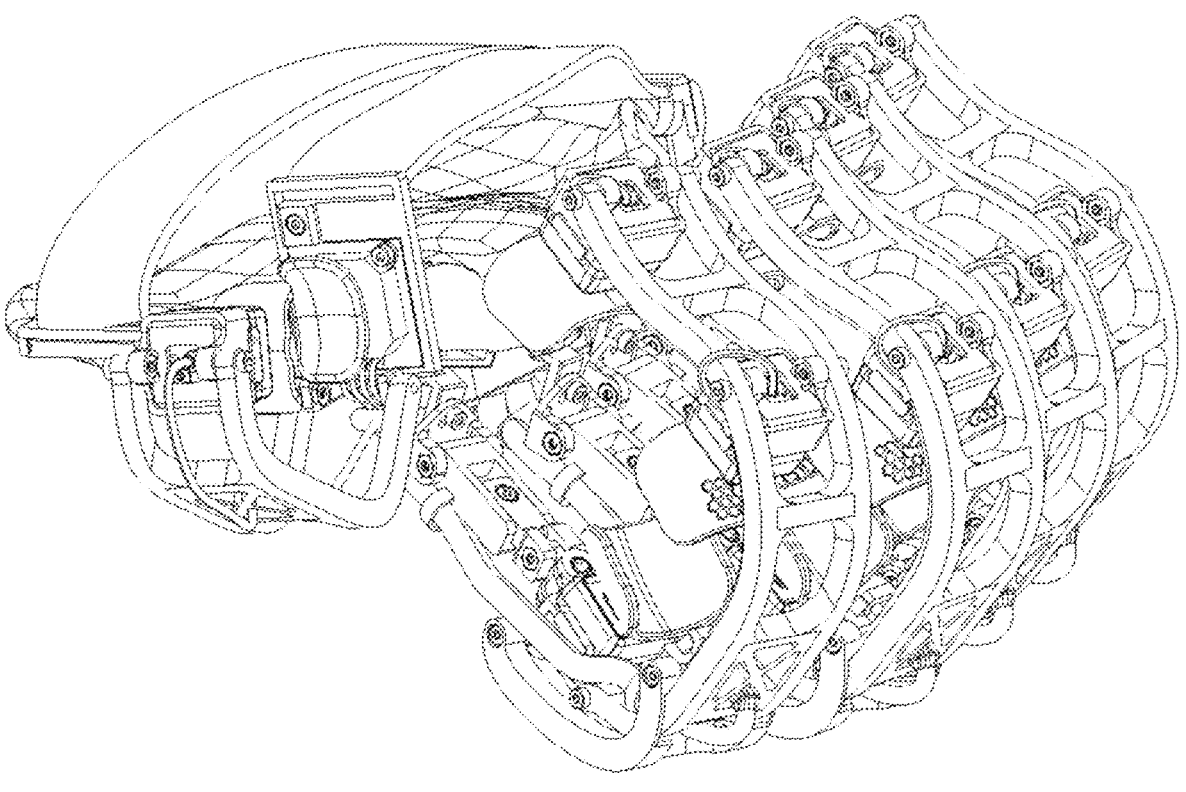
Figure 5:
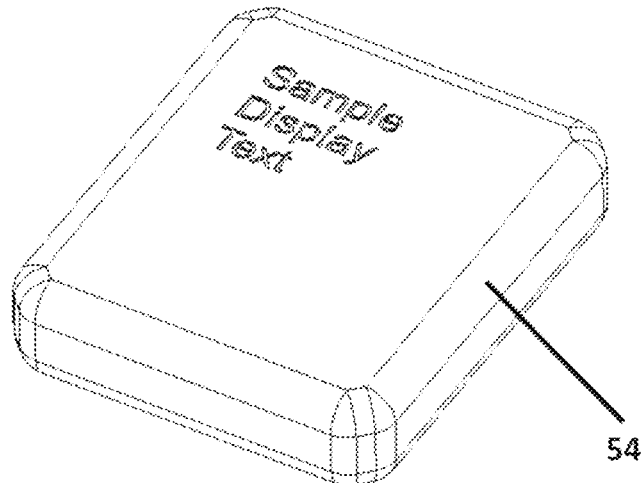

The present invention consists of a "device" or an assembly of objects that is designed to accommodate the human hand along with systems/methods of development, communication, and applications that have been developed in fundamental correlation and correspondence to the device. The present invention is either
   worn on the hand(s)
      The solution of Background Problems 1) through 4) provided by the worn version (as opposed to the rested upon version) warrants and will command the primary focus of this document
   or rested upon by the hand(s) atop an external surface
   In the case a user desired a device to be configured to be used in the "rested upon by the hand" manner atop an external surface, a strap may not be needed, or other weighted material such as metal may be stored in the underside in order to weigh the object down to ensure contact with the external surface. A 2-D optical surface motion sensor typically used as the underside sensor of a computer mouse may be integrated into the central underside of the present invention in the location of/in substitute of smart device component 54 as shown in FIG. 5. These non-worn variants retain many constraints of traditional data interface devices, such as reliance on captive/restricted posturing, however optical tracking on a surface provides precise, familiar, and unmatched analog pointer control in a very conventionally understood manner.
The present invention is typically worn on one or both hands simultaneously (the left and/or right hand). For sake of brevity, only the fully complete/configured, left-hand, wearable version of the device will be shown in its most complete variants and views, as present in the drawing description of Fully Configured Left Hand Version as shown in FIG. 1. The right-handed version of the device appears as a direct reflection of human symmetry of the left hand, barring any abnormalities by which a user's left and right hands may differ.

Figure 11:
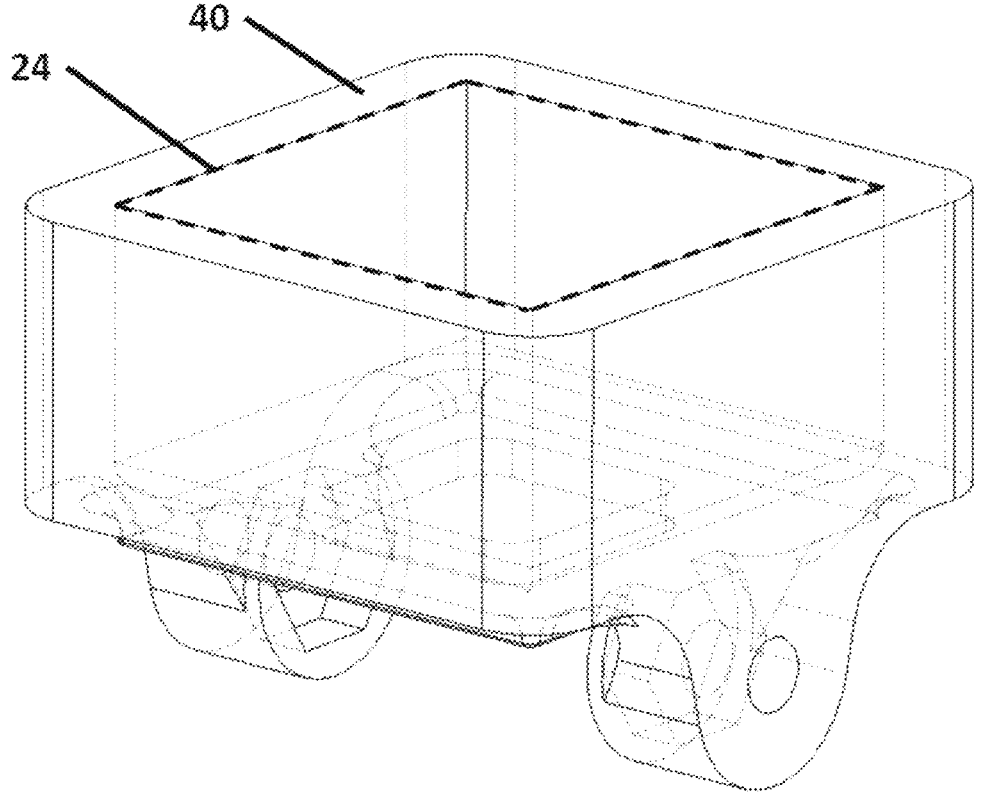
Figure 12:
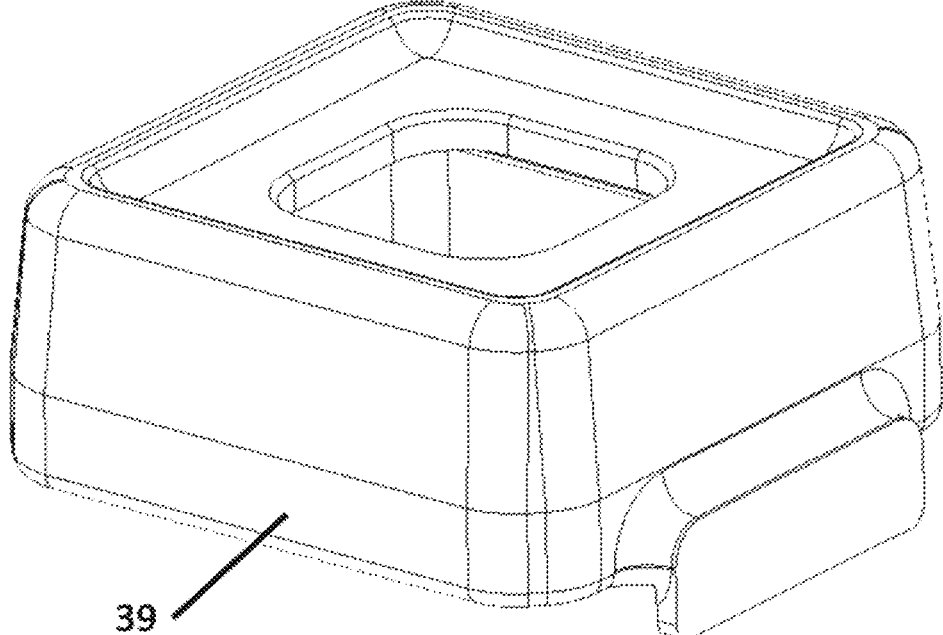
Figure 15:
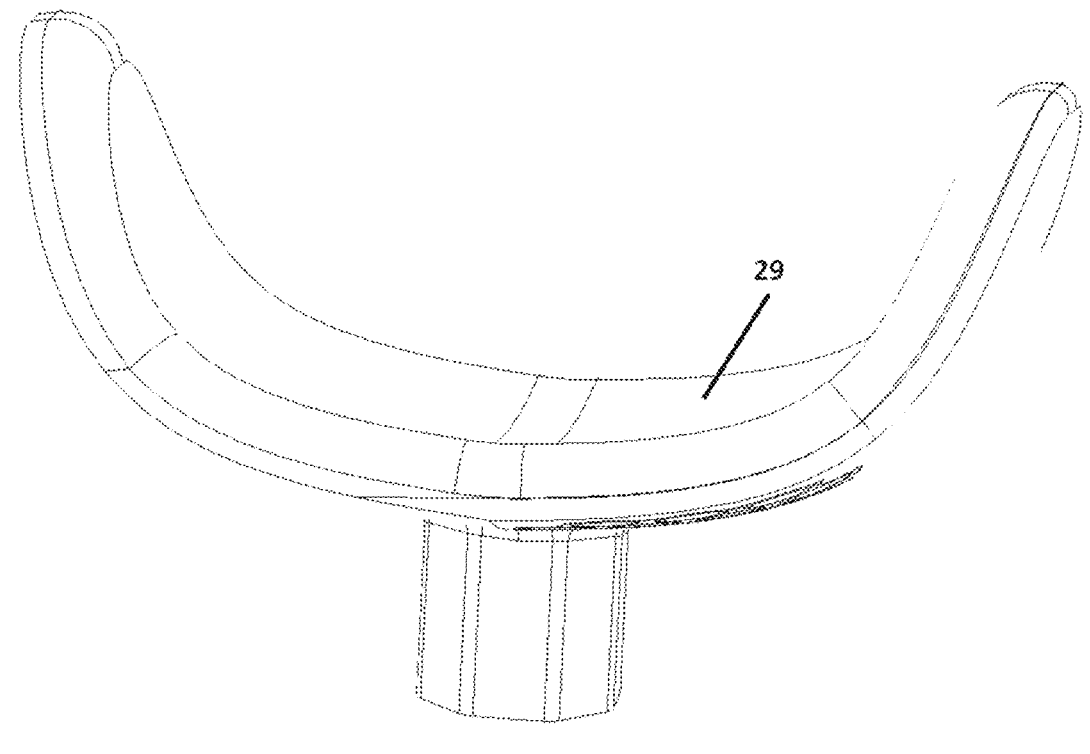
Figure 18:
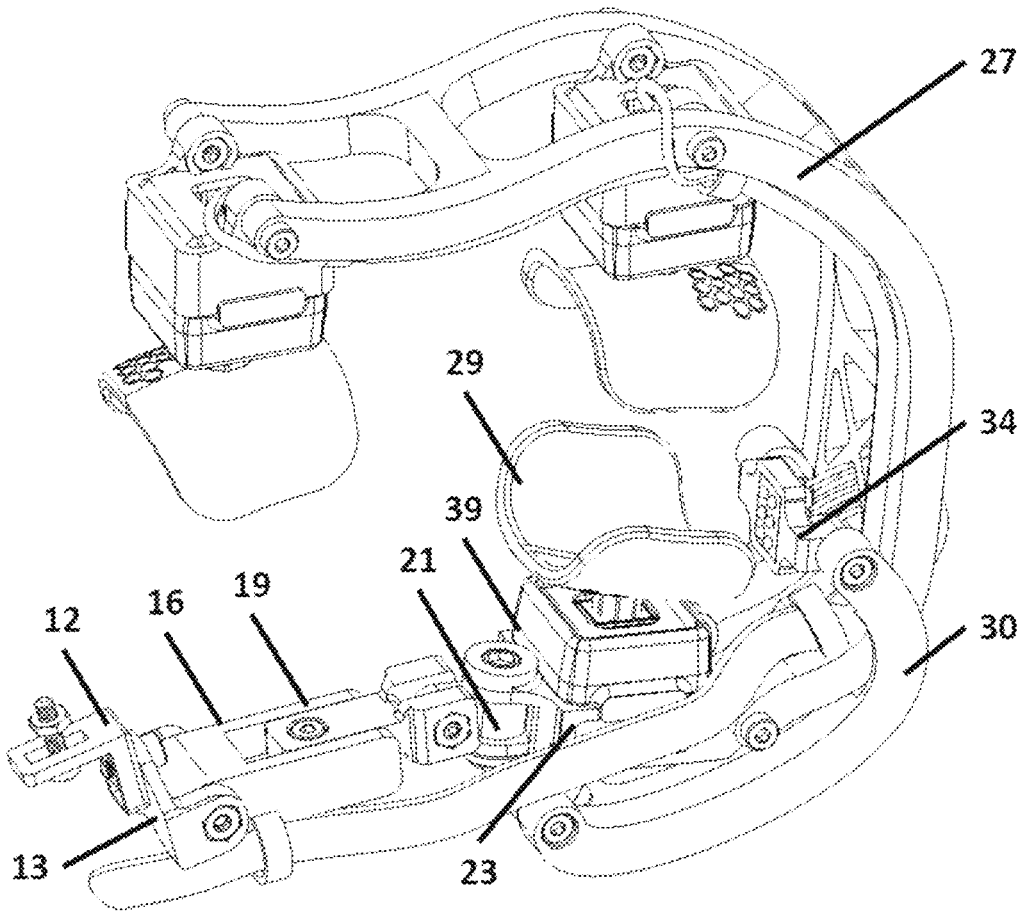
Figure 19:
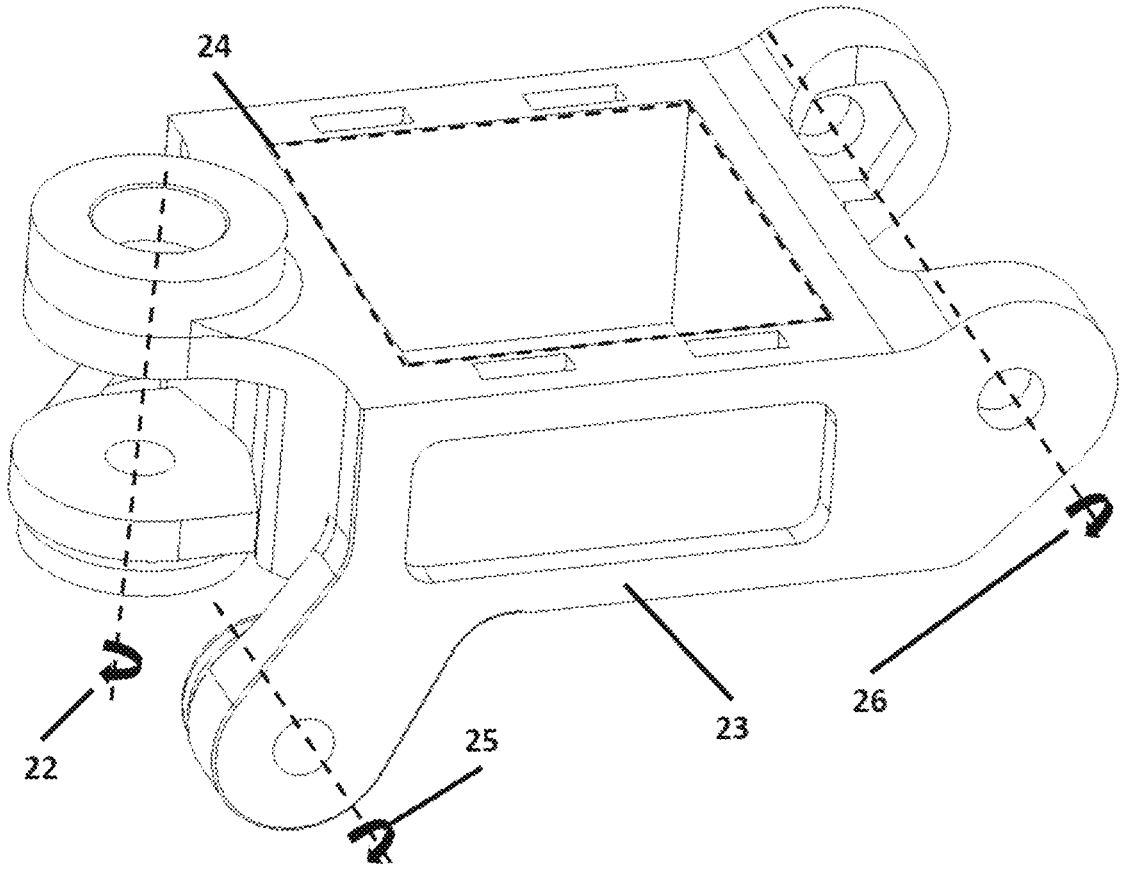

The present invention is often utilized as a modular wearable device, meaning a user of the present invention can select the number of switch sensors above and below each finger. A user may choose to incorporate brackets such as component 27, component 45, and component 30 as shown as FIG. 18 in order to include extra switches and refreshable braille cells to the device. In addition to this, a user may incorporate as well as any other desired components such as speakers, lights, vibration motors, and smart electronic devices into components such as component 23 as shown in FIG. 19, component 39 as shown in FIG. 12, component 40 as shown in FIG. 11, and component 29 as shown in FIG. 15. This customization invites a balance of function, aesthetics, and the resulting added device volume/mass.

Figure 16:
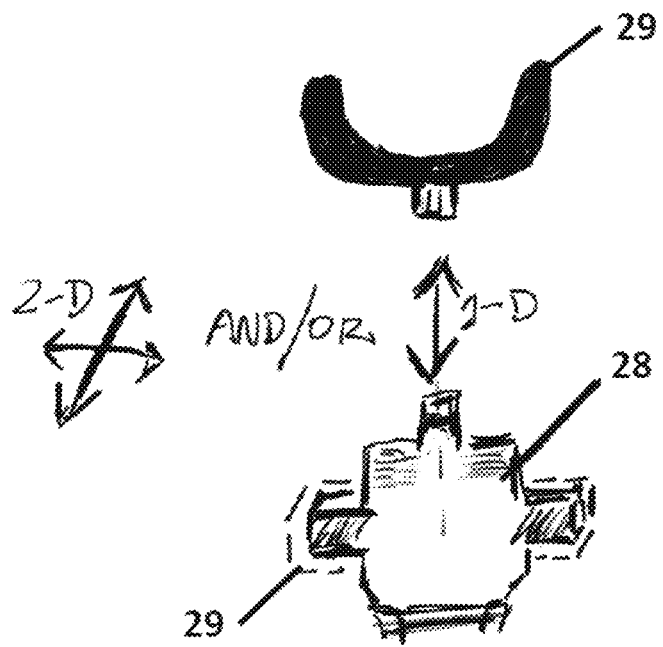

The present invention includes various existing switch sensors, an example of which can be seen as component 28 in FIG. 16 which are in themselves are non-novel in the context of this document though typically essential piece parts of the present invention [and typically essential to most other existing data interface devices]. These devices include but are not limited to spring-loaded switches [including 1-Dimensional as noted by component 28 as shown in FIG. 16], 2-Dimensional as noted by component 46 in FIG. 8, and 3-Dimensional data interface methods by which a switch utilizes a combination of stated 2-D and 1-D digital and analog input/output functionality.

These switch sensors:
   are located under switch cap components 29 & activated by pressure, surface movement.
   AND
   are housed directly in component 23, component 40, component 41.
   OR assembled in an a "hot swappable" manner, by which the wires that typically directly connect these electronic sensors to the device's central computing and electronics module or smart device—are instead connected to "hot swappable" boards. These hot swappable boards are mounted by press fit, fasteners, or adhesives to component 23, component 40, +component 41, and include trace-connected pin holes to directly receive data from pins on the switch sensors. By this manner, switches can be replaced by pulling them out and pushing them back in, without having to terminate and re-join electrical connections via soldering or other means. Component 29 and component 39 as shown in FIG. 18 must be removed (can be pulled off by hand) before "hot swapping" a switch sensor. Hot swappable functionality is not novel in the context of computer peripheral devices.

The present invention is molded, measured, and sculpted to conform to the surface geometry, position, and orientation of the relative components of the resting hand (mainly palm geometry and location/orientation of and fingers/fingertips/thumb relative to palm) using solid & liquid materials, hand tools, and both digital & analog electronic measuring methods.

Figure 56:
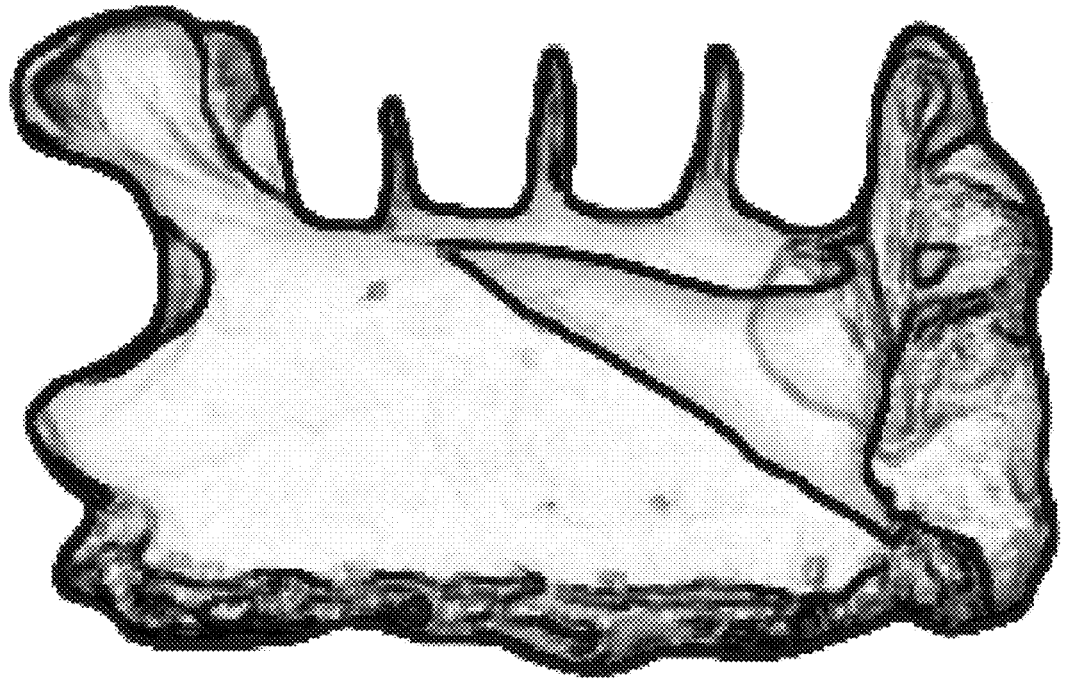

The first attempts to simulate such a geometry can be shown in the palm-impressed clay formation as shown in FIG. 56, although no data from this sculpture was used ultimately needed to produce the present invention.

Figure 70:
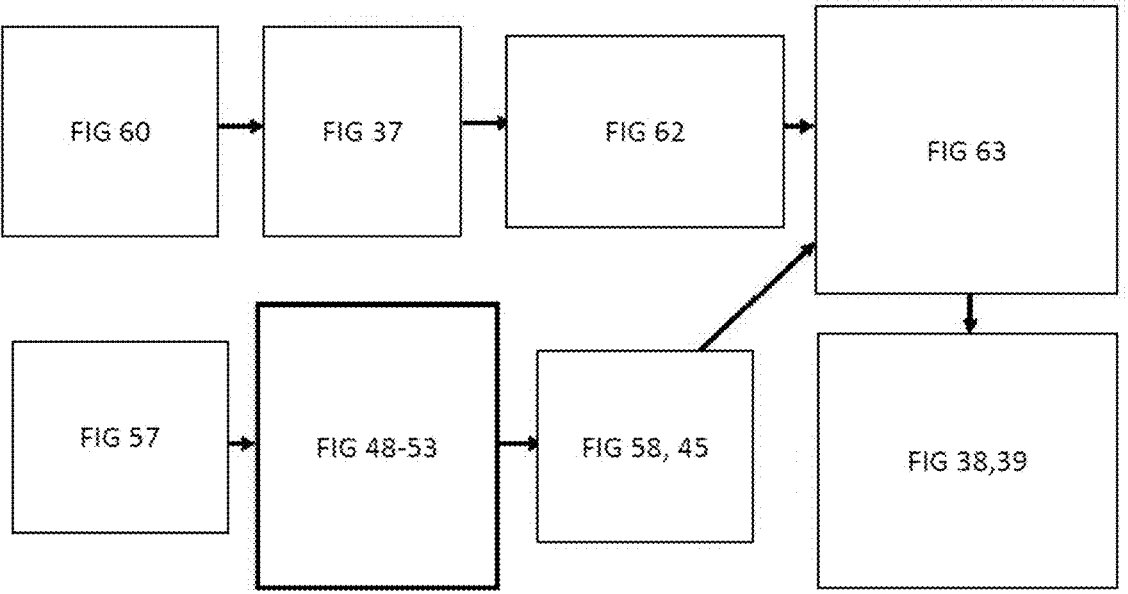

FIG. 70 depicts a flow chart summarizing an example of the process necessary for an ordinary person to develop an initial rigid prototype satisfying Background Problems 1) through 4).

Figure 60:
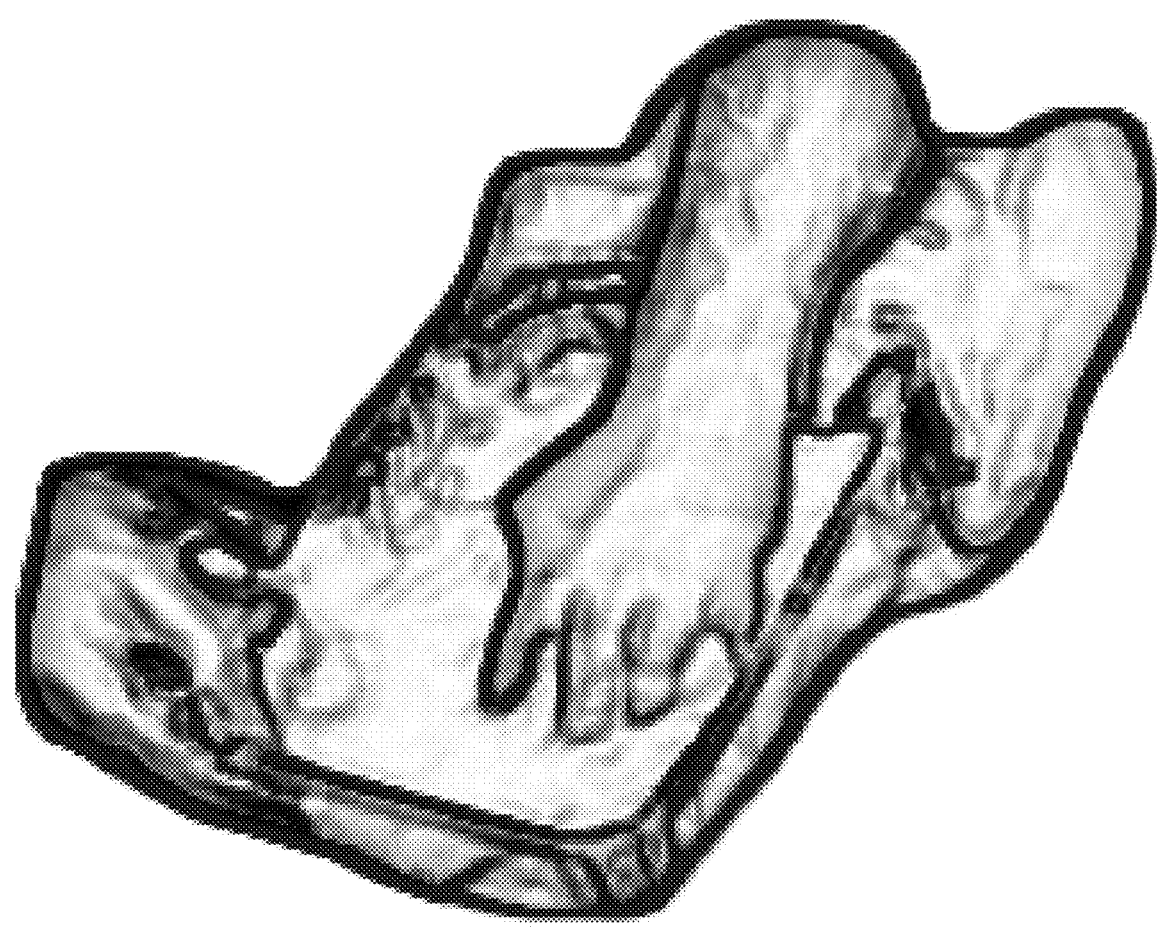

First, a human prepares a water-added powder-to gelatinous mixture. FIG. 60 shows a human hand partially immersed in a water-added, powder-to-gelatinous mixture that allows for a lasting, geometrically consistent imprint of the most complex human palm and hand geometry.

Figure 26:
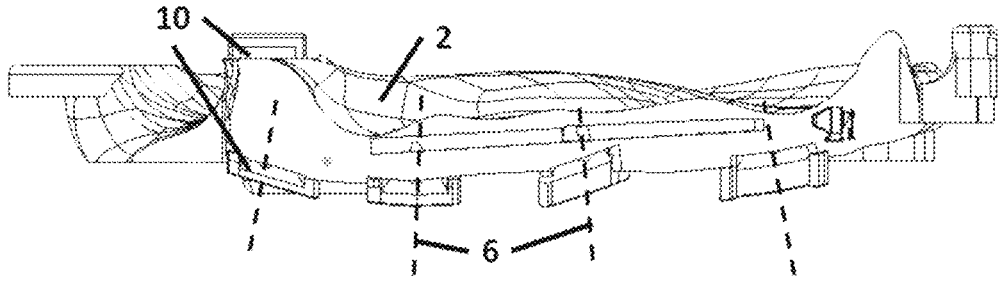
Figure 37:
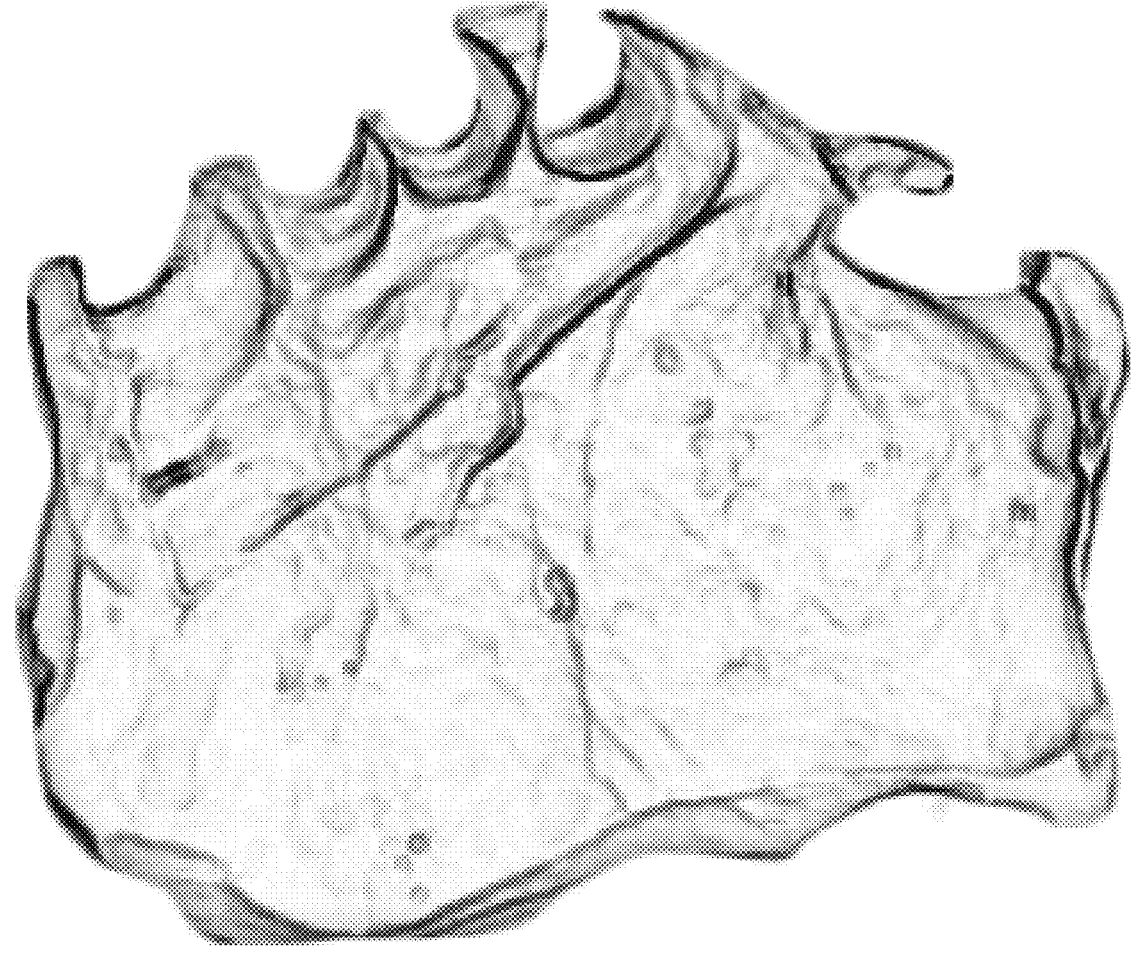

This complex surface geometry is noted by 2 as shown in FIG. 26 The resulting mold is shaped using a knife, edge, or other sculpting tool as shown in FIG. 37. This process is performed to create as lean of a structure as possible while allowing for necessary contact of and movement of the hand which the sculpted structure is designed to receive. This also allows for balanced base structure/surface on the underside of the sculpted structure to accommodate any mounted electronics.

Figure 29:
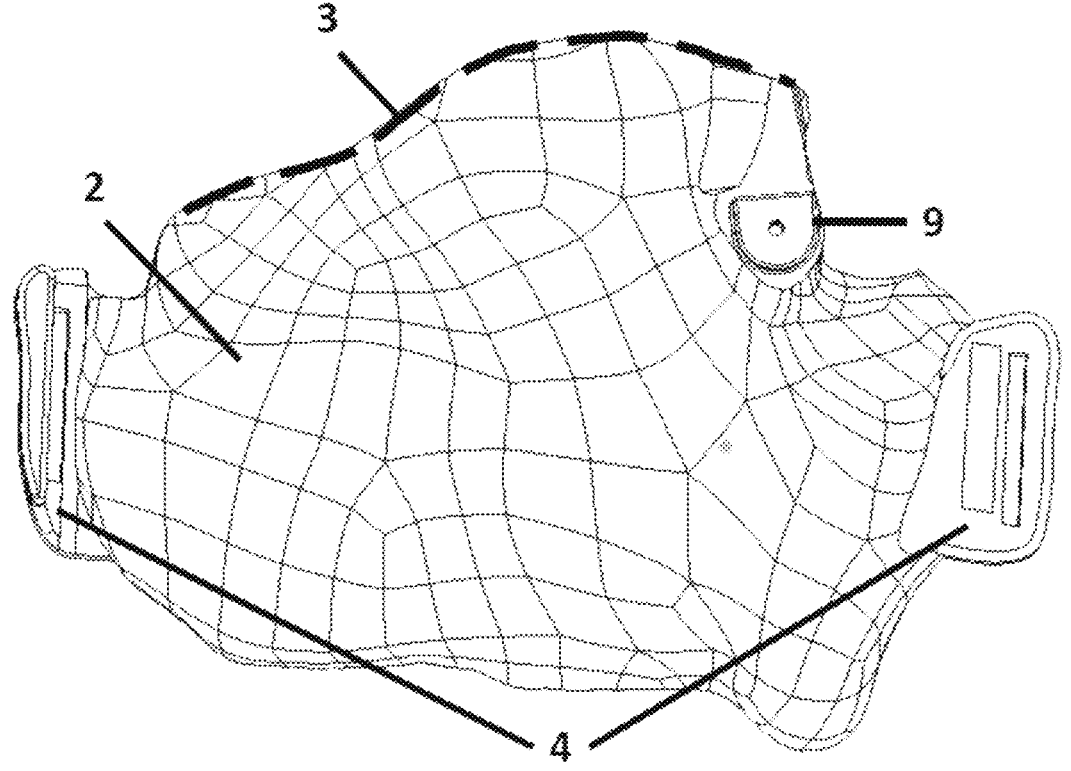

Alternate variations of component 1 allow for a cut-out of the area of the hand at the location where the thumb connects to the hand in order to allow for a less restrictive movement of the thumb. However, these variations of component 1 produce the following consequences of:

less palm-to-component surface contact is available to balance weight of the present invention and any electronics mounted on the underside.

limited surface area means limited locations for harnessing point features 4 as shown in FIG. 29.

Figure 61:
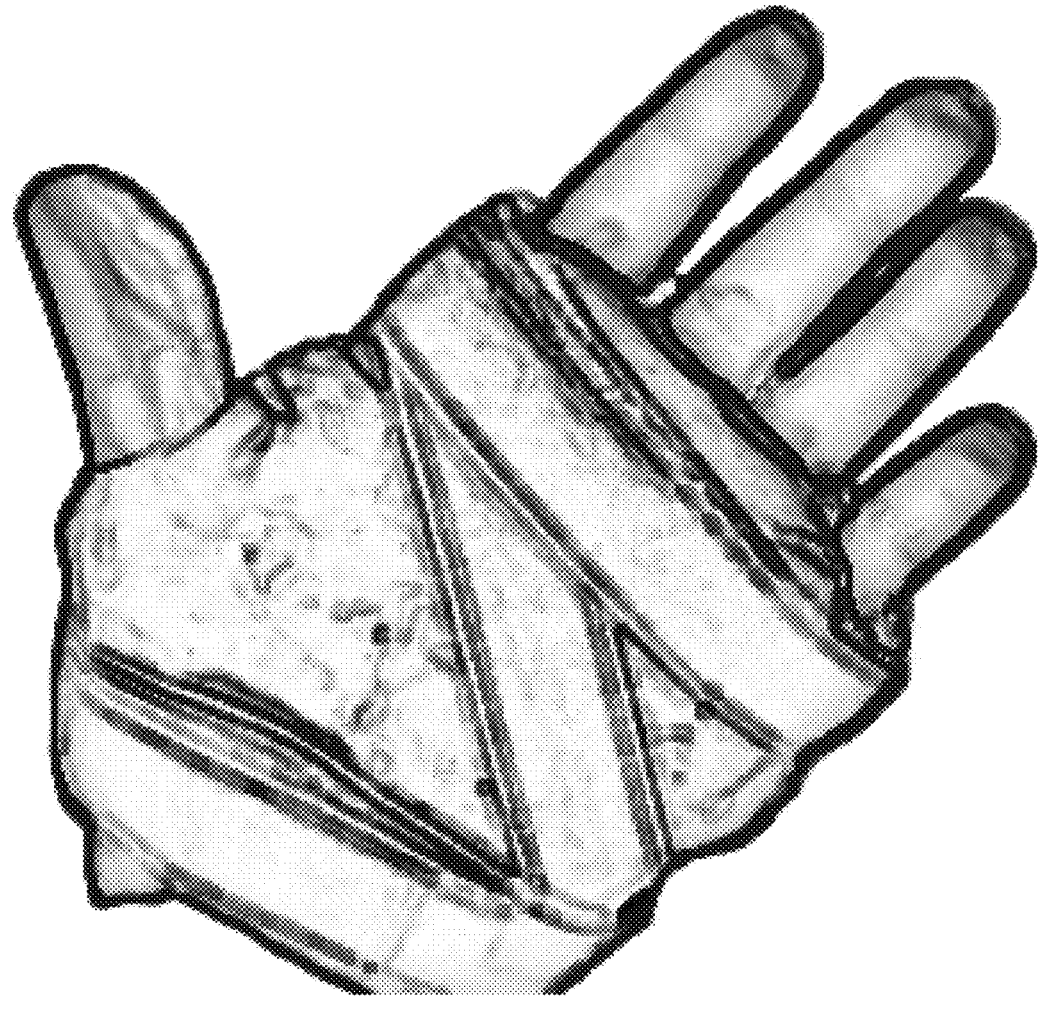

A 3-D Scan can then be taken of this resulting sculpted mold using optical scanning technology. A scan or manual measurement may alternatively be taken of a user's hand/palm directly, however that hand must keep exceptionally still during measurement. A visual representation of 3-D scan data taken of the molded sculpture can be found in FIG. 62. The molded sculpture was then strapped to the hand to confirm the geometry in order to confirm comfort and stillness of the hand relative to the device during movement of the fingers, thumb, and hand as shown in FIG. 61

Figure 43:
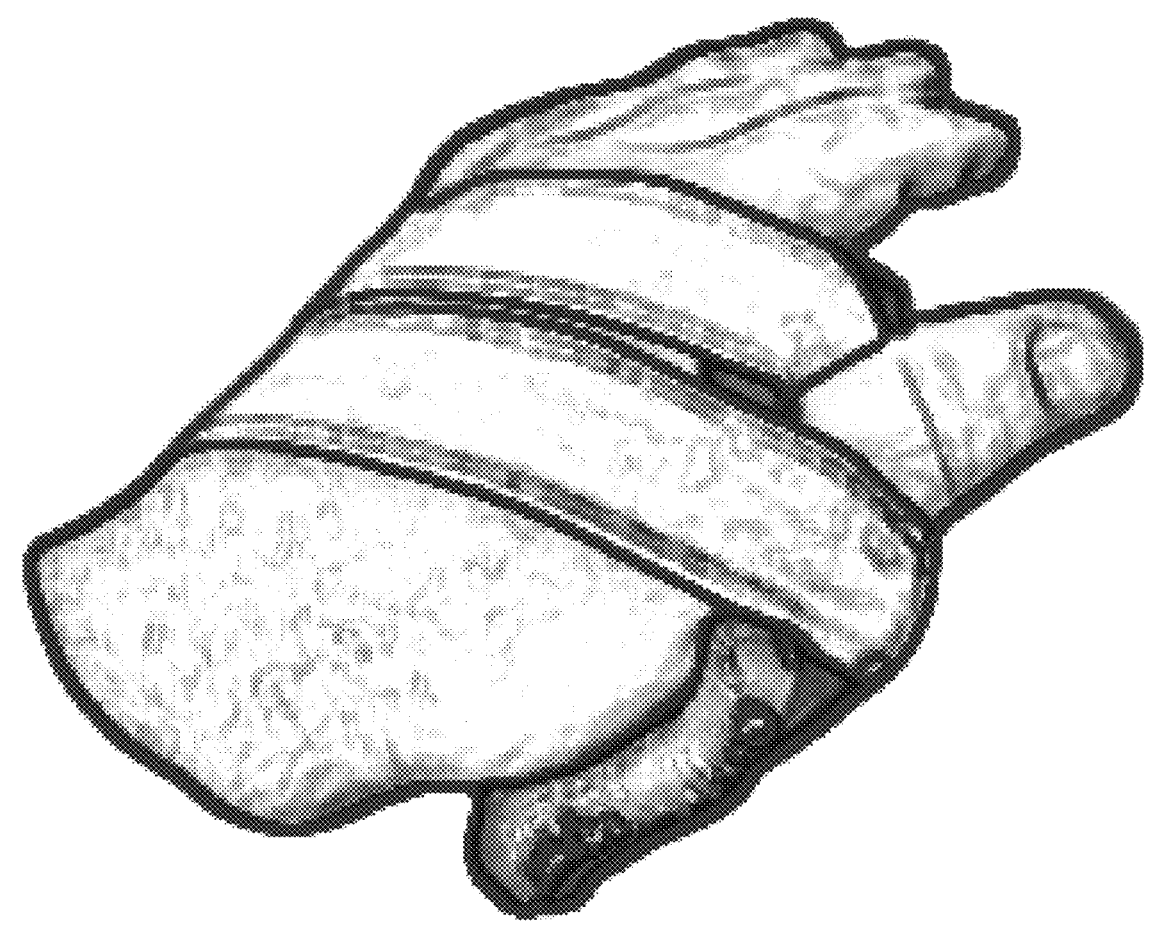
Figure 44:
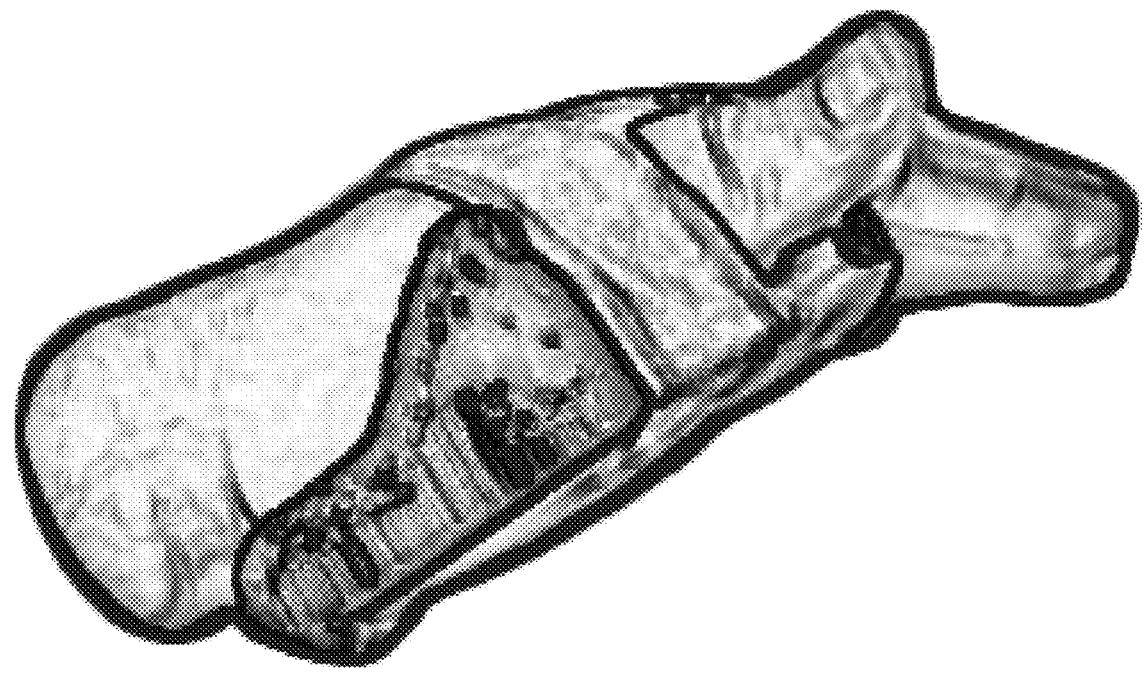

The resulting 3-D Scan Geometry is digitally sculpted to create the central basis of the geometry of component 1. The physical representation of palm receiver, whether manufactured using 3-D printing (ideal for small batch), injection molding, or CNC geometry—should result in a part with the least material mass/volume possible while also retaining the previously stated surface area attributes. A 3-D printed representation of the resulting 3-D model is produced and strapped to the hand to confirm flushness, comfort, and ability of the fingers and thumb to move without interference or dislodging the hand from the flush surface profile as shown in FIGS. 43 and 44.

Figure 67:
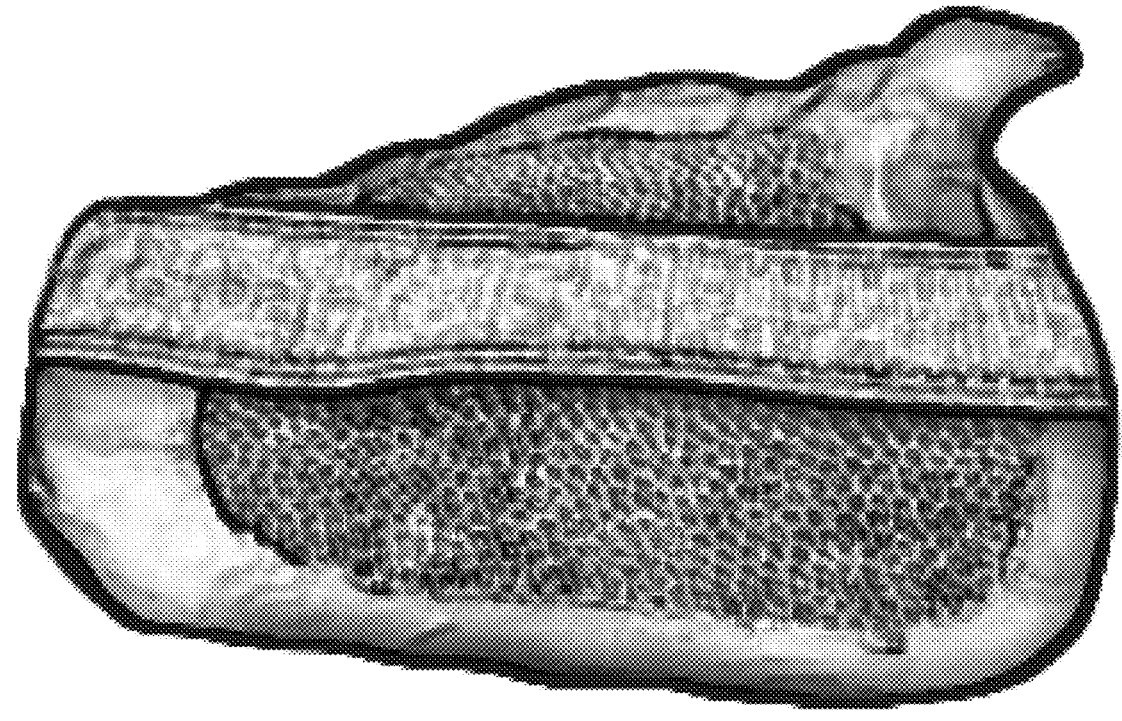

A user of the present invention may opt to incorporate textured material as shown in FIG. 67 to the user-interfacing surfaces including but not limited to component 1 and component 29. These textures, or sparse patterns either extruded from or cut into the user interfacing surfaces may be added/incorporated to user contact surfaces according to user preference in order to increase friction and comfort, or to reduce the generation and buildup of perspiration [hand sweat].

Figure 30:
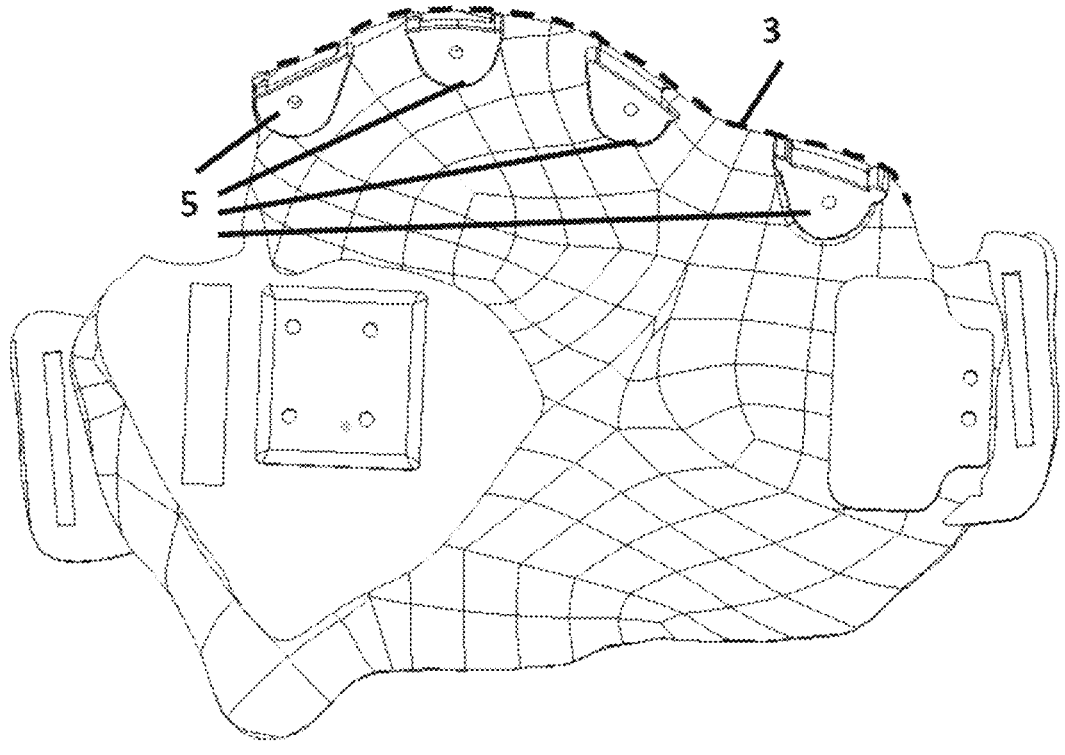

The present invention contains detailed contoured surfaces and edges such as front edge 3 of component 1 as shown in FIG. 30 that have been formed to align with the geometry of features of a user's hand while allowing for the fingers and thumb to move between and interact with the device's various switch sensors—without physically interfering with the present invention or other human anatomy.

Figure 57:
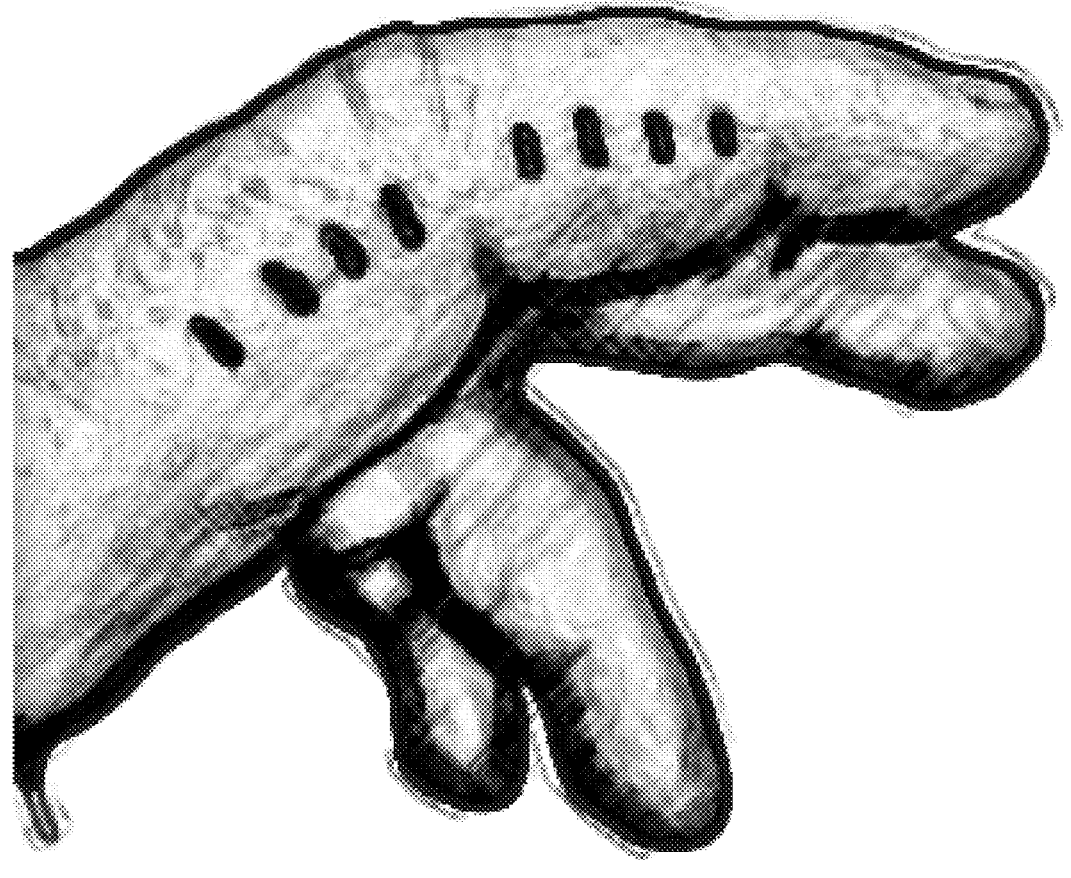

User contact surfaces of switch cap components 29 as shown in FIG. 15 depict swept parabolic-like profiles which can optionally be custom-measured to the geometry of each fingertip. These profiles maintaining aligned surface contact with fingertips helps to retain the overall balanced contact of the hand in addition to the effects of component 11 and component 1. In order to verify the ideal location and orientation of component 29 and component 41 for a given user, various methods are used to measure and model the fingers, thumb, and how they connect to the hand relative to each other when a user's hand is in a comfortable neutral position. These methods include marking increments on a user's skin as shown in FIG. 57.

Figure 48:
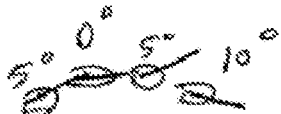
Figure 48:
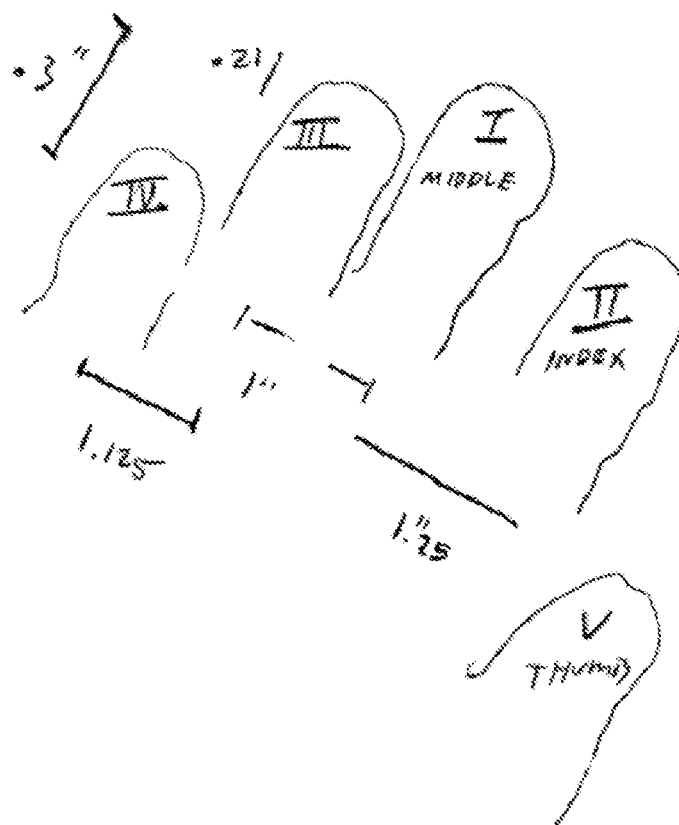

Distance between each marked increment is measured and graphically indexed relative to the major and minor axis lengths of the finger/thumb elements as shown in FIG. 49, FIG. 50, FIG. 51, FIG. 52, and FIG. 53. These figures also show the measured relative length and orientation of each finger/thumb element. These measurements can be taken with digital/analog calipers, a protractor/ruler, and/or other generic measuring methods. This data is combined with distance measurements taken between the locations where each finger connects to the hand and distances between each fingertip to obtain the thumb/fingertip locations and positions for a user's ideal hand posture as shown in FIG. 48.

Figure 58:
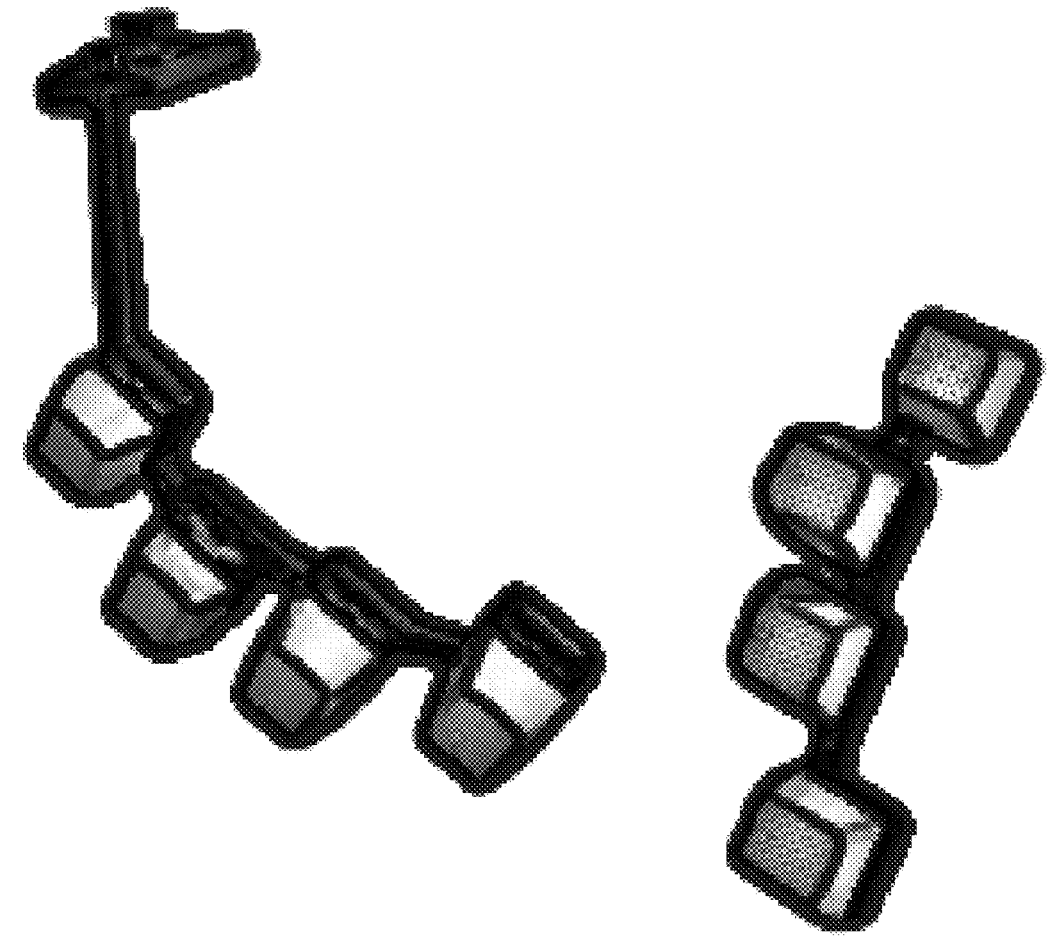
Figure 59:
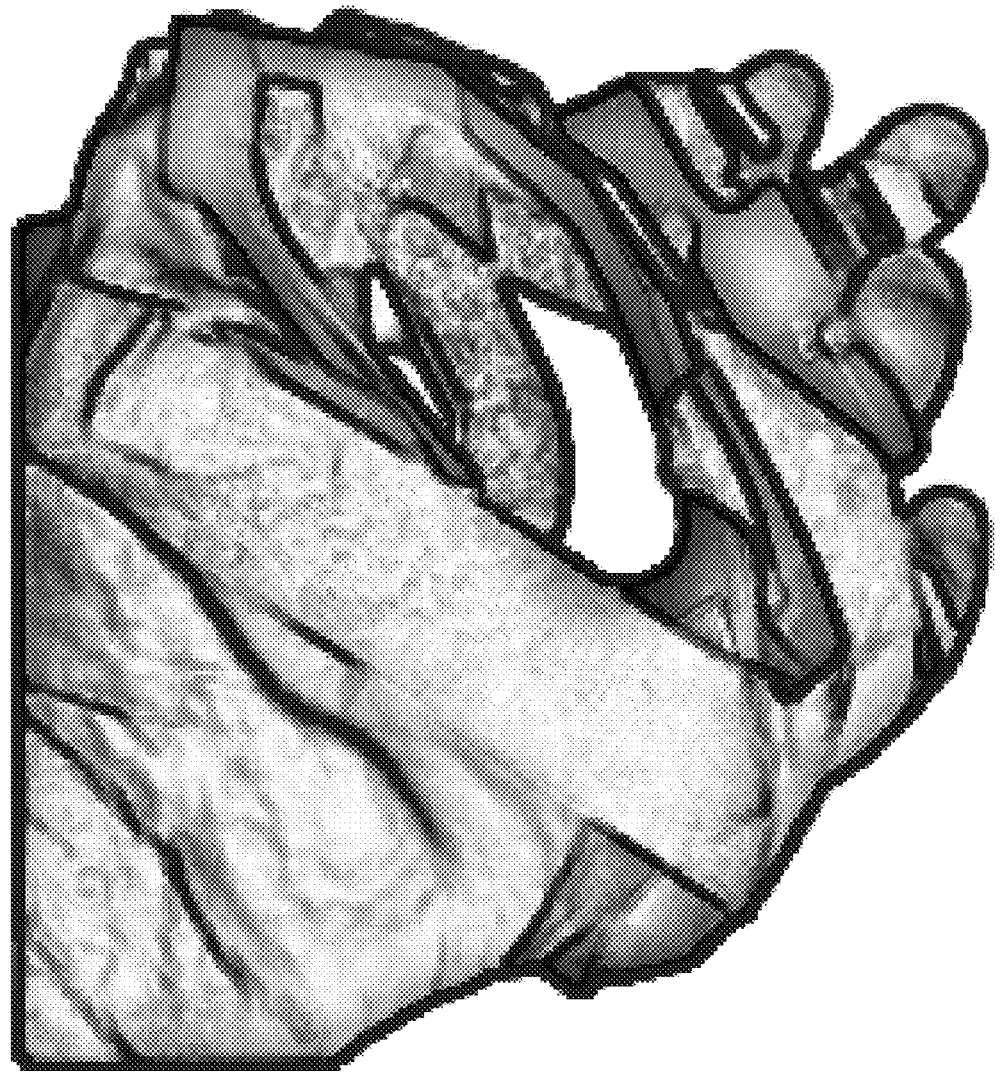

These locations/orientations are offset and used for placement of individual switch holder profile features 24 as shown in FIG. 16, which together may form a finger/thumb switch holder rigid body as shown in FIG. 58. FIG. 59 depicts an attempt to satisfy background problems 1) through 4) for a user's measured hand using only the assembly shown in FIG. 58 and ordinary tape. FIGS. 59 and 61 are prime examples of how neither the complex palm geometry nor fingertip positions/orientations are sufficient to mechanically solve background problems 1) though 4) for a given user's hand on their own.

Figure 38:
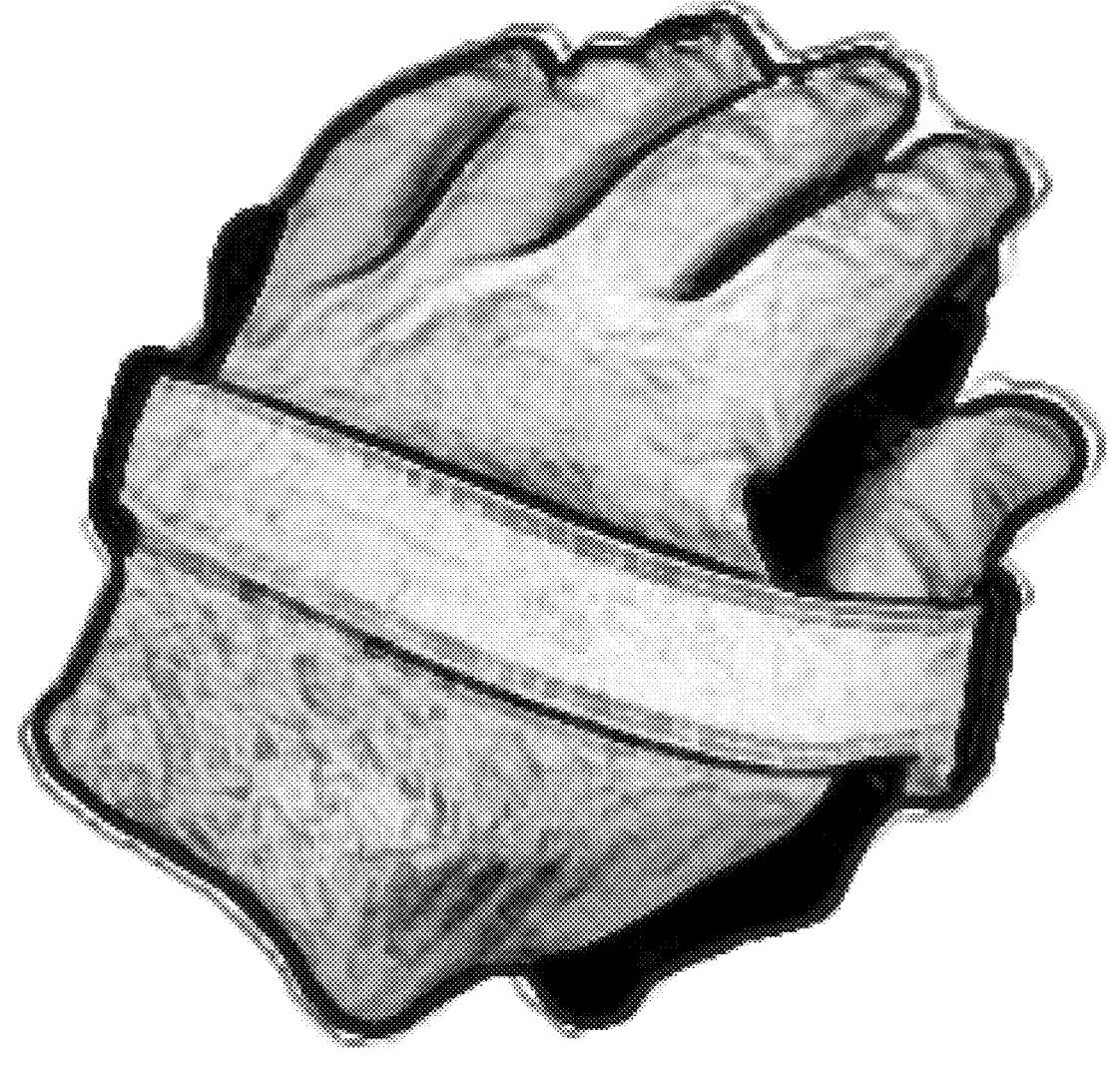
Figure 39:
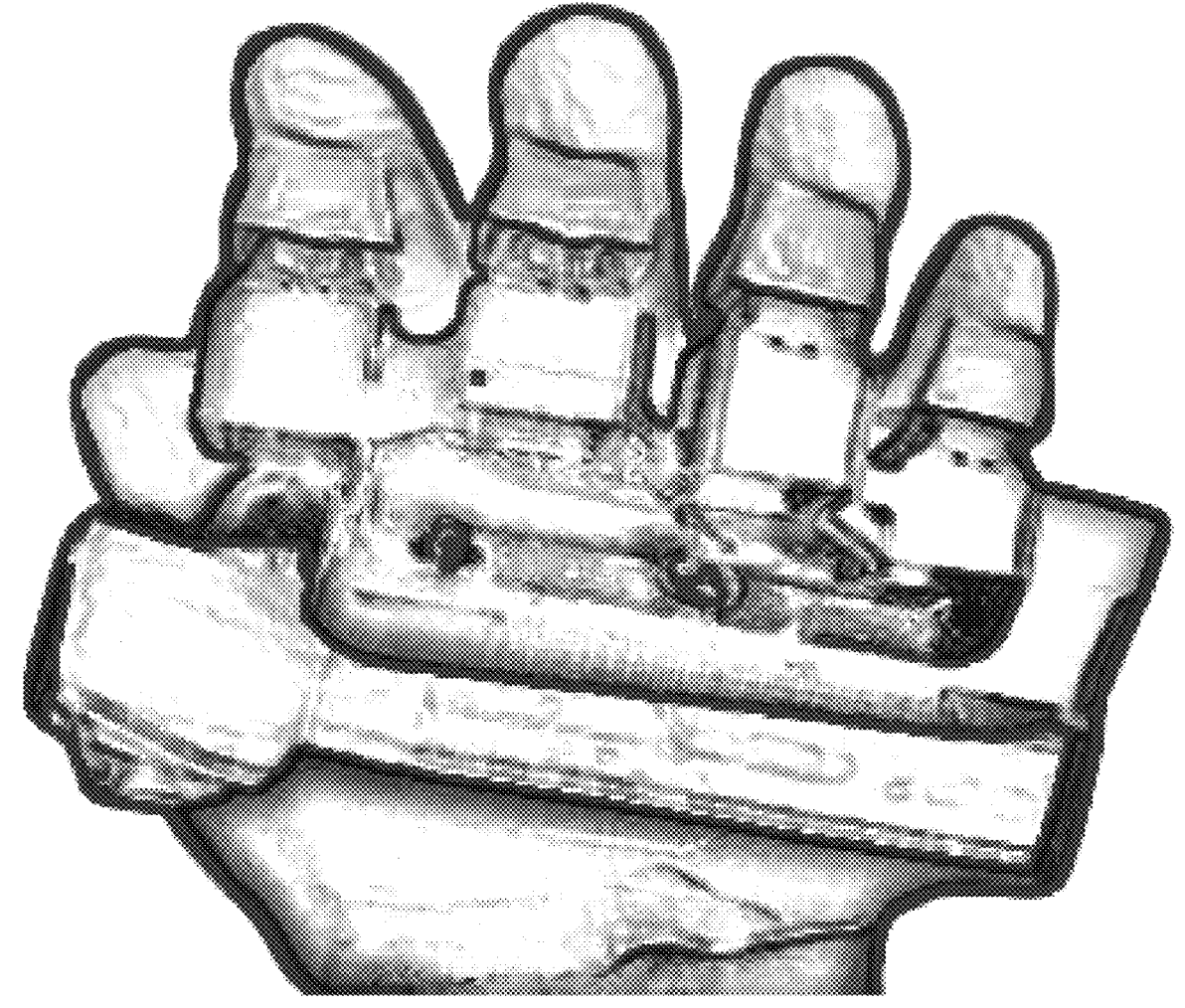
Figure 65:

It should be noted that although a person ordinarily skilled in the art will most certainly need to practice the previous hand sculpting & finger measuring steps in addition to the following desk-top positioning, orientation and verification steps in order to initially produce an object or assembly of objects that satisfies Background Problems 1) through 4) for a user's specific hand geometry [prior to explicit knowledge/verification of functionality of the design (prior art which does not yet exist)], these steps are not necessarily required when producing a device with adjustable fingertip switch positions once the initial device satisfying background problems 1) through 4) depicted in FIGS. 38, FIG. 39, and FIG. 65 has been produced.

This, and the previous paragraph are to imply that fingertip/switch holder position and orientations need not be precisely measured using the following desktop positioning, orientation, and verification steps in order to fabricate the adjustable fingertip variant of the present invention, as long as alternate measurements are taken to ensure that palm attachment features 5 on palm component 1 as shown in FIG. 30 are appropriately placed and aligned from finger to finger as noted by the varying placements and 3-DOF orientation variables of with orthogonal centerlines 6 originating from fastener locations on palm attachment features 5 as shown in FIG. 26. Design or fabrication of these variants that do not readily allow for pre-placed fingertip positions with the included adjustable variables will be further discussed in the Adjustability and Variations section.

Figure 40:
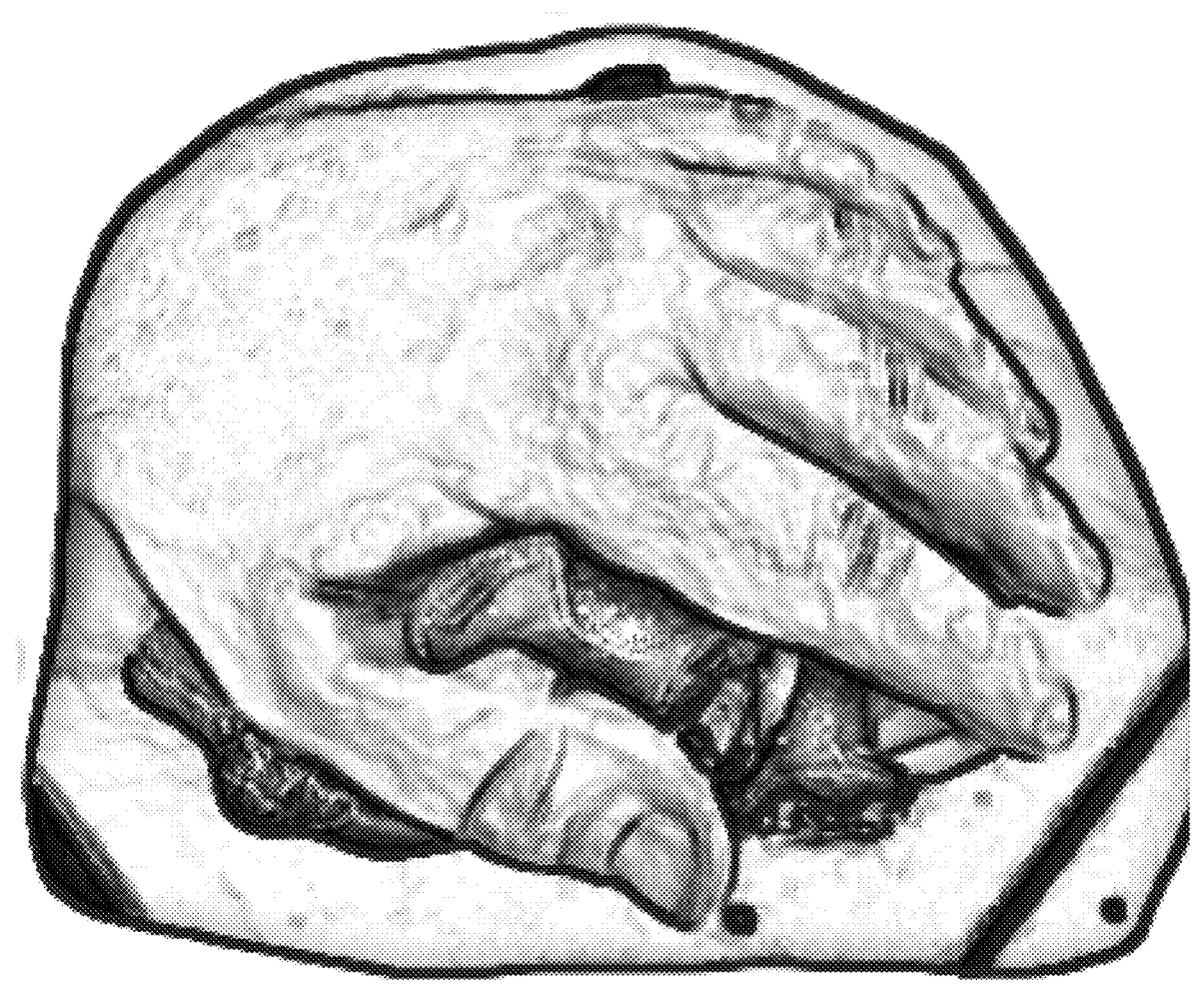
Figure 63:
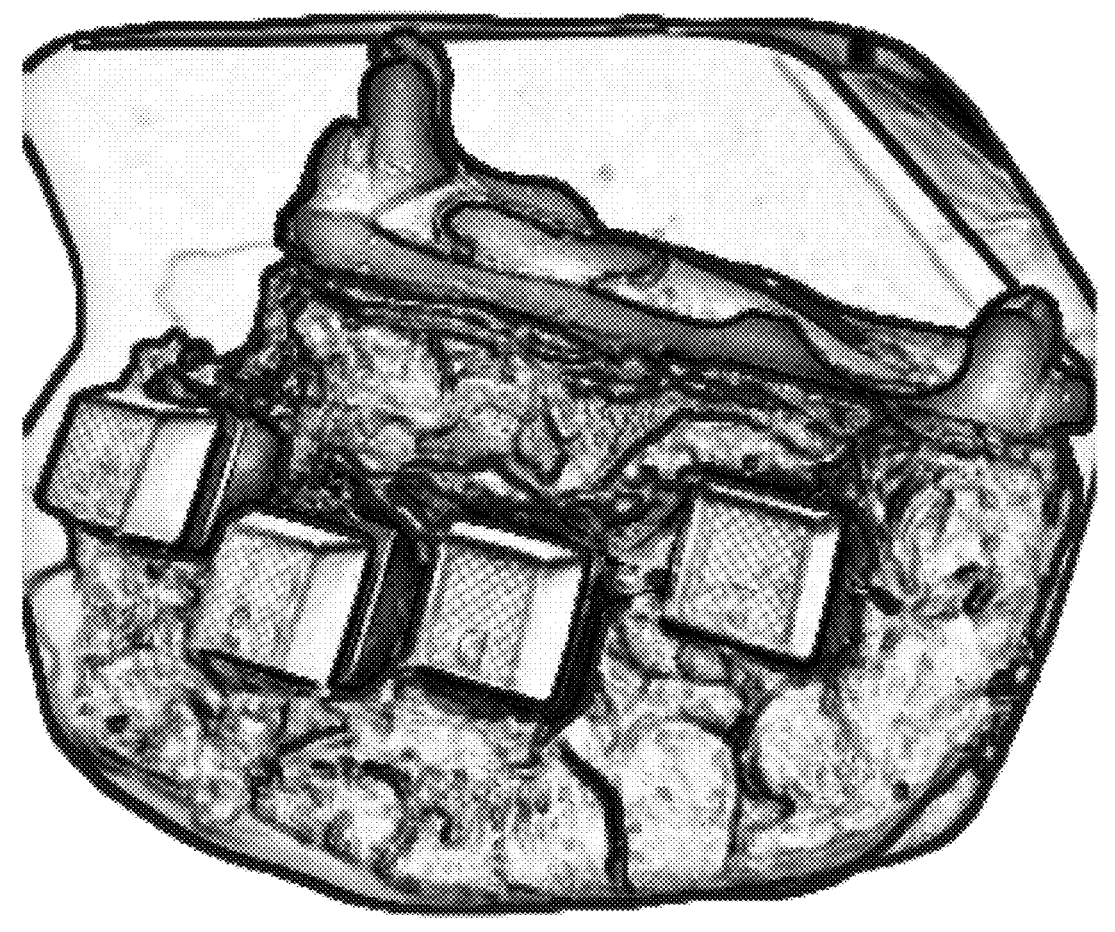

The present invention utilizes desk top positioning, orientation, & verification of optimized test geometry relative to a user's hand is necessary in order to initially reproduce the design. FIG. 40 and FIG. 63 show the process of forming an optimal hand geometry sculpture using modeling clay in order to determine the ideal placement of combined switch holder rigid body from FIG. 58 relative to the lean palm sculpture geometry as shown (during testing on a hand along with an accompanying strap) in FIG. 43 and FIG. 44.

Figure 54:
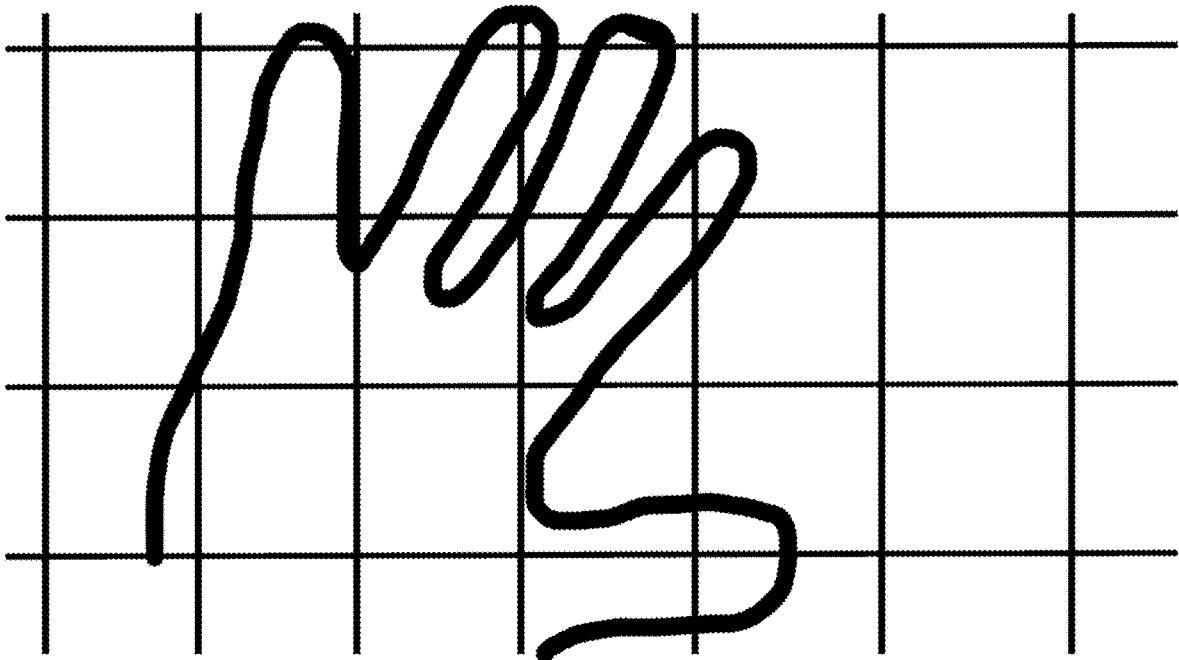

Data is acquired from this sculpture by means of first ensuring that the hand used to reference the sculpture is as comfortable as possible. Secondly, the modeling-clay-formed bottom of the optimized hand geometry sculpture should be level and flush relative to a level measuring surface. Data can be collected with generic measuring methods including digital/analog calipers. FIG. 54 depicts the measuring process of measuring the distance between known points on the objects from the level measuring surface (table). Three separate vertical measurements from separate points on the same rigid 3-D component are taken orthogonal to a known 2-D measuring surface to determine the relative orientation of planes fixed within the objects of the two 3-D rigid bodies set within the clay.

This is performed separately for each rigid body to determine the ideal relative orientation of the components, leaving only one angular and two positional degrees of freedom remaining. Finally, 1-D distance measurements are taken on a plane coincident or parallel to the level measurement surface between the two components. This data fully defines both components' geometries relative to each other in three dimensions.

Once features for straps 4 are integrated into the palm component to allow one to wear the device on the hand, the previously disclosed knowledge and allows one of ordinary skill in the art an opportunity to initially create and verify (test) the present invention's geometry as a single rigid body or multi-component assembly as shown in FIGS. 38, 39, and 65.

Optionally, the locations and orientations each individual switch holder profile 24 may be manufactured and relatively measured to the palm part as individual rigid bodies rather than a combined-switch piece as shown in FIG. 58. The latter requires considerably more measurement points at this stage to acquire the necessary fingertip location/orientation data.

Figure 4:
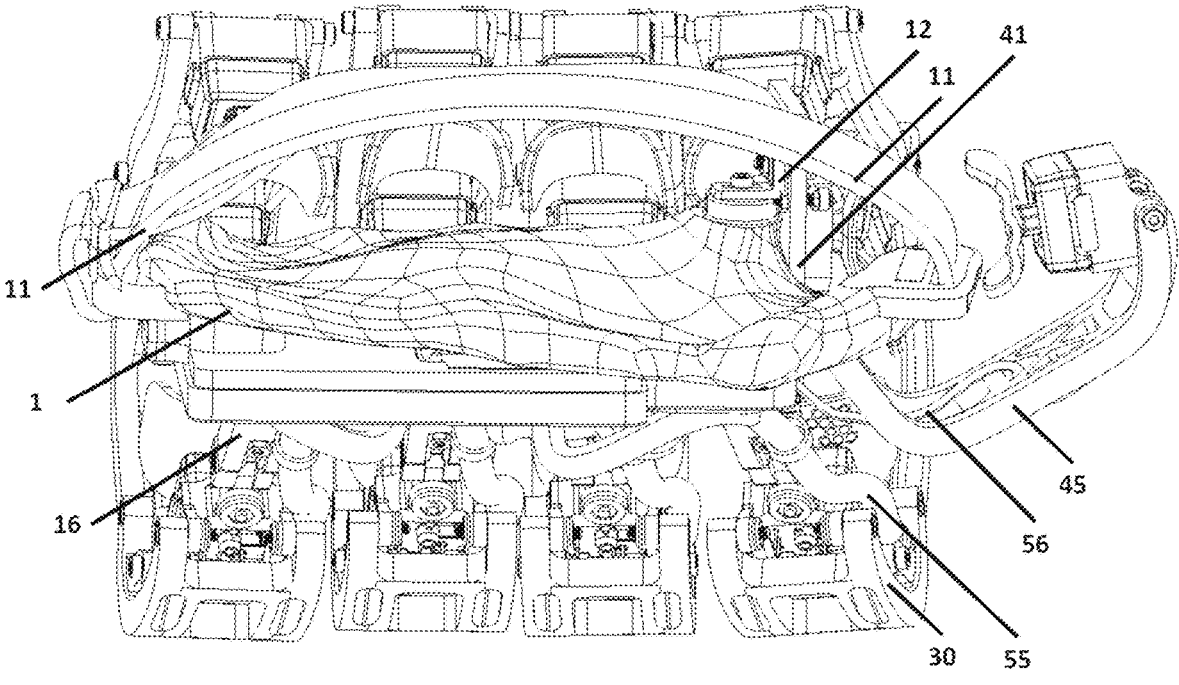

The present invention is worn initiated by the donning, slipping on, buckling, or tightening of a fastening material such as a strap or mesh as noted by component 11 as shown in FIG. 4. This fastening material is comprised of an elastic fabric, synthetic/rubber, or other wearable material such as cotton, wool, nylon, or any comfortable non-toxic material.

This fastening material is attached to the present invention by means of an adhesive glue, strap, magnet, or integrated buckle at termination feature locations 4 as shown in FIG. 29. Multiple fastening material termination features can be incorporated into the structure to evenly distribute the weight of the device across the hand. Said attachment point features may be integrated into the part containing the palm geometry 1, or cleverly integrated into other components such as the thumb switch holder 41.

The present invention allows for desirable force/pressure/weight distribution relative to a user's hand through the combination of flush palm contact, fastening material (strap) assembly, and load balancing from flush surface contact of fingertip switch cap components 29.

The present invention's fastening material assembly, combined with the previously stated hand geometry, ensures constant flush positioning of the present invention on the user's hand, even while the hand is in motion relative to the user's body and activating/maneuvering between multiple (varying) consecutive switch sensor combinations. This combination of technologies allows the user of the present invention to operate and move the hand between the many possibilities of desired user inputs with negligible hand re-posturing/re-positioning relative to the device.

The present invention's surface alignment of both fingertips and resting palm contact, retainment forces from fastening material assembly, and spring-return-assisted feedback nature of most switch sensors allows a user's fingers to be gently twitched in a more controlled manner [with more feedback] than there is present with an unsupported hand (free/dangling hand without the present invention).

The present invention includes features to allow for the various combinations, variations, and assembly of onboard processing, battery [power], wireless communication electronics, and smart device elements. These component(s) may fasten to the palm via modular attachment features 5 as shown in FIG. 30, with slot features 10 to retain captive nuts or magnets. It should be noted that most components in the present invention contain either linear, curvilinear, or hexagonal slots in order to accommodate the function of captive nuts as to not require an opposing grip/torque during fastener/switch holder adjustment.

Figure 6:
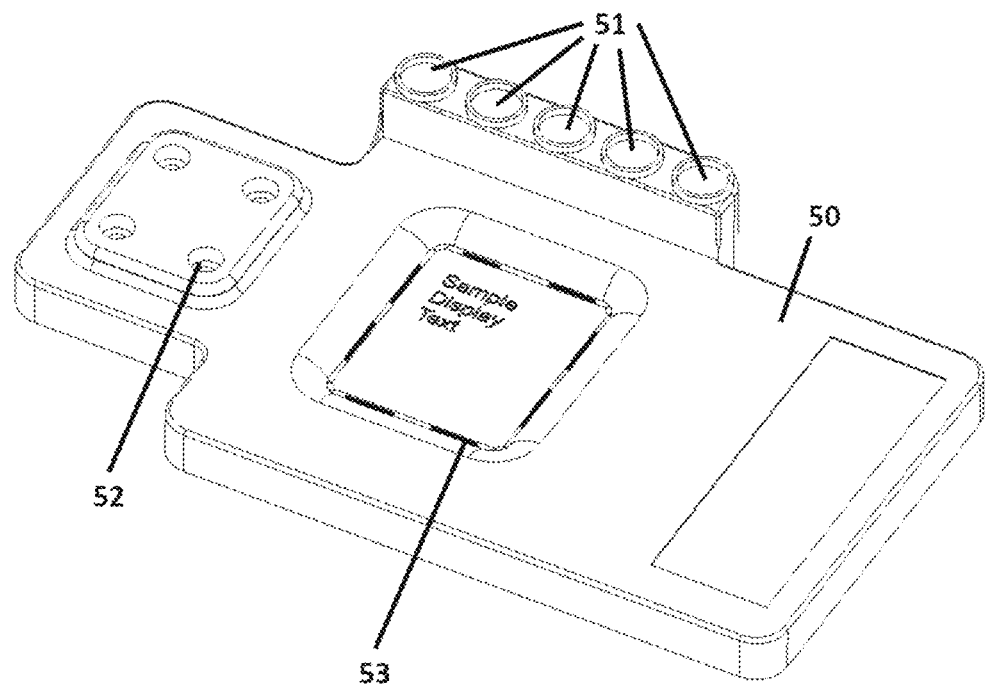

The present invention is designed to incorporate and may integrate a fully functioning miniature computerized display assembly also known as a smart watch or smart phone, which may be integrated into electronics module component 49 (FIG. 7) by means of a magnetized charging mount or a removable protective lid 50 (FIG. 6).

While the premise of this document focuses on variations of the present invention wherein attached switch-holding structures such allow for data interface with a user's fingers and thumb as shown in FIG. 3, FIG. 25, FIG. 33, and FIG. 38, another less-to-be-explored variant is an assembly with less weight that omits finger structures and associated function. This grants the user an option to wear smart devices on the palm's underside along with any device-specific battery/charging hardware that may be desired by a user, without having to grip the smart device. This variant will be discussed only in this paragraph and no further. It is comprised solely of a version of palm component 1 (which in this case, since there are no finger switches, need not include switch attachment features 5), This palm component-only variant does not entirely solve background problems 1) through 4), and could best be visually described by FIG. 43 and FIG. 44, although these Figures do not depict any "smart devices".

Figure 27:
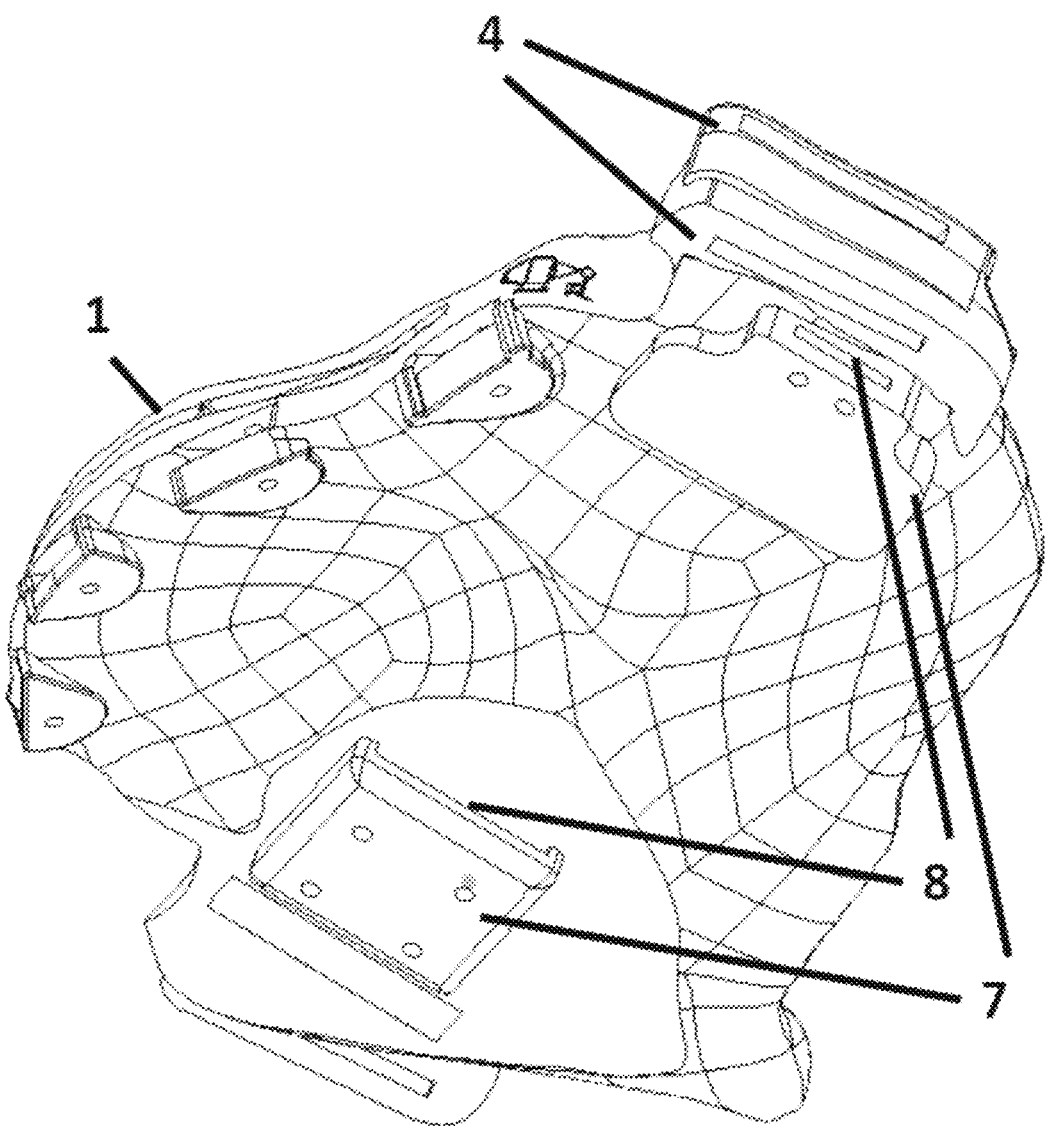

Any of the "smart devices" used in conjunction with The Present Invention mentioned in this document may be attached using modular attachment features 7 as shown in FIG. 27 or rigidly enclosed in the underside of component 1 by utilization of a screw-removable or pivot-snap removable lid. Additionally, "smart" devices have the capability to power or be powered/charged by onboard components of the present invention via magnetic/inductive charging methods or other standard wired charging methods.

This said, with the modular nature of the present invention, (with the exception of any biological growths or changes to physical structure or movement of their hands) a user should need not discard component 1 or require a separate version of the present invention for each smart device owned by a user that they wish to interface with using component 1—unless that user has more than one of each (Left and Right) hand of a similar size ready and willing to use the present invention.

When embedded within or attached to the structure of the present invention, a user may perform data entry and view the display of said "smart device" worn on the underside of a single hand without having to grip the "smart" device. The ability introduced to a user by the present invention to separate, decouple, or detach that user's posture from typing or data interface action will soon be discussed further.

Bluetooth, inertial/acceleration, position, measurement, and cellular data can be accessed via data input using these devices, allowing for applications including though not limited to the control and feedback of computers, manned+ unmanned vehicles, gaming consoles, musical instruments, robotics, firearms, virtual/augmented reality, fitness tracking, inventory/warehouses, industrial and agricultural equipment. This list of applications is not exhaustive.

Wired or (preferably) wireless input between the hands via wired or wireless communications/connectivity hardware and software allows for the left and right hand to utilize more switches and easily form more characters/commands simultaneously. It is most ideal to not have a wire running across or around the human torso when using a two-handed variant of the present invention.

Figure 34:
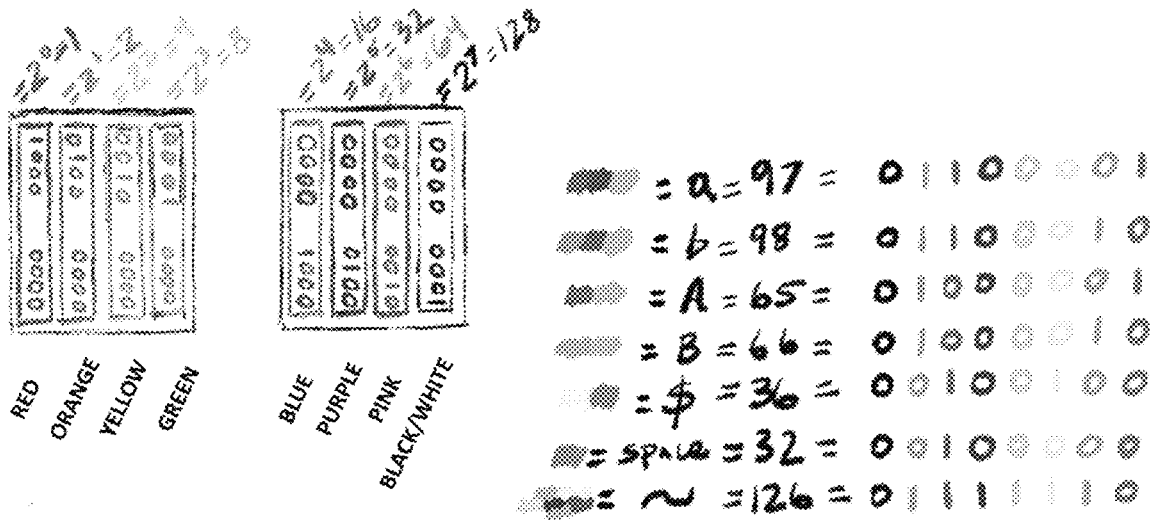
Figure 35:
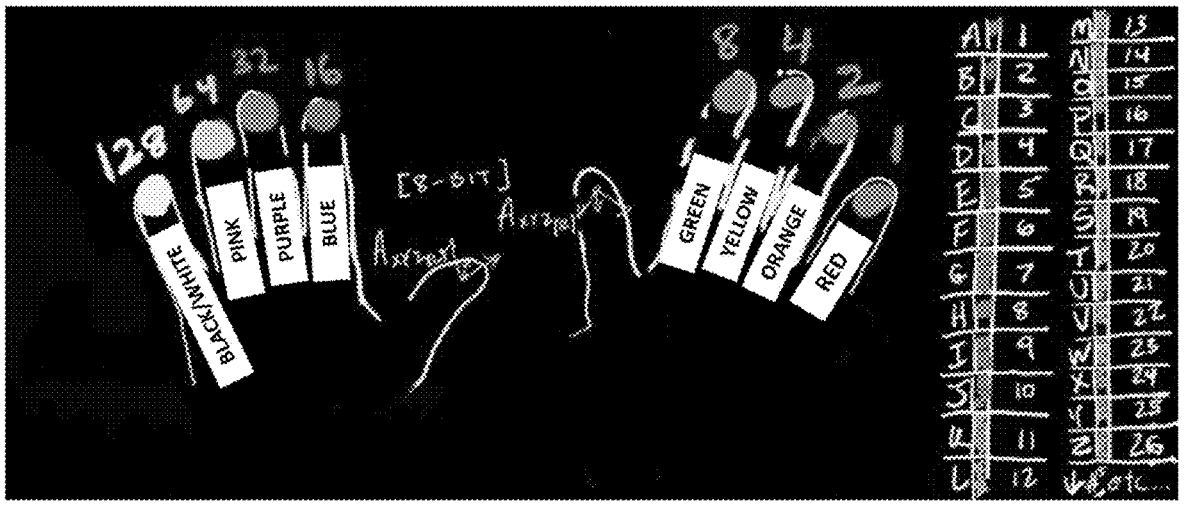

The present invention includes an example of a novel two-handed framework for operating these switches in a manner to form a wide array of English characters and computer commands is listed in FIG. 35. In this method, a Red=2$^\wedge$0=1, Orange=2$^\wedge$1=2, Yellow=2$^\wedge$2=4, Green=2$^\wedge$3=8, Blue=16, Purple=32, Pink=64, White/Black=128 framework is used by adding values associated with fingers together in order to create a desired character or computer command. The "right to left" nature of the color progression from right pinky to left pinky while looking down at the top of the hands is intended to mirror the progression of computer binary as it increases by a factor of 2. This system was arrived at from initially associating colors with fingers and 8-Bit binary values as shown in FIG. 34.

While using the present invention, a user's hands and eyes are not required to remain constrained to a stationary typing and graphical interface surface during routine data entry, such as a desk or a body part commonly used to hold or support electronics, including a user's lap or hand(s). Examples of constrained posture during routine data interface can be found in FIG. 68.

This can be achieved through many methods, two of which are head-worn displays and "heads-up" displays in visually captive situations, such as the windshield of a vehicle or a screen that is designed to stay in front of the user's gaze while the user is moving by means of robotics or other mechanisms.

Figure 69:
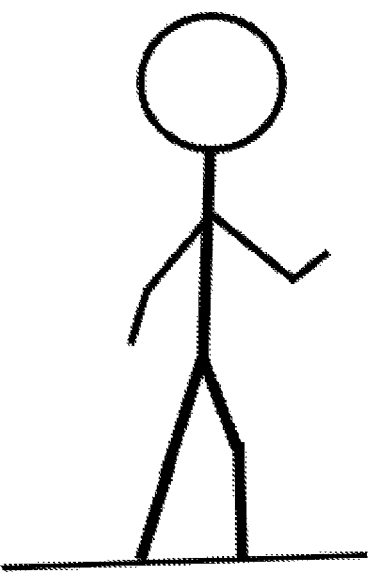

Data can be sent from the present invention by a wireless or wired means to a head-worn display or object-mounted display. In both cases, since the present invention need not be held, externally supported, or looked at during routine data interface, typing with nominal walking gait can be achieved without sacrificing the double-pendulum-like trajectory mandated by the hands during walking. FIG. 69 depicts one of many non-restrictive postures in which The Present Invention may be operated in. which Rather requiring a heads-up display, this may be achieved simply through a means of an externally supported display monitor and a treadmill.

Adjustability and Variations

While the present invention is being worn or operated by a user, each fingertip rests atop a switch cap 29. Switch positions are adjustable via individual structures relative to the palm geometry receiver by up to 9 Degrees of Freedom [DOF].

The present invention enables the fully-geometrically-defined positioning of switch cap components 29 to align to each user's fingertips. This can be defined as the alignment in:

1 distance (combined vector X Y Z coordinate distances)

6 angles relative to the palm $\alpha\beta\mu$ where the adjustable-distance structure meets the central palm part $\Theta\Phi\Psi$ where the adjustable-distance structure meets the switch holding structure Variants of the device also exist wherein any number of otherwise separate adjustable finger structures are clustered together and rigidly mounted to the palm part, either by their own individual finger structures, or a single non-consolidated structure housing all switch, sensor, and palm geometry hardware. Breaking up the structure into smaller pieces components with adjustable joints by means such as generic mechanical fasteners (screws, nuts, etc.).

While integrating adjustable components of the present invention into a singular rigid body reduces assembly time, a larger rigid body greatly increases manufacturing cost & complexity, along with the fragility and irreparability of the overall device given the potential failure of any one joint.

Any of the parts depicted in FIG. 18 and/or their associated Degrees of Freedom [DOF], which are themselves notated in the drawings, may be added, removed or rigidized relative to component 1 of the present invention (for each individual finger) using all or any combination of fused solid joints (one single rigid body part), rather than the included adjustable translational, rotational, and curved slot joints.

Figure 8:
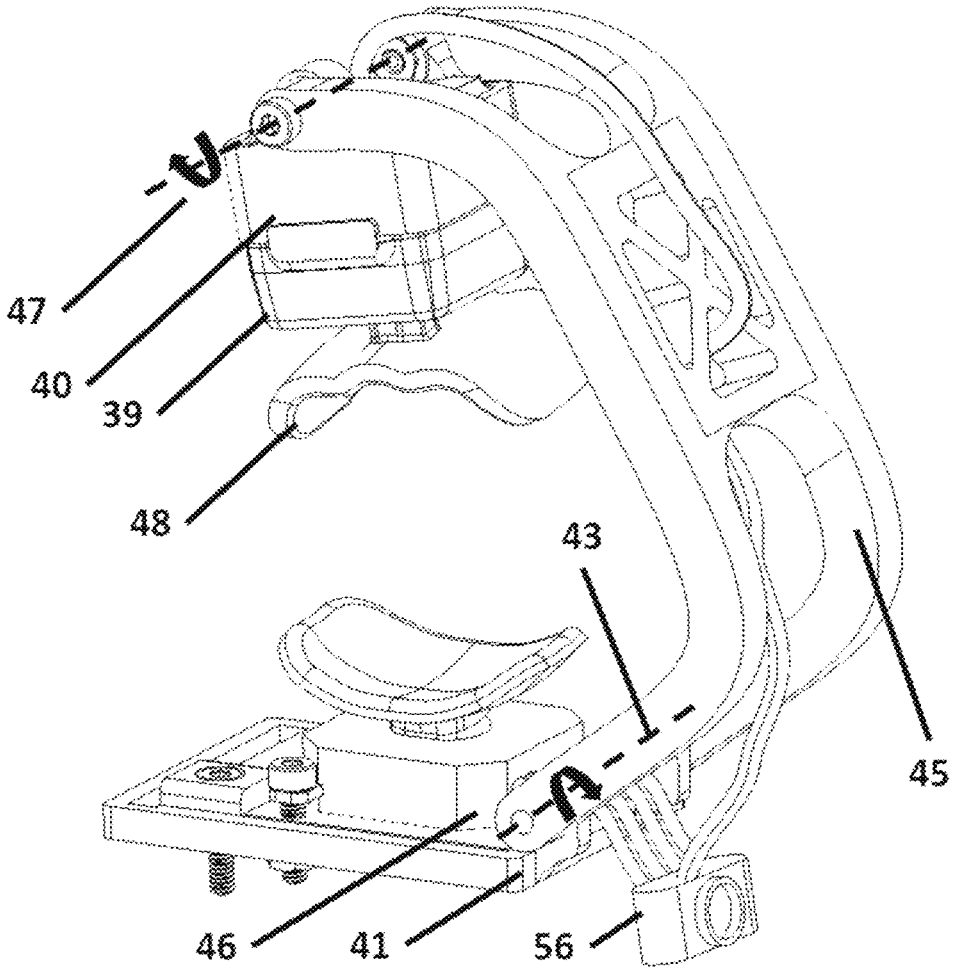
Figure 10:
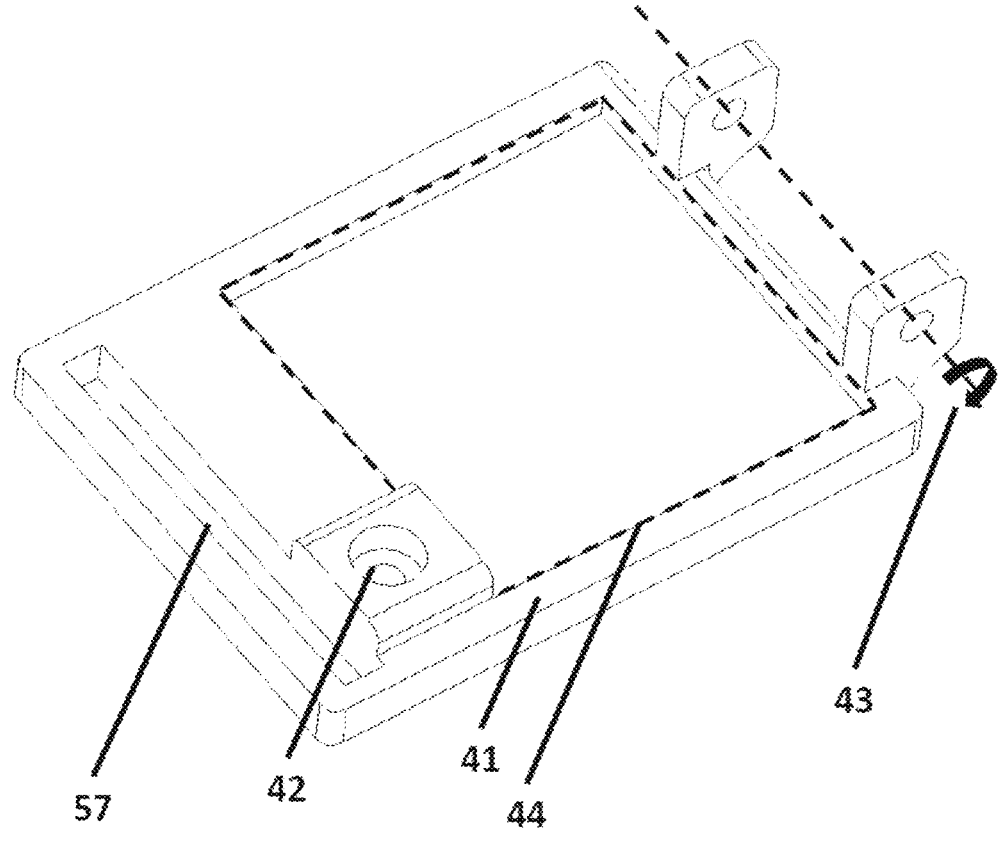
Figure 55:

The simplest variation of the finger-utilizing device exists as a four-fingered and thumb-switch assembly structure, without refreshable Braille system features 34, 35, 36 as shown in FIG. 15 overhead switch brackets 27 as shown in FIG. 18 and the associated over-finger switch-holders 40, switches 28, switch caps 29 connected to component 23, which houses switch sensors. Thumb switch structure 41 and thumb switch 46 as shown in FIG. 8 and held in place by fastening feature 42 as shown in FIG. 10 may be replaced by a rolling-in-place thumb-ball mounted above an optical sensor or touchpad analog control device as shown in FIG. 55. Additionally, a user may opt to not attach overhead thumb bracket 45 (FIG. 8) which is supporting the functionality and mass of components 39, 40, and 48 in order to reduce overall device mass and volume.

Figure 66:
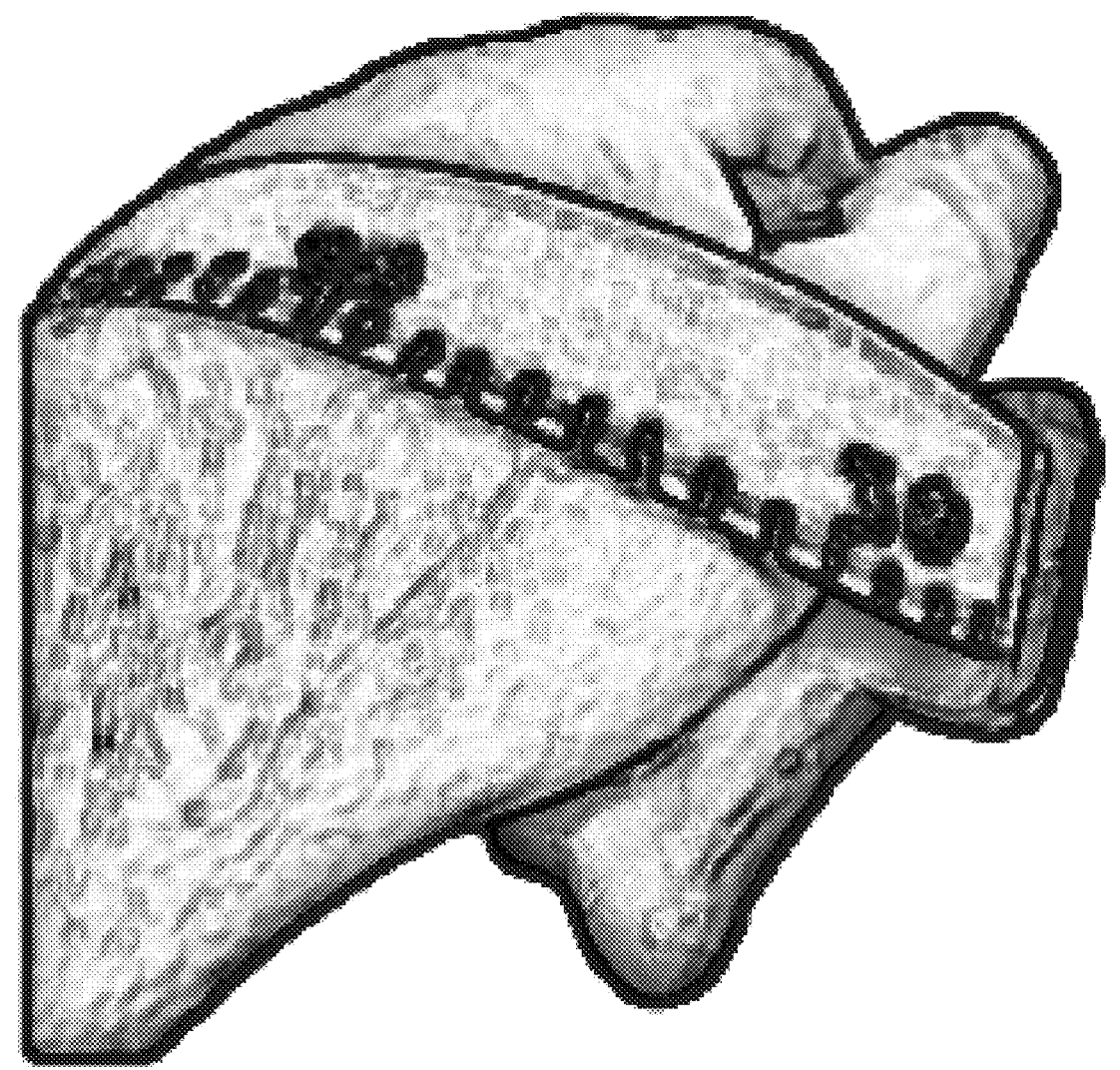

The present invention and its assembly components are manufactured in various sizes to accommodate the various size spectrum of human hands. There are multiple ways of determining the appropriately sized version of the present invention for a user's hands. A user may measure their hand relative to a known checkerboard pattern as shown in FIG. 54 by manual means or by means of optical camera hardware and the appropriate computer vision techniques. Another method consists of a palm part pre-assembled with a graduated strap of known increments as shown in FIG. 66. In this method, if a hand is either too large or too small for the part, the graduations of the strap will indicate the relative difference. This method is most useful for when the hand is too small due to the potentially elastic nature of the strap distorting the uniform graduation distances when the hand is too large.

Multiple users may be able to use a version of The Present Invention of the same size, and while some users may share an alignment of both palm size and fingertip position relative to the palm, many other users' fingertips will fall short of or over-extend the switch cap locations of a fully rigid body. As a result, this user would not ideally be able to operate such a rigid version of the present invention without either scaling the palm component and any other components of the present invention to the appropriate size

OR adjusting switch positions by means of the present invention to be discussed

OR retaking and fully defining those 7 variables relative to the palm for each fingertip location to recreate a rigid user-specific assembly that is alike to the non-adjustable assembly shown in FIG. 65.

Users may prefer to operate the present invention with a more open or closed grip for which adjustments to the switch positions and orientations may be performed. As stated, any combination of components shown in FIG. 3 may be used to form the structure connecting component 1 to component 23 in order to obtain the desired alignment of the position and orientation of switch cap component 29 with the bottoms of a user's fingertips.

DOF 61 concerns rotation of component 12 where it connects to the central palm part 1. This rotation is about an axis that may be formed looking down at the top of the hand. The constraints/boundary conditions of this degree of freedom are dictated by the location of attachment features on component 1.

While a continuous slot between or additional adjustment of component 1's mounting points may seem useful, the spacing/locations of component 12 relative to component 1 is primarily dependent on the size of the user's palm. The addition of this continuous slot feature would result in an available adjustment that would be low in effectiveness relative to the user switching to another size of the present invention's central palm part. Lateral positioning of these components can be achieved with DOF 14.

Figure 31:
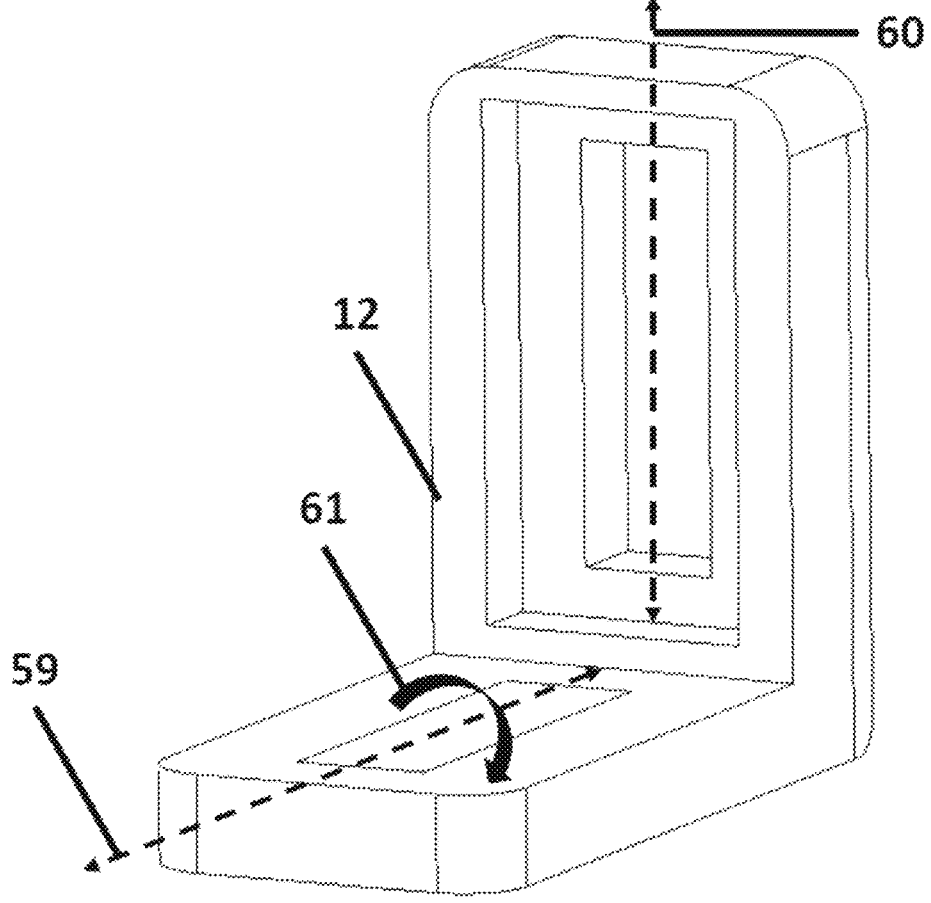

DOF 59 and 60 are separate orthogonal translational degrees of freedom as shown in FIG. 31. DOF 59 is between component 1 and component 12, whereas DOF 60 is between component 12 and component 13. These DOF features regard translation of the end switch holder/switch cap position in a direction toward or away from the central palm part in these two separate orthogonal directions.

DOF 14 concerns the adjustable positions of part 13 relative to part 12 within a curved/curvilinear slot and rotation about an axis positioned perpendicularly to the centerline of said slot. Although the mounting surfaces 5 on the central palm part 1 are already angled separately/differently to reflect the angle each human finger is attached to the human hand, this DOF helps adjust minor distance and roll variance between a user's fingers.

DOF 15 concerns rotation of part 16 relative to part 13. This degree of freedom can best be described as a primary finger curl adjustment relative to the main palm component 1. A user can adjust this joint by rotating 16 up or down in order to operate the device with a more flat or closed hand posture, respectively.

DOF 17 concerns translation of component 19 relative to component 16. This degree of freedom can best be described as a secondary finger length adjustment. It accounts for the variance of fingertip lengths of both the same user and between multiple users. In the event of a user with a large hand with relatively short fingertips, component 16 may be omitted in lieu of a wider-jointed version of component 19 at DOF 15.

DOF 20 concerns rotation of component 21 relative to component 19. This degree of freedom can be described as a secondary curl or fingertip curl adjustment.

DOF 22 concerns rotation of component 23 relative to component 21. This degree of freedom can best be described as a fingertip yaw adjustment and defines the position of components 27, 29, 39, 40.

DOF 25 concerns rotation of refreshable braille cell bracket 30 relative to switch holder component 23. This DOF allows an adjustment of the refreshable braille cell holder component 34 toward or away from a user's fingertip. Braille Bracket 30 was designed to be configured in assembly with or without overhead bracket 27.

DOF 26 concerns rotation of overhead bracket component 27 relative to switch holder 23. This DOF allows for a relative adjustment of overhead switch cap components toward or away from the tops of the fingers DOF 33 concerns rotation of refreshable braille cell holder component 34 relative to braille bracket 30. This DOF is primarily incorporated to account for variance in Fingertip height and/or preferred Braille reading location.

DOF 37 and 38 concern rotation of overhead switch holders 40 and their associated switch caps 29 relative to overhead bracket 40. These DOF allow for optimal striking orientation of switch caps for a user's finger flick and finger curl operations.

These adjustable degrees of freedom ensure that fingertips are directly above and below the switch cap for each of the four fingers (index, middle, ring, pinky) in an orientation consistent with the natural posture of each fingertip.

Atop each switch holder component 23 is inserted a switch cover 39, into which LED lights or miniature vibration motors can be integrated for user feedback and enjoyment.

By adjusting and capturing optimal terminal fingertip position (switch holder profile feature 24 within switch holder component 23) when the hand is at rest, "other finger related hardware", such as the overhead bracket 27, is automatically located and oriented when a user chooses to attach said hardware to the available mounting features on component 23.

Any switches included in the assembly of the present invention can be configured to be digital or analog sensors according to user preference. For example, it is most feasible to implement 2-D analog switches within below-finger/thumb switch holding component 41 (Thumb) and component 23 (Fingers) rather than use 2-D switches on any of the overhead locations. It is difficult if not impossible for certain users to use certain combinations of overhead switches simultaneously with one or multiple fingers due to a user's physiological constraints. Certain finger structures may be configured to contain component 27 on the same hand (device) while other fingers are configured to be without component 27.

Like the overhead bracket structure 27 and the switch holders 40 it contains, a user of the present invention can opt to include or not include via modular detachment programmable/refreshable Braille output and input cell assemblies 34. This refreshable braille cell is held in place via a braille bracket component 30 attached to switch holder component 23. This braille bracket component contains a cutout feature 32 to allow for a pass-through of overhead bracket 27, which can provide extra support for both brackets. However, a user may choose to integrate the structures for components 27 and 30 into each other or directly into component 23.

These refreshable braille mechanisms are controlled by a centralized or localized fluid or electric drive system, comprised of active and passive valves and/or motor elements. These systems allow each braille "dot" to protrude from or remain recessed behind the braille cell's reading surface through means of individually contained dot missile elements shown as component 35 in FIG. 13. These systems exist as pneumatic (air operated), hydraulic (fluid operated) or driven by individual electromagnetic solenoids. The control systems may be located within the braille cell, mounted to the overhead or braille bracket components, or housed within the main electronics module.

In addition, or alternatively to being mounted on braille bracket component 30 in front of each switch cap, these refreshable braille cell systems may also be integrated into the switch caps themselves. The drawback to this switch cap-integrated method of Braille integration exists in the necessary depth under the user contact surfaces needed to house the refreshable Braille's structure and mechanisms.

Figure 33:
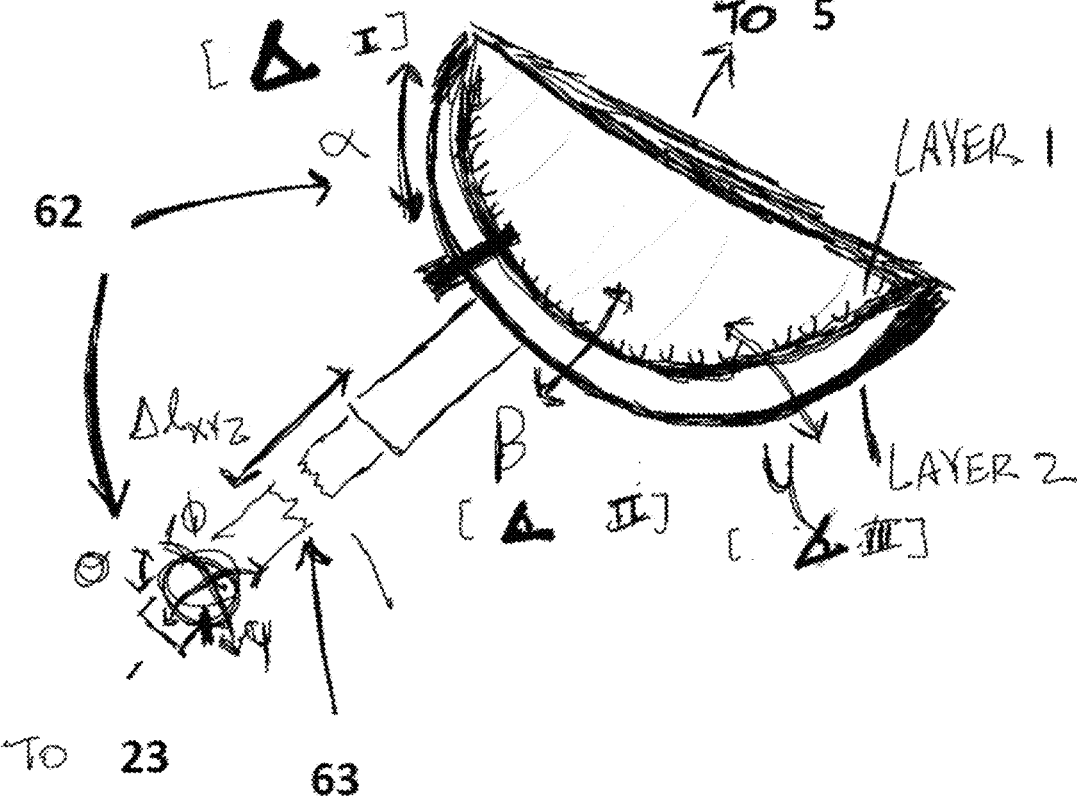

A variant of the switch holder position and orientation mechanisms shown in FIG. 18 is shown in FIG. 33. Just like the adjustment structure shown in FIG. 18, each adjustable finger switch holder assembly serves to connect finger attachment features 5 of component 1 to switch holder components 23 of the present invention. The switch holder adjustment mechanisms present in FIG. 33 uses a different set of hardware to account for the 7 to-be mentioned necessary variables to fully define finger-tip switch locations and orientations. This is to allow the greatest degree of adjustment using the least number of individual adjustments from the user.

This consists of:

tighten-able spherical ball joint component 62 connecting a telescopic rod component 63 to palm component 1
Allows for adjustment of angles [$\alpha$, $\beta$, $\mu$] as shown in FIG. 33 adjustable-length telescopic rod component 63 connecting ball joint component 62 to another spherical joint
Allows for adjustment of $\Delta l_{XYZ}$ as shown in FIG. 33 second spherical ball joint component 62 connecting component 63 to a variant of switch holder component 23
Allows for adjustment of angles [$\Theta$, $\Phi$, $\Psi$] as shown in FIG. 33

Figure 32:
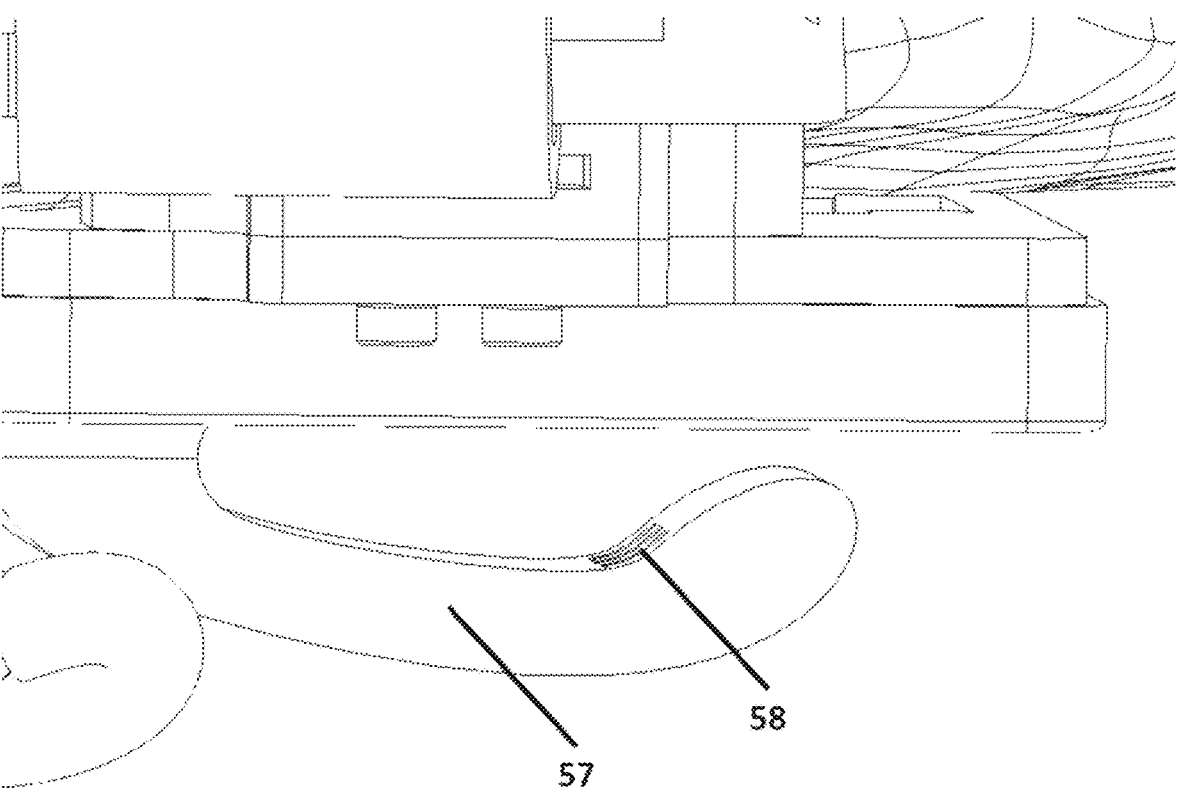

In order to put on (start wearing) and take off (stop wearing) the present invention without the use of another hand, a grappling hook component 57 as shown in FIG. 32 is optionally integrated into the underside of component 1 or component 50. This grappling hook is received by a docking mate with a like [mirrored geometry to receive the hook] docking receptacle and charging terminal with mating charging contact features 58. This receiver is designed to be mounted on the top or underside of a desk. This grappling hook charging receiver may alternatively clip onto a user's pants or belt/. In this manner donning/doffing of the present invention may take place on that user's front, back, or sides.

SUMMARY OF FIGURES/PAGES

FIG. 1: Right perspective view of "FCLHV" of the present invention

Figure 2:
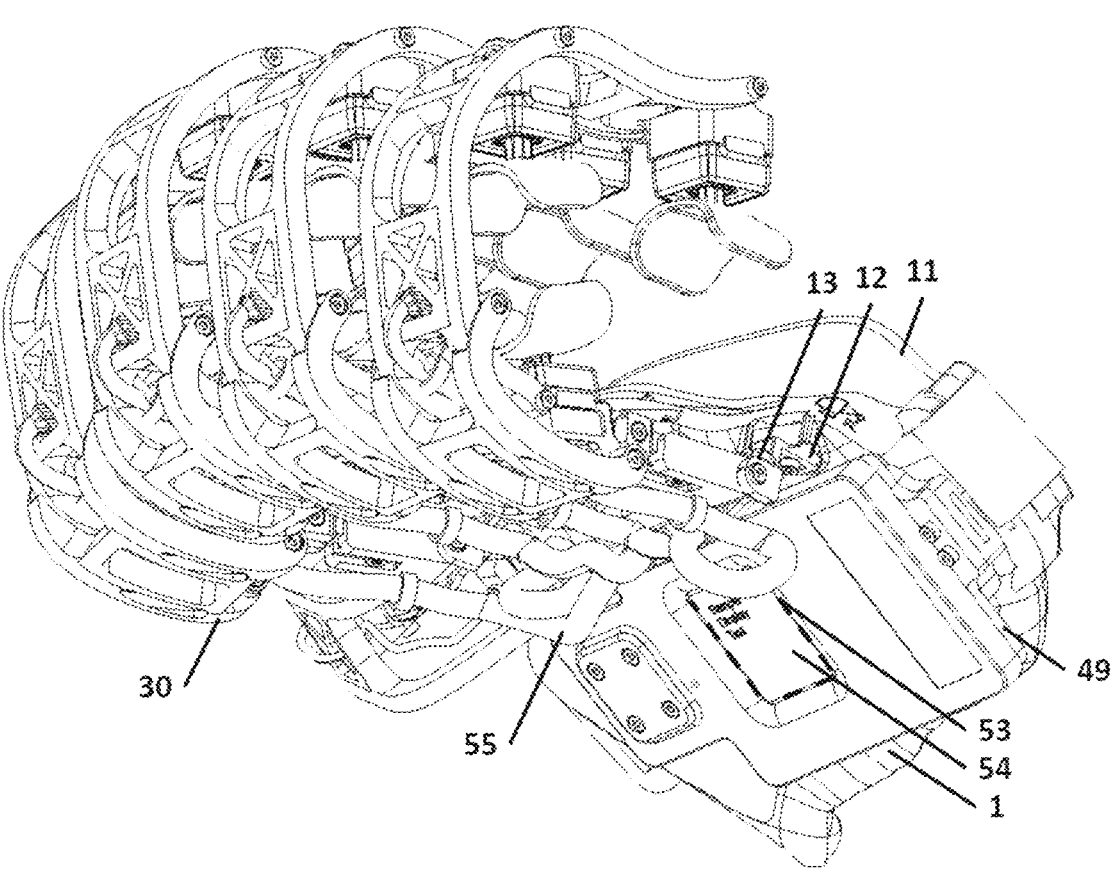

FIG. 2: Bottom-Left-Front Perspective View of "FCLHV" of The Present Invention.

Figure 3:
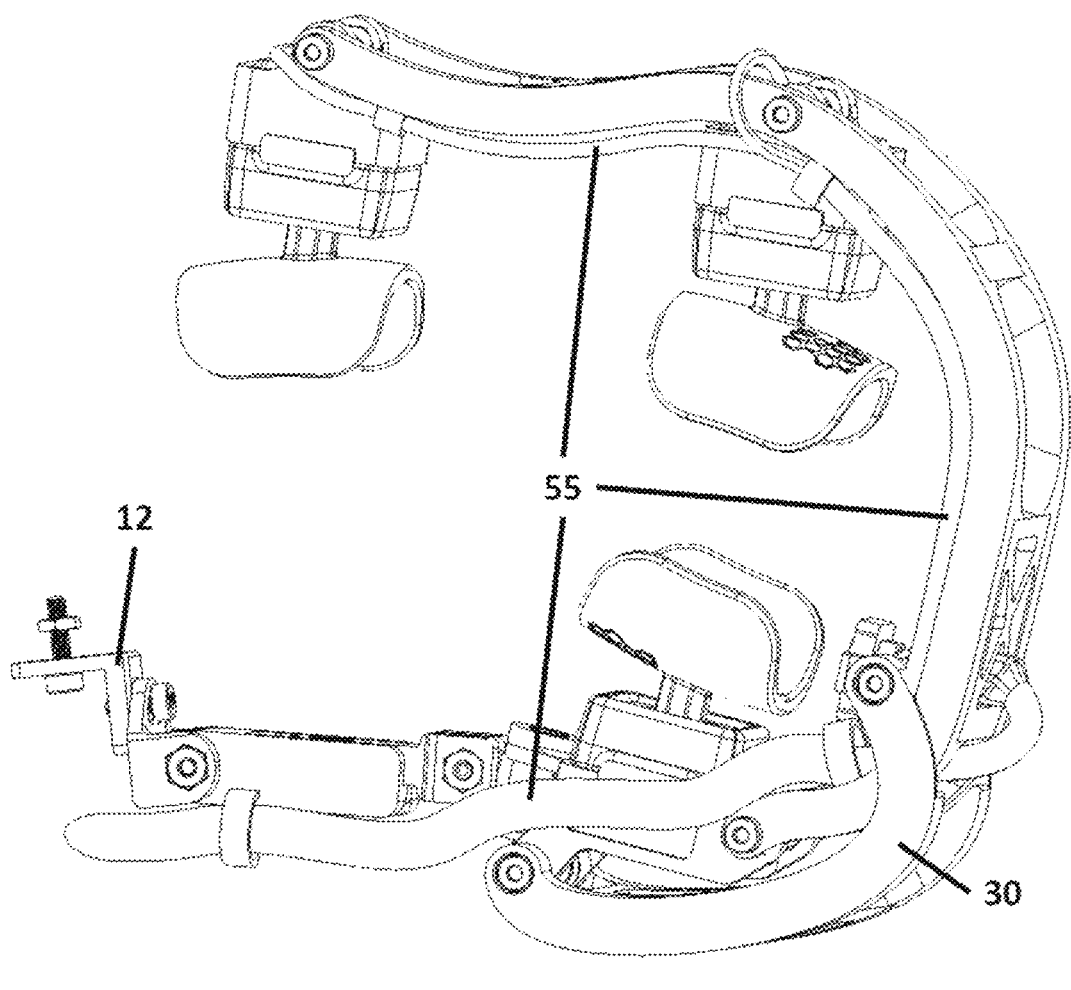

FIG. 3: Shows a Right Perspective View of Individual Finger's Adjustable Switch Holder Assembly. Colors of components depicted in FIG. 3 is for contrast purposes only. Device color is a user preference, although its use as a learning tool wherein certain components of all 8 of these subassemblies are colored differently for each of a user's 8 fingers as shown and discussed in FIG. 35. Electronics harnessing for this assembly is noted as component 55.

FIG. 4: Shows a Rear View of "FCLHV" of The Present Invention.

FIG. 5: Shows a Generic "Smart" Electronic Device with Sample Display Text.

FIG. 6: Shows a Retainer Lid for Electronics Module for the Present Invention with attachment features 52 and electronics terminal ports 51.

Figure 7:
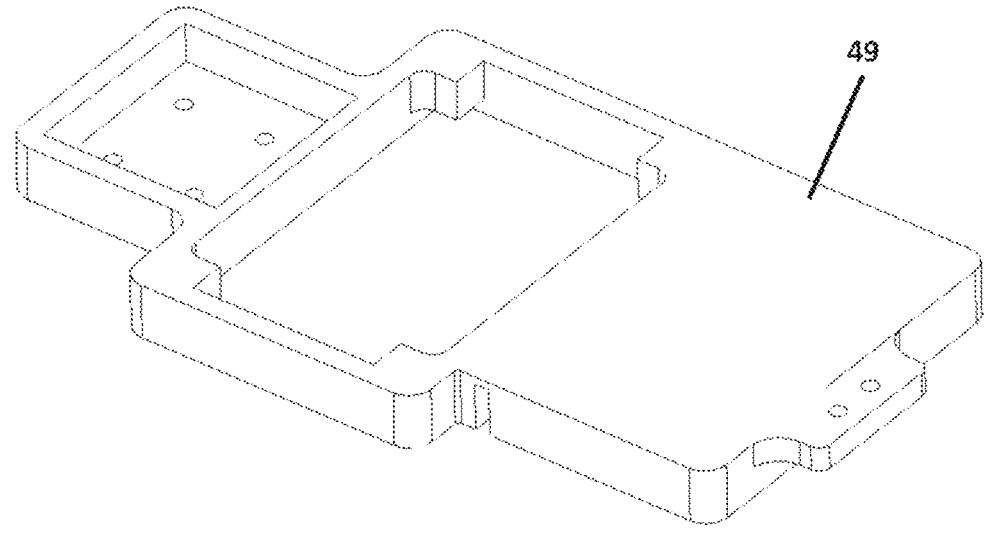

FIG. 7: Shows an Example of an Electronics Module Able to be Used in The Present Invention.

FIG. 8: shows a thumb switch holder assembly of The Present Invention with overhead thumb bracket 45 which may be adjusted relative to thumb switch holder component 41 (which is using DOF 43. Overhead thumb switch component 40 and it's associated switch cap 48 can be rotated relative to component 45 using DOF 47. Electronics wiring assembly 56 provides power and data communications to this subassembly.

Figure 9:
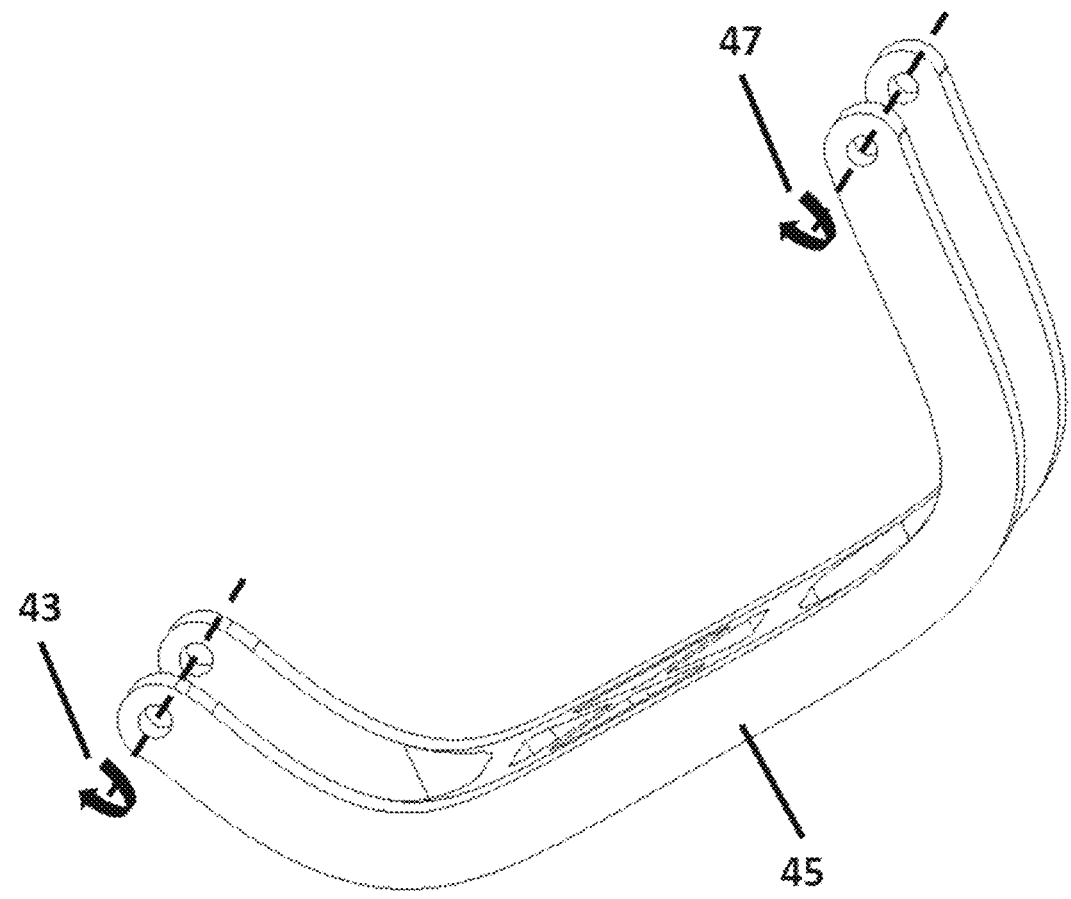

FIG. 9: Shows Overhead Thumb Switch Holder Bracket 45 along with functional degrees of freedom 43 and 47 as they pertain to the overall assembly.

FIG. 10: depicts component 41 used to mount thumb switch sensors and to accommodate attachment material 11 at feature 57.

FIG. 11: Depicts Alternate Switch Holder 40 with switch mounting profile 24.

FIG. 12: depicts a detachable cap to cover switch sensors which may contain lighting and vibration components.

Figure 13:
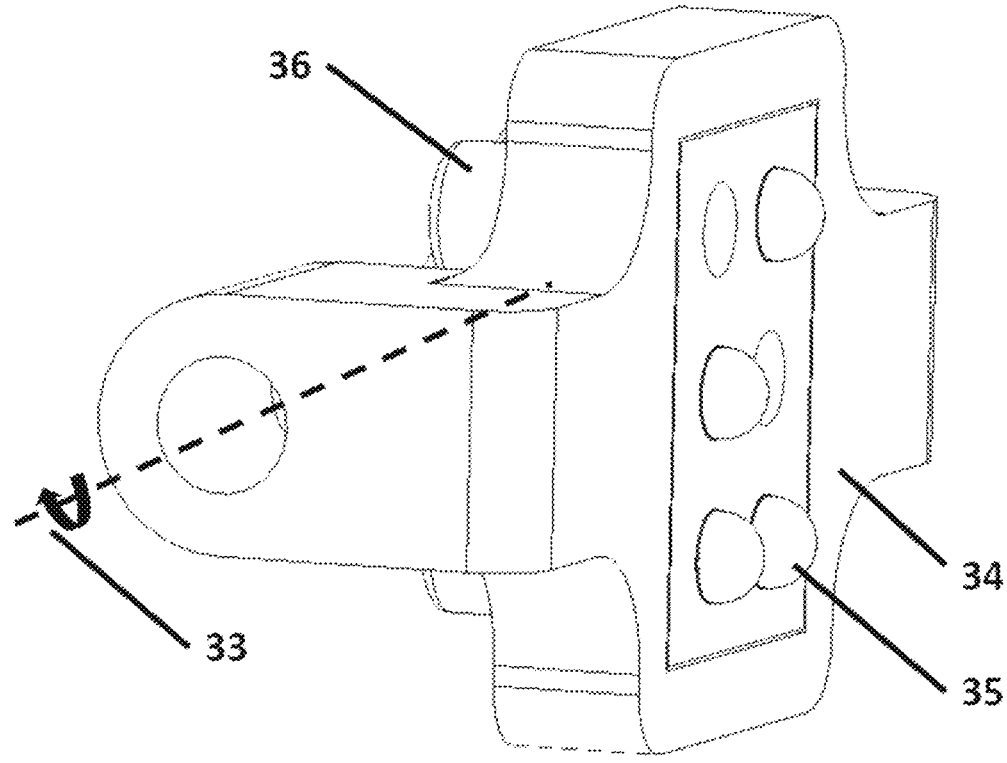

FIG. 13: depicts an [optional] refreshable braille cell with individual "dot" elements 35 housed within cylinders 36.

Figure 14:
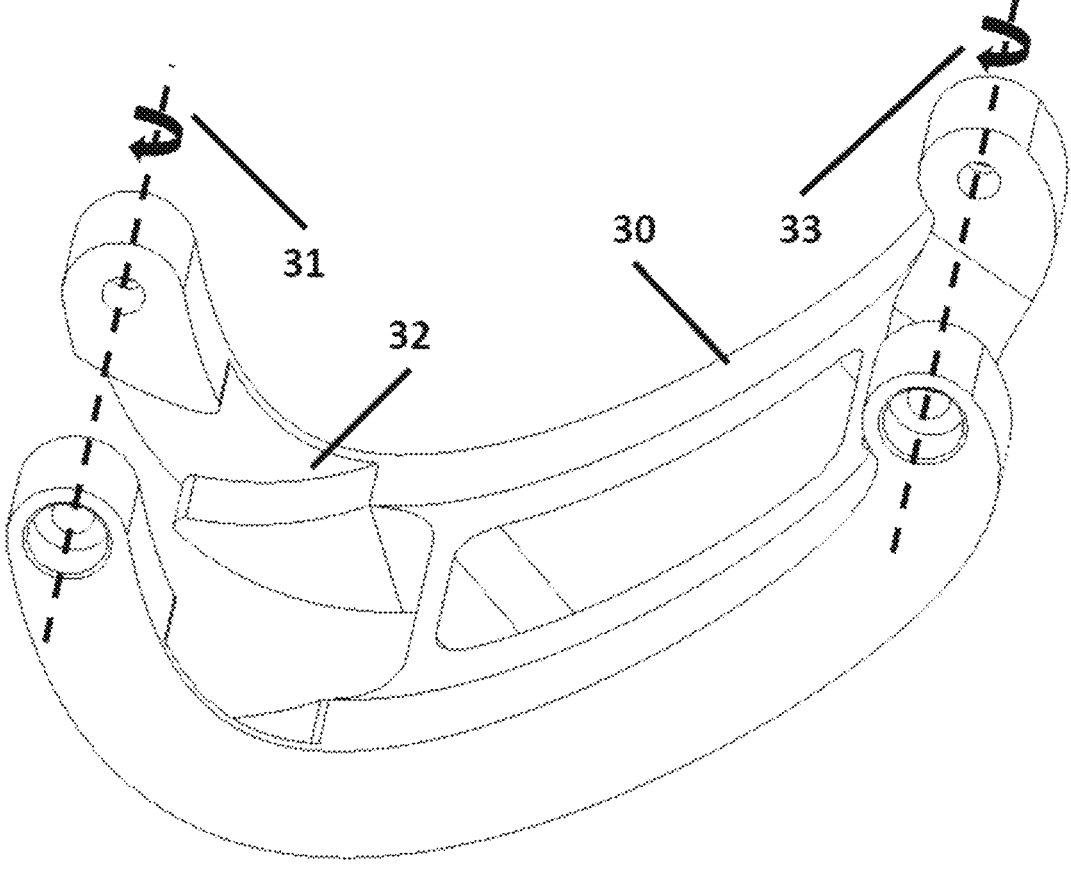

FIG. 14: Depicts Bracket 30 used to connect refreshable braille cell holder 34 to switch holder 23.

FIG. 15: depicts a swept parabolic profile used in switch cap component 29.

FIG. 16: depicts examples of a generic 2-Dimensional and/or 1-Dimensional switch sensor and removable switch cap.

Figure 17:
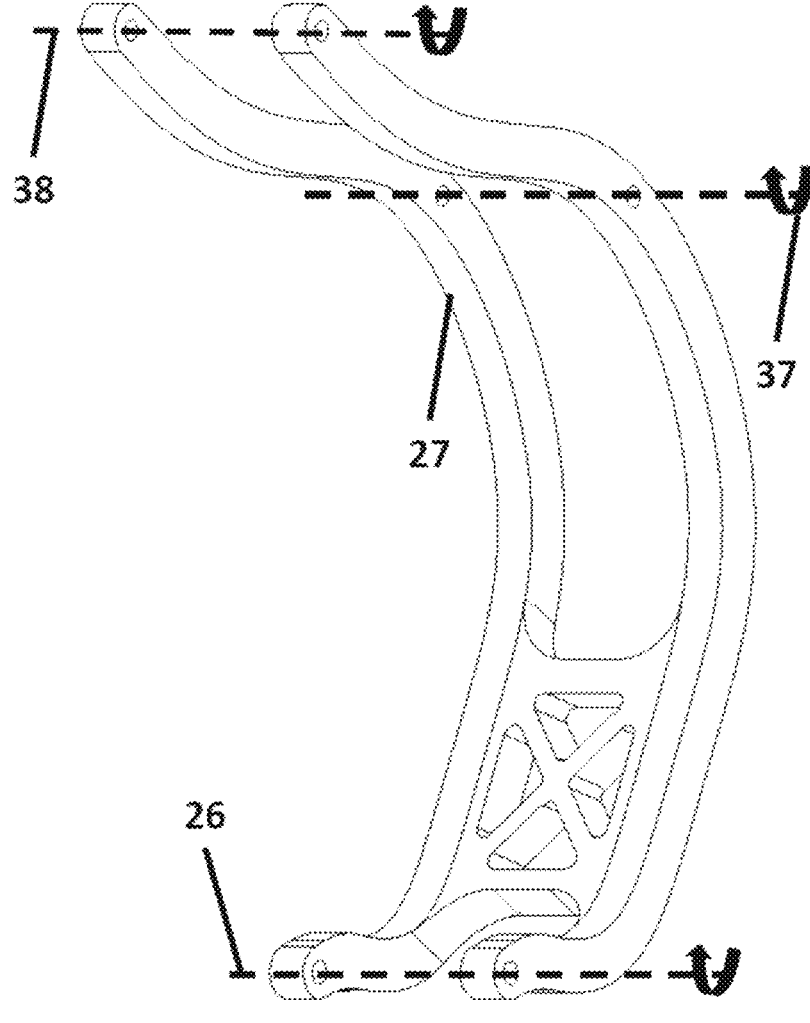

FIG. 17: depicts [optional] overhead switch sensor bracket 27 and its adjustable/functional degrees of freedom.

FIG. 18: depicts a fully configured adjustable switch sensor assembly for a single finger, minus wired electrical connections. Bracket components 27 and 30 may be easily detached according to user preference.

FIG. 19: depicts switch sensor holder 23 and its adjustable functional degrees of freedom.

Figure 20:
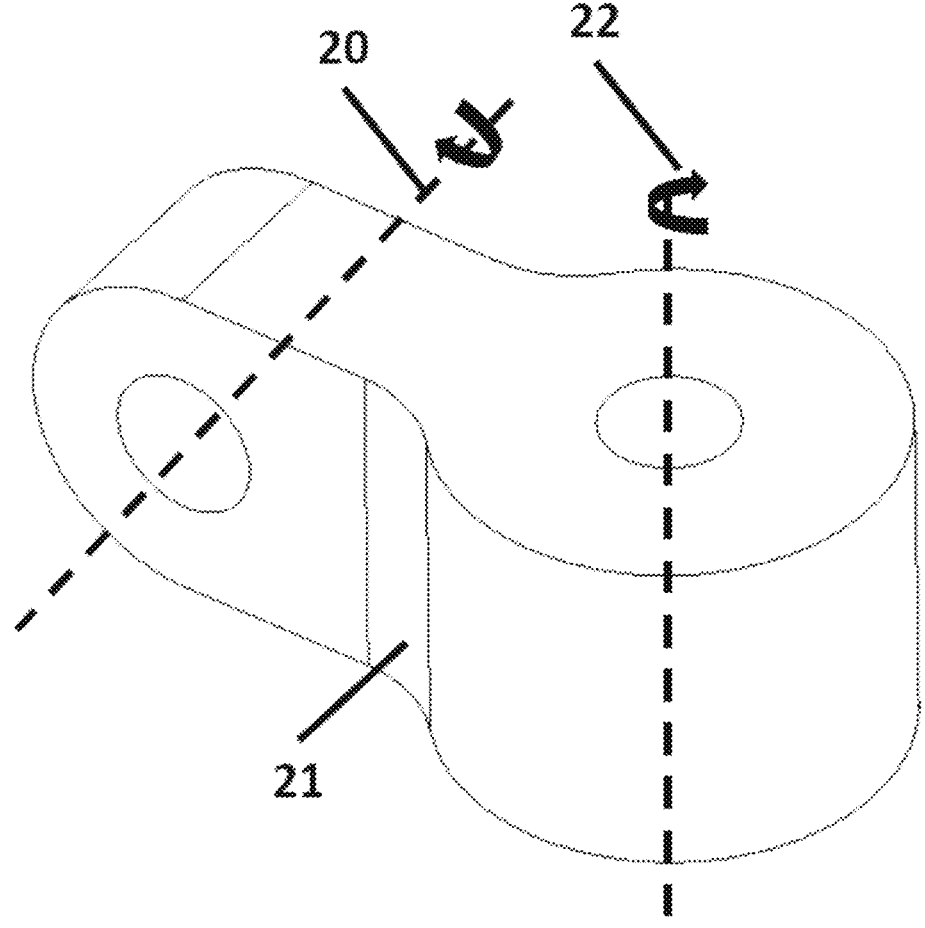

FIG. 20: depicts adjustable element 21 which connects 16 to 23, allowing for curl adjustment with DOF 20 and yaw adjustment with DOF 22.

Figure 21:
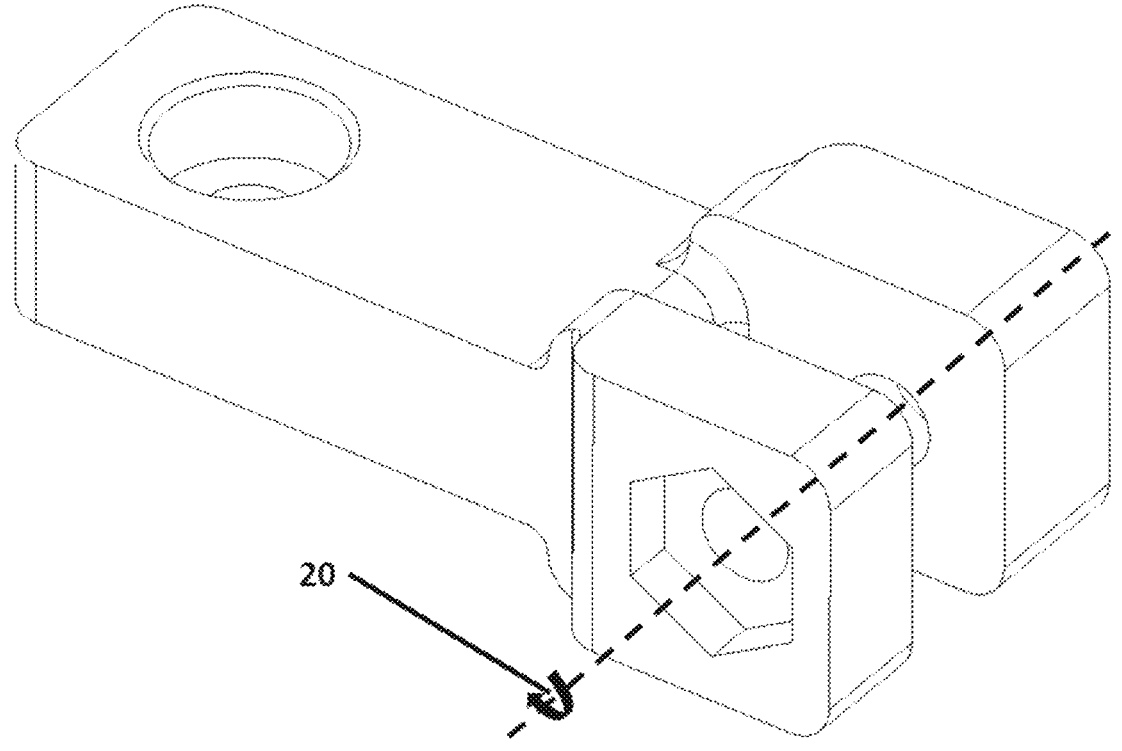

FIG. 21: depicts component 19 which connects to 16 along DOF 17 and to 21 with DOF 20.

Figure 22:
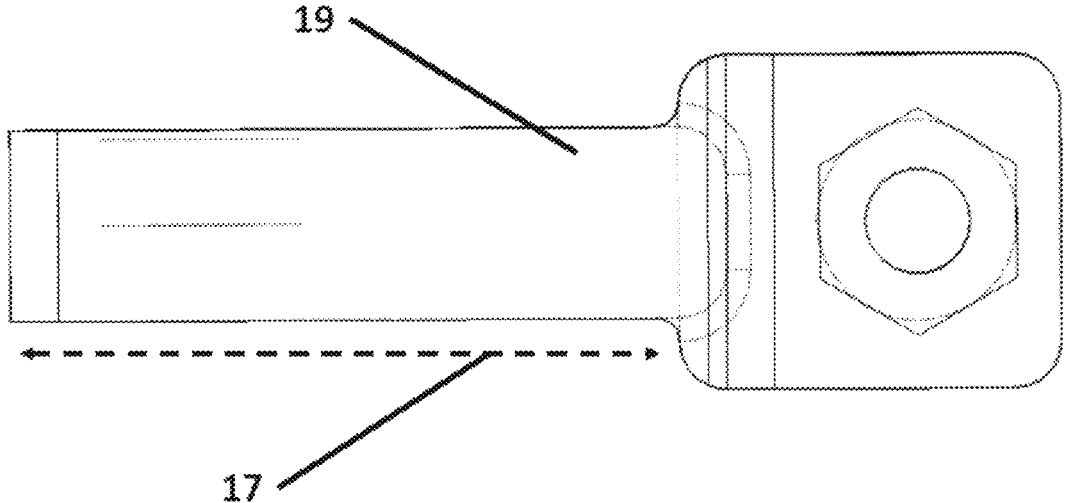

FIG. 22: depicts component 19 and degree of freedom 17.

Figure 23:
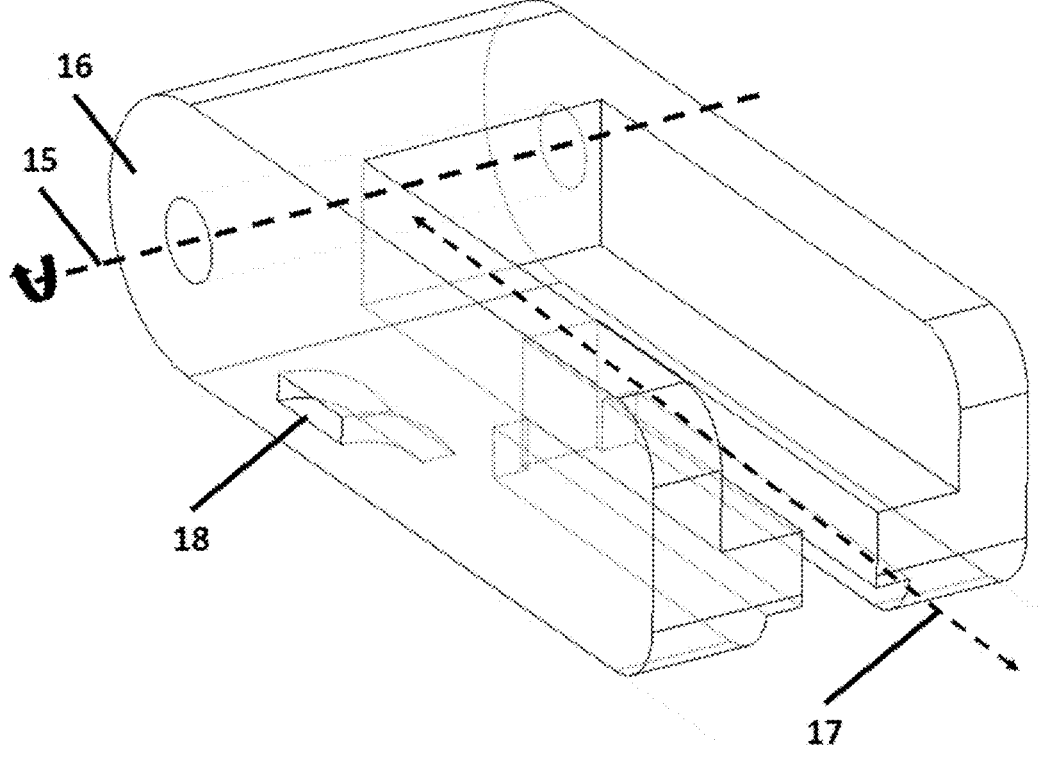

FIG. 23: depicts component 16, cable tie pass-through feature 18, and degrees of freedom 15 and 17.

Figure 24:
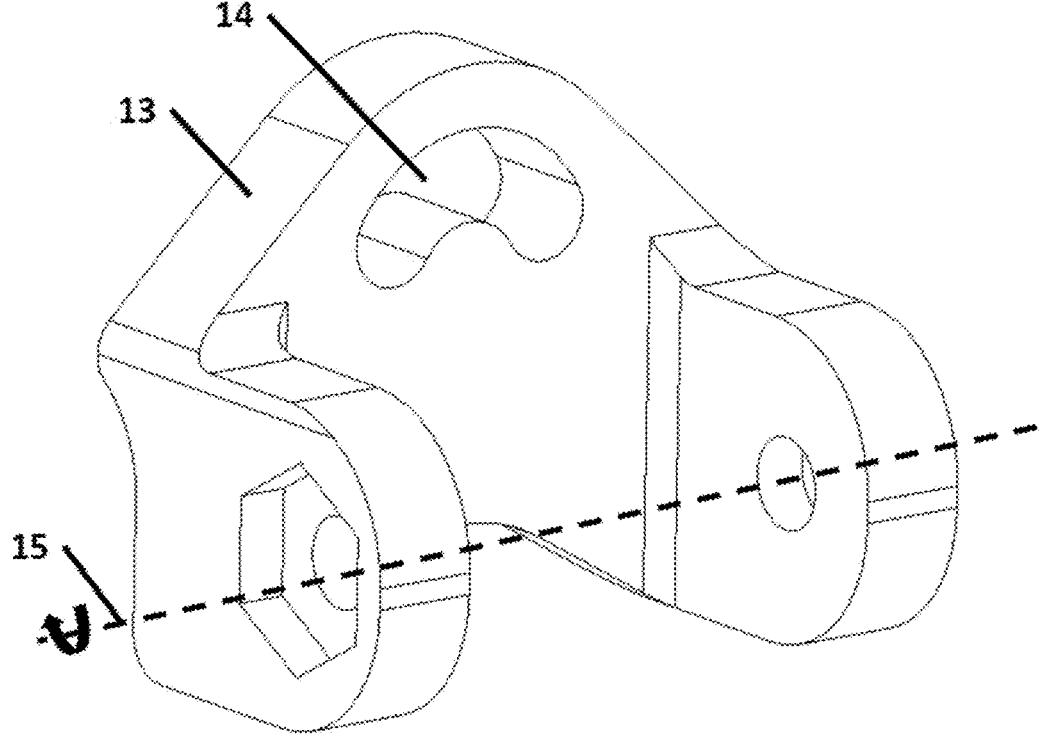

FIG. 24: depicts component 13, connected to component 12 along DOF 14 and to component 16 along DOF 15.

Figure 25:
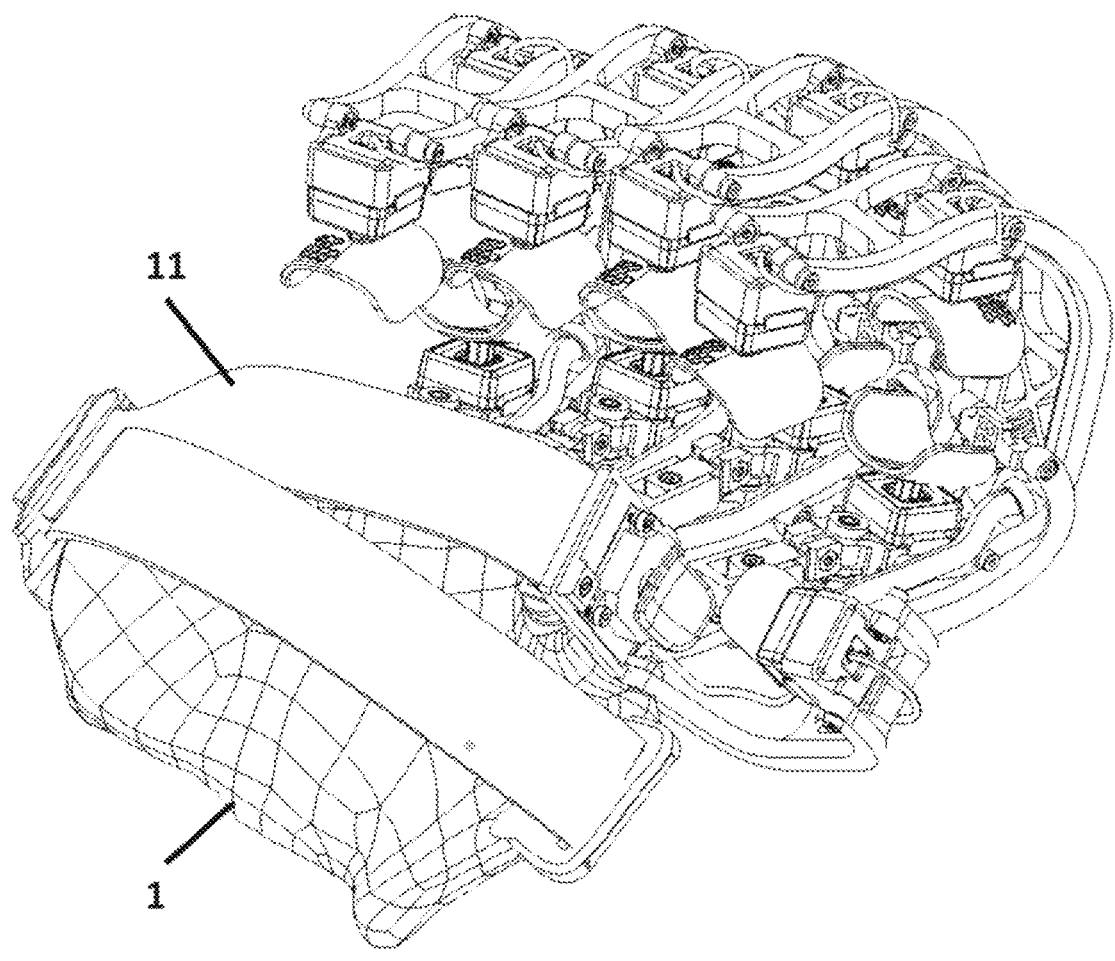

FIG. 25: depicts a Top-Right perspective view of FLHCV.

FIG. 26: depicts a frontal view of component 1 with complex palm surface geometry 2, nut retainer features 10, and orthogonal centerlines with varying angles labeled by 6.

FIG. 27: depicts a bottom perspective view of palm component 1 with strap attachment features 4, electronics assembly fastening 7 and nut retainment features 8.

Figure 28:
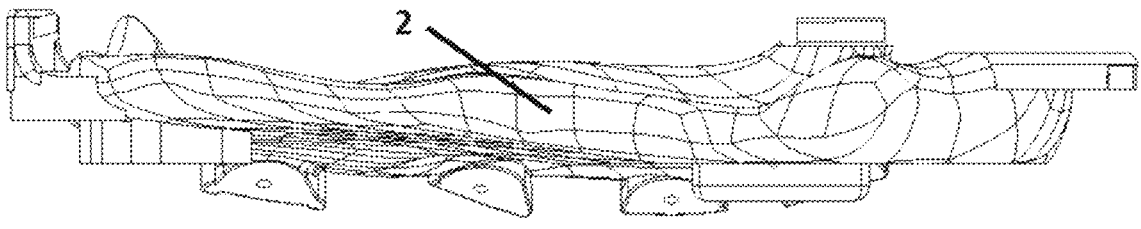

FIG. 28: depicts a rear view of component 1 with complex palm surface geometry 2.

FIG. 29: depicts palm component 1 with front (finger interfacing) edge 3, thumb switch holder attachment feature 9 complex palm surface geometry 2, and strap attachment features 4.

FIG. 30: depicts component 2, front finger interfacing edge 3, attachment features 5 for components 12.

FIG. 31: depicts component 12 which interfaces with attachment features 5 on component 1 with rotational degree of freedom 61 and translation degree of freedom 59. Translational degree of freedom 60 interfaces with component 13.

FIG. 32: depicts grappling mechanism 57 and charging contacts 58.

FIG. 33: depicts an example of an adjustable mechanism by which two spherical ball joints 62 (one attached to component 1 at attachment feature 5, another affixed to component 23) are used in conjunction with a hand-adjustable telescopic rod 63. This subassembly is purposed to limit the number of potential component adjustments/replacements/removals required by a user in order to fully define the terminal switch holder position and orientation profiles 24 for a given user's fingertips, though is more difficult to manufacture than the assembly shown in FIG. 18.

FIG. 34: Depicts a System Utilizing Colors and Binary to interface with data using 8 fingers.

FIG. 35: Depicts an example of modified system with which humans can interface with data using 8 fingers. While device color is a user preference, systems such as this may be more easily learned wherein each adjustable finger switch holder subassembly is colored with respect to the associated finger.

Figure 36:
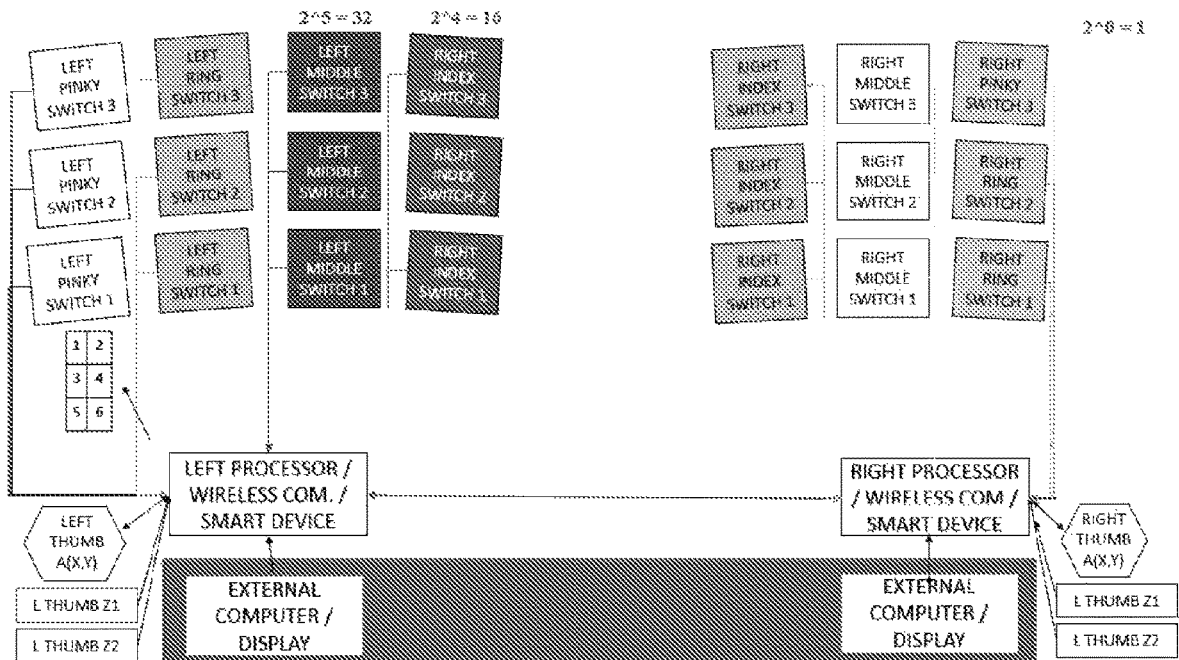

FIG. 36: Depicts a System Block Diagram of the Present Invention.

FIG. 37: Depicts a Molded Hand-Made Sculpture Along with Cutting Tool and Scrap Material.

FIG. 38: Depicts a Human Hand Wearing a Rigidized Version of the Present Invention with conventional key caps.

FIG. 39: Depicts a Rigidized version of the Present Invention without electronics or overhead switches attached.

FIG. 40: Depicts verification of optimal hand position and fingertip location+orientation. Modeling clay is added and removed around and between the palm and fingertip switch holder components relative to a level surface.

Figure 41:
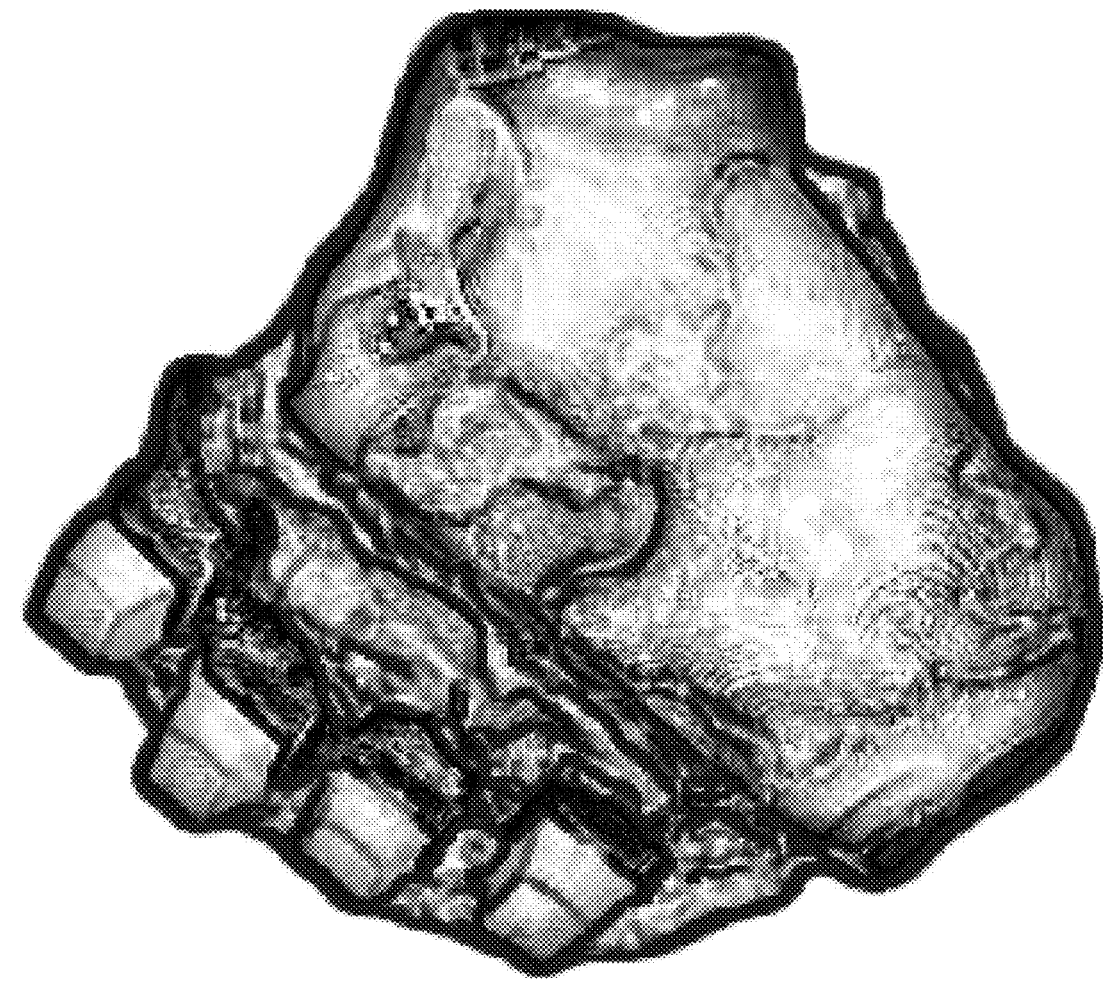

FIG. 41: Depicts Optimal Hand Interface Geometry Sculpture.

Figure 42:
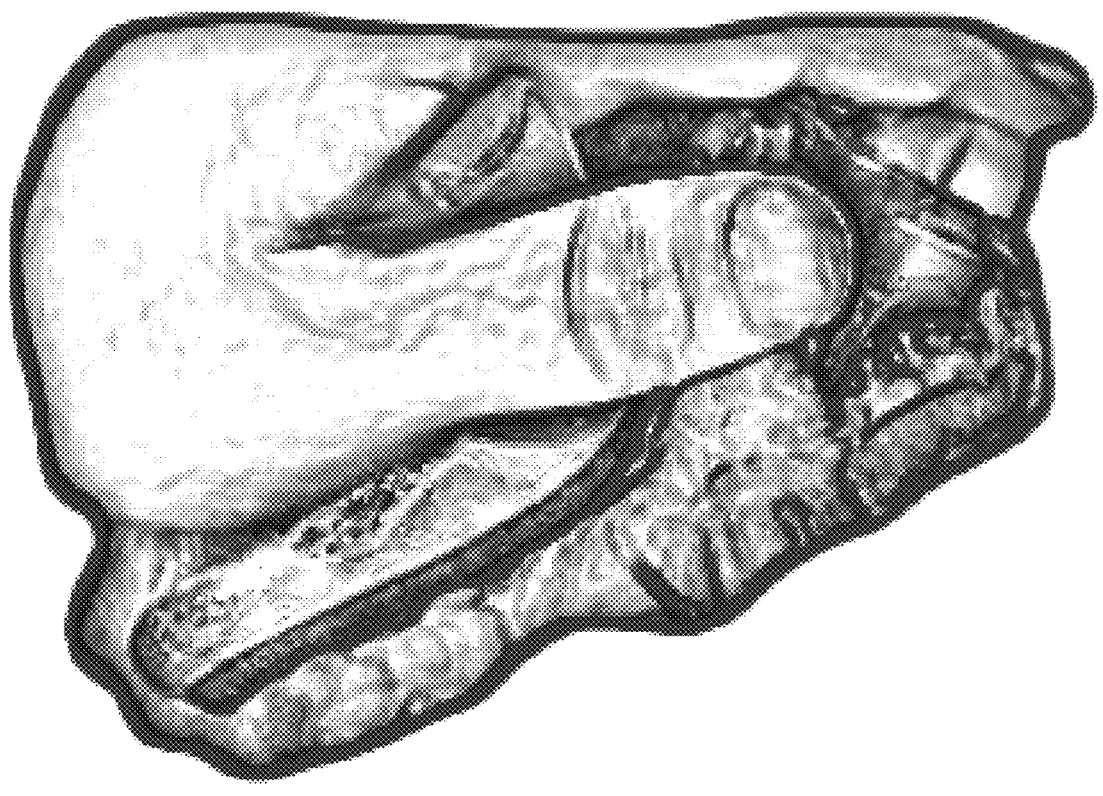

FIG. 42: Depicts verification of optimal hand position and fingertip location+orientation during formation of Optimal Hand Interface Geometry Sculpture.

FIG. 43: Depicts harnessing test of manufactured palm geometry sculpture.

FIG. 44: Depicts harnessing test of manufactured palm geometry sculpture.

Figure 45:
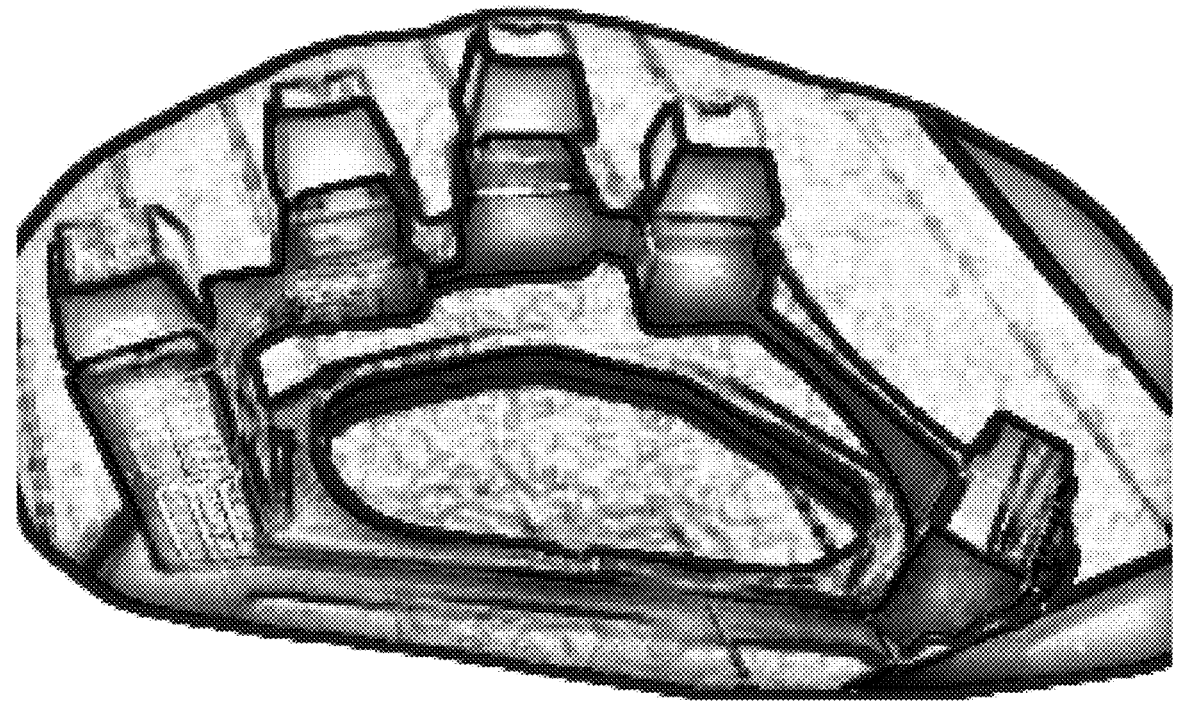

FIG. 45: Depicts Desk-Based Version of Optimal Finger and Thumb Switch Geometry.

Figure 46:
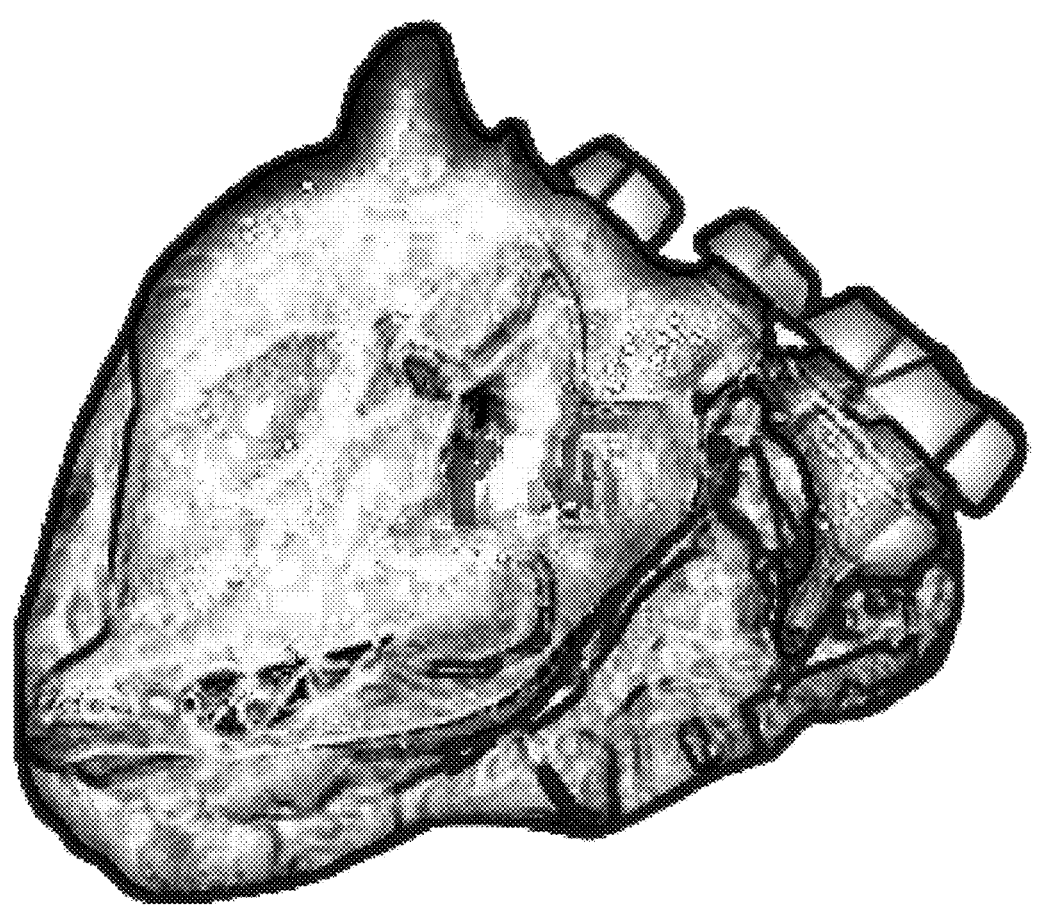

FIG. 46: Depicts verification of optimal hand position and fingertip location+orientation during formation of Optimal Hand Interface Geometry Sculpture.

Figure 47:
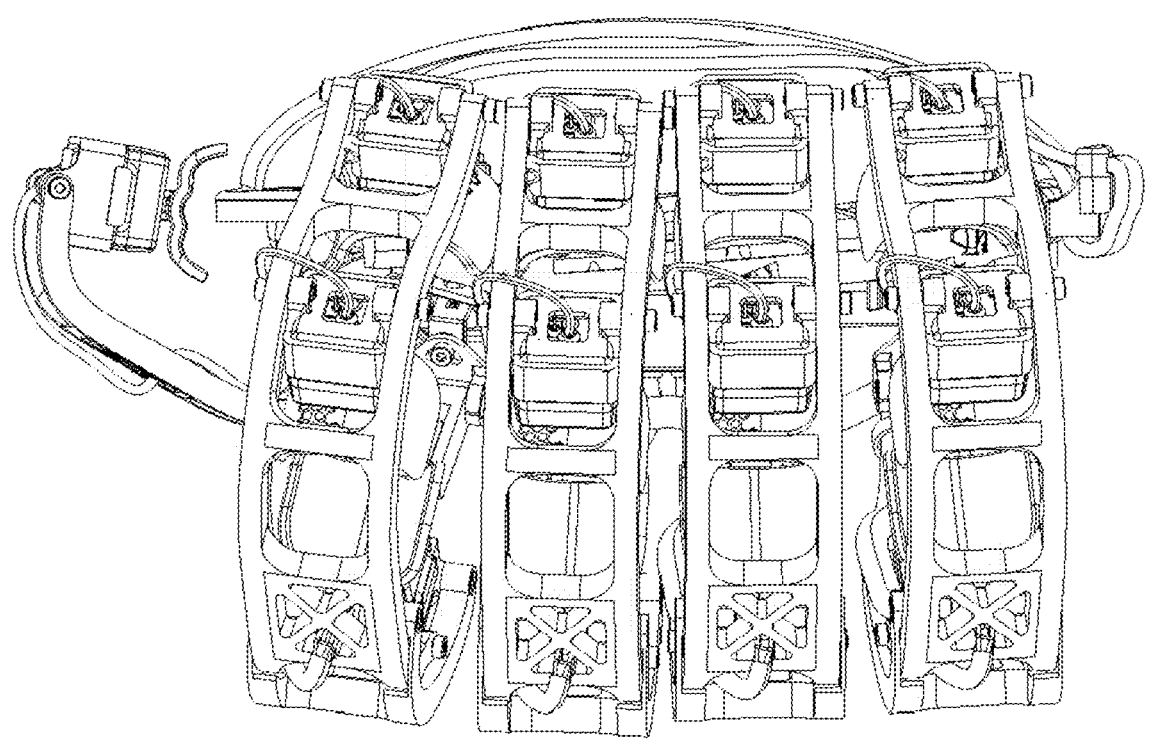

FIG. 47: Depicts front view of fully configured left-handed version

FIG. 48: Fingertip position measurements.

Figure 49:
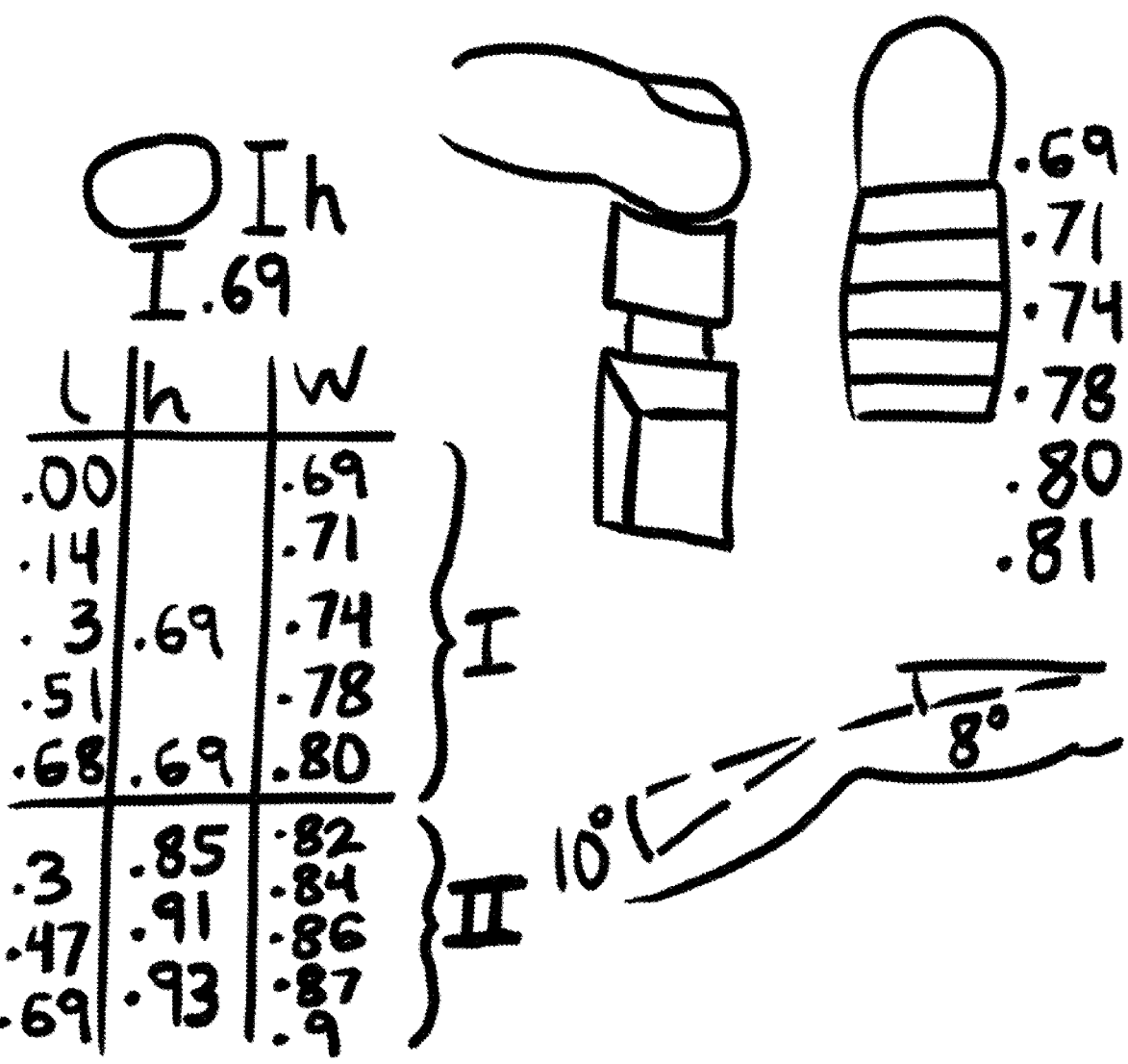

FIG. 49: Depicts Measurements of the Index Finger at Marked and Measured Intervals.

Figure 50:
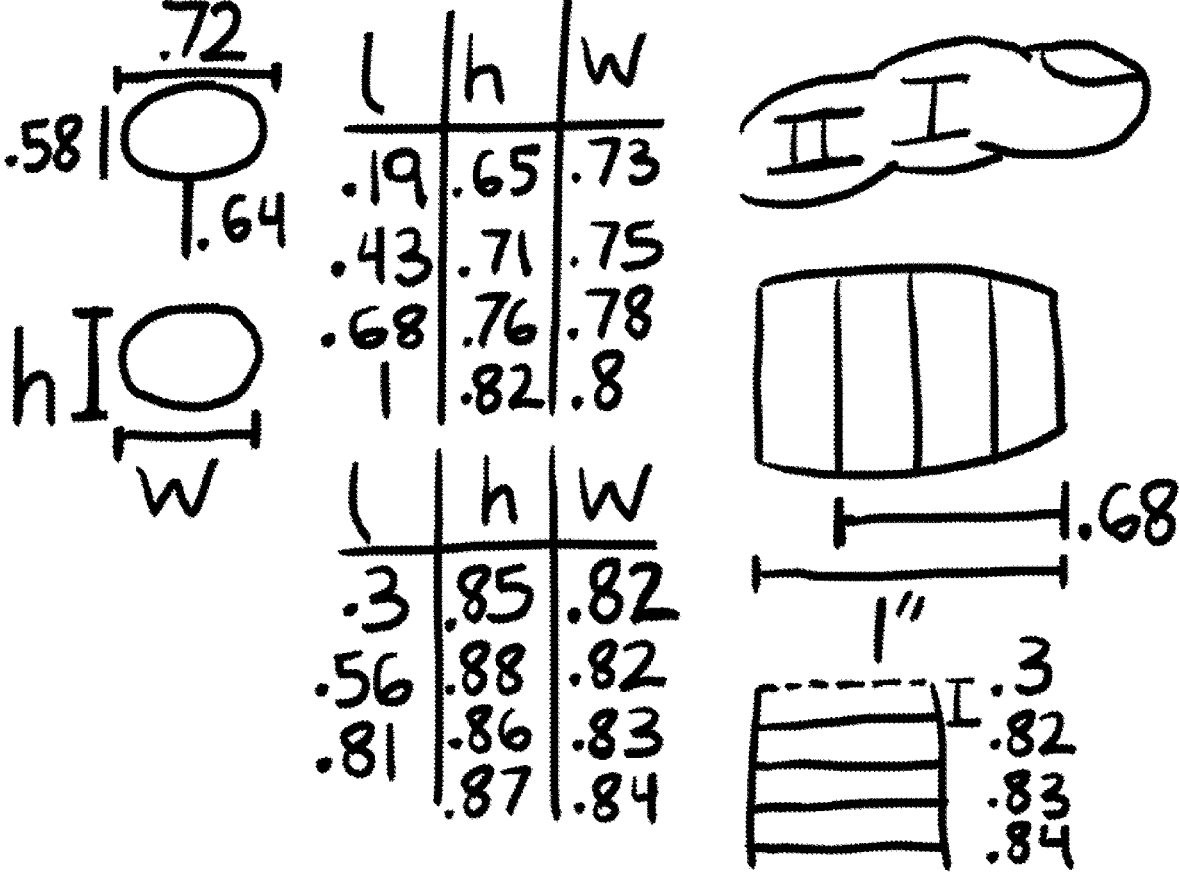

FIG. 50: Depicts Measurements of the Middle Finger at Marked and Measured Intervals.

Figure 51:
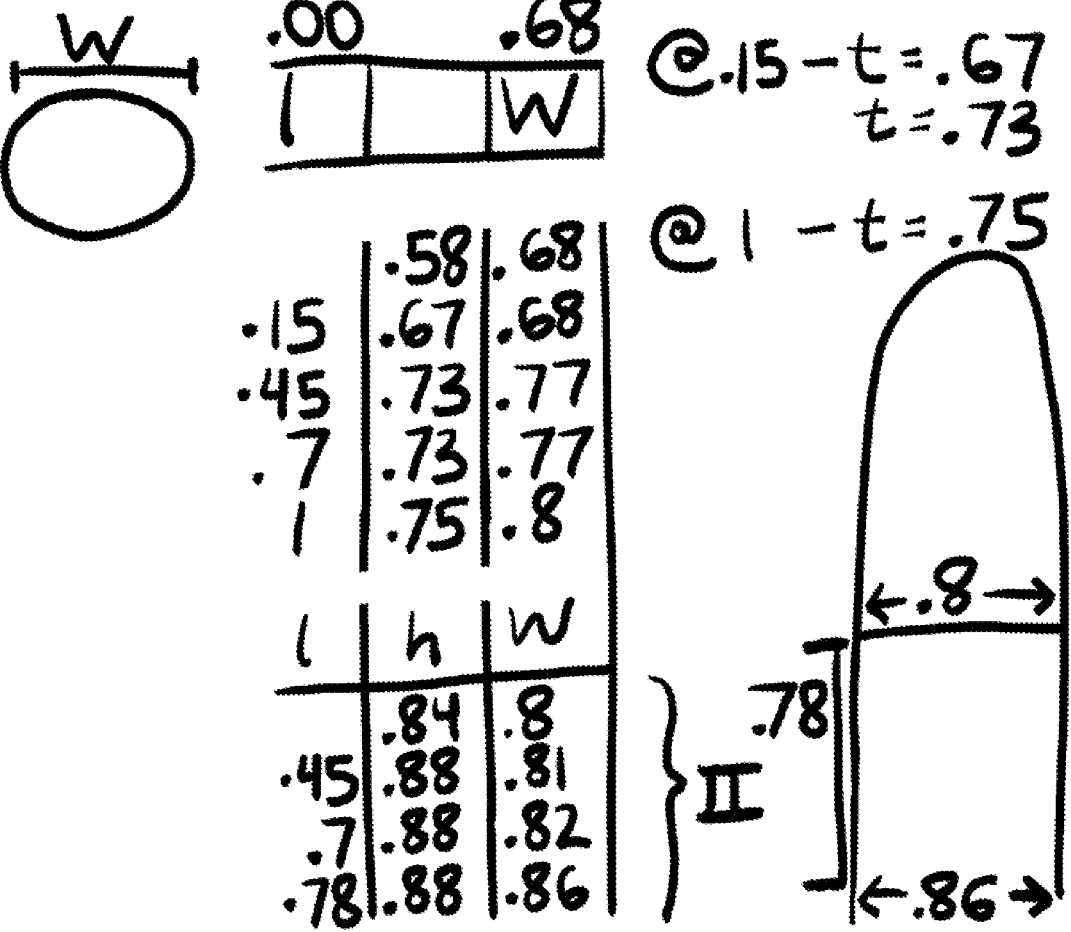

FIG. 51: Depicts Measurements of the Ring Finger at Marked and Measured Intervals.

Figure 52:
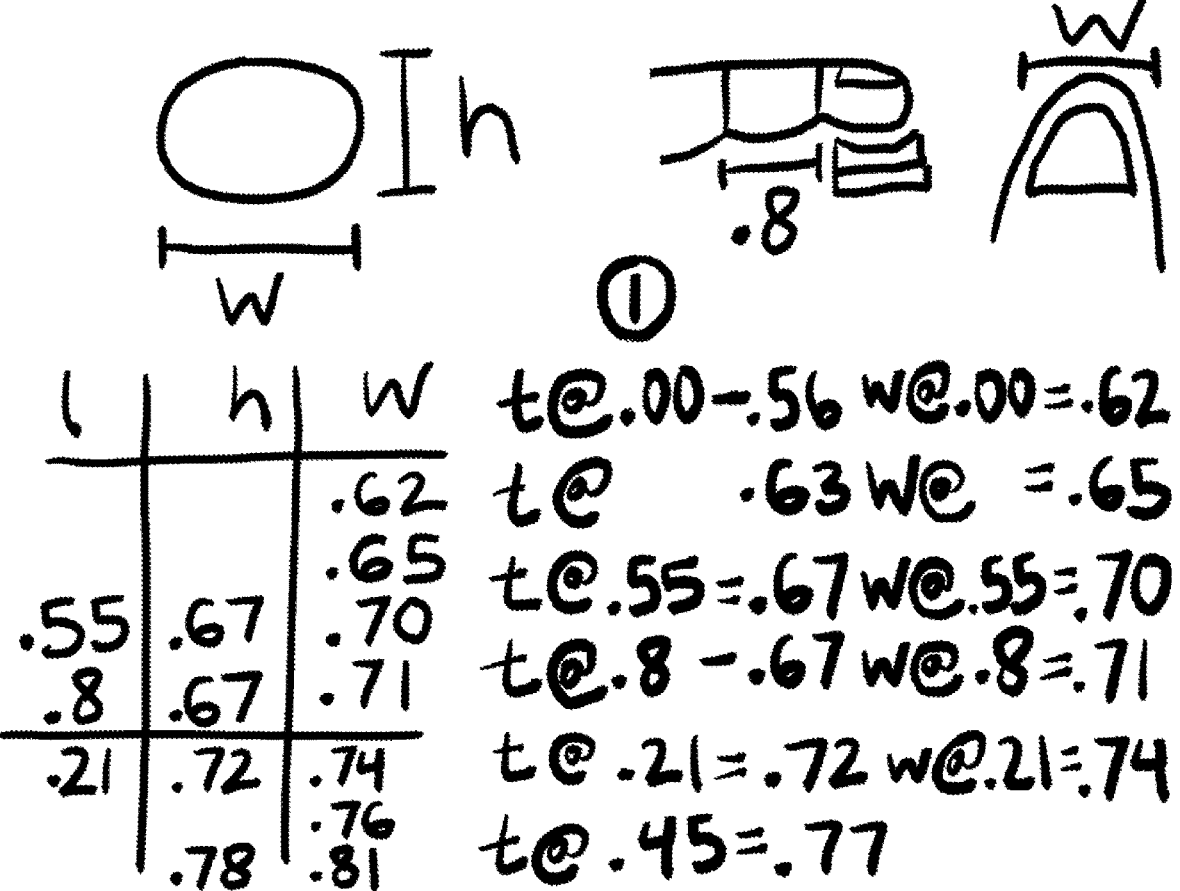

FIG. 52: Depicts Measurements of the Pinky Finger at Marked and Measured Intervals.

Figure 53:
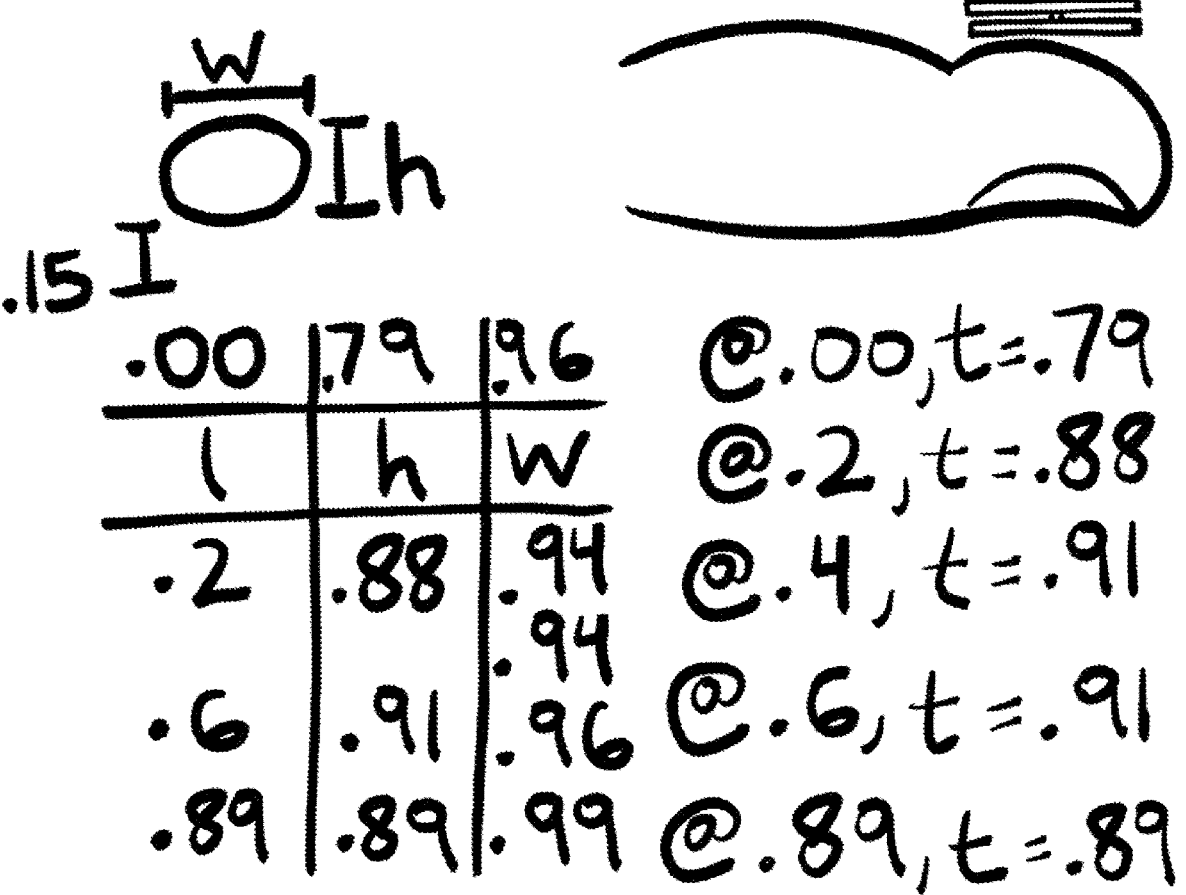

FIG. 53: Depicts Measurements of the Thumb at Marked and Measured Intervals.

FIG. 54: Example of Checkerboard Pattern Used for Hand Measurement/Sizing.

FIG. 55: depicts Alternate 2-D and 3-D Analog Switch Sensor Configurations.

FIG. 56: Depicts a Surface of Right Human Palm Geometry Sculpted with Modeling Clay. Note that while slightly similar, this geometry is ultimately different than the complex surface geometry 2 present in component 1 of the present invention.

FIG. 57: Incremental Marks in Order to Reference Finger Measurement Data.

FIG. 58: Prototype to Verify Fingertip Switch Cap Position and Orientation.

FIG. 59: Inadequate Verification of Optimized Hand Geometry Without Palm Geometry and Filler Material.

FIG. 60: Mold Construction, Human Palm.

FIG. 61: Verification of Comfortable Palm-Strap System.

Figure 62:
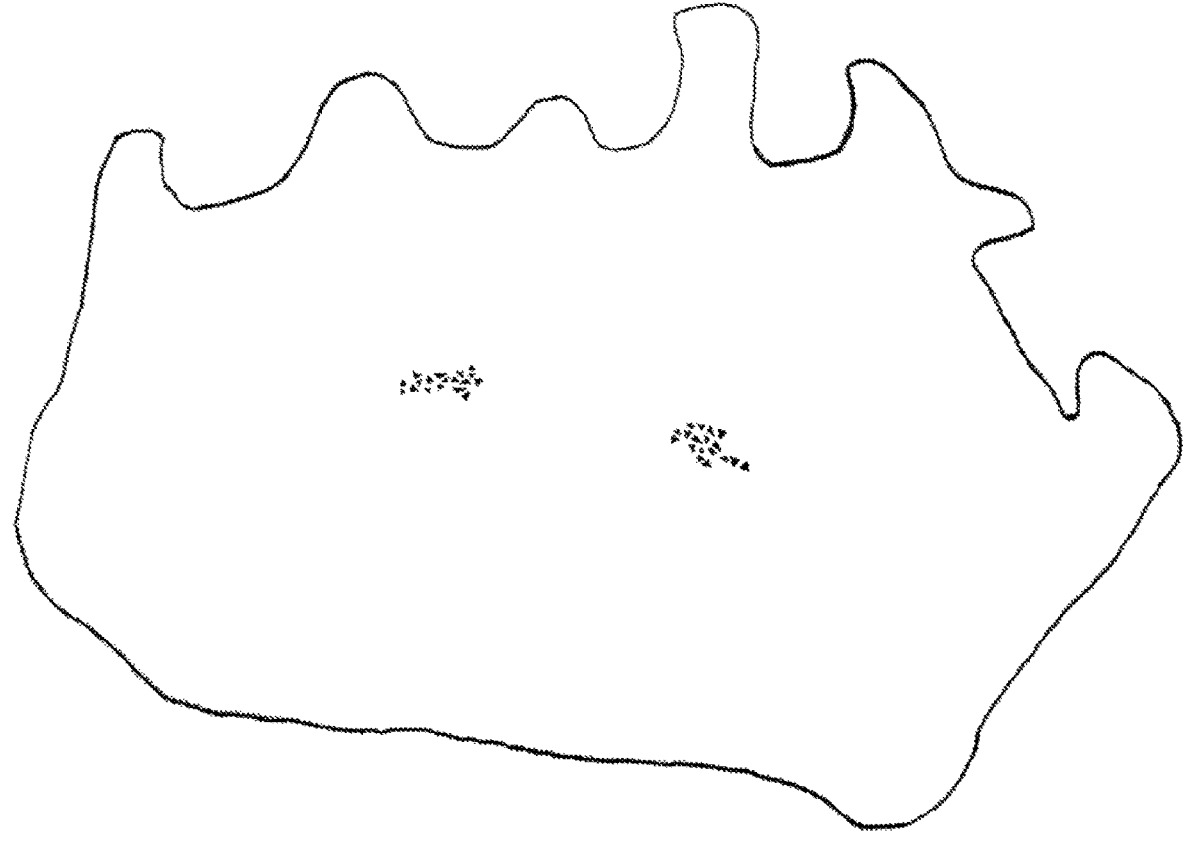

FIG. 62: 3-D Scan Data Representation of Palm Part.

FIG. 63: Depicts verification of optimal hand position and fingertip location+orientation during formation of Optimal Hand Interface Geometry Sculpture.

Figure 64:
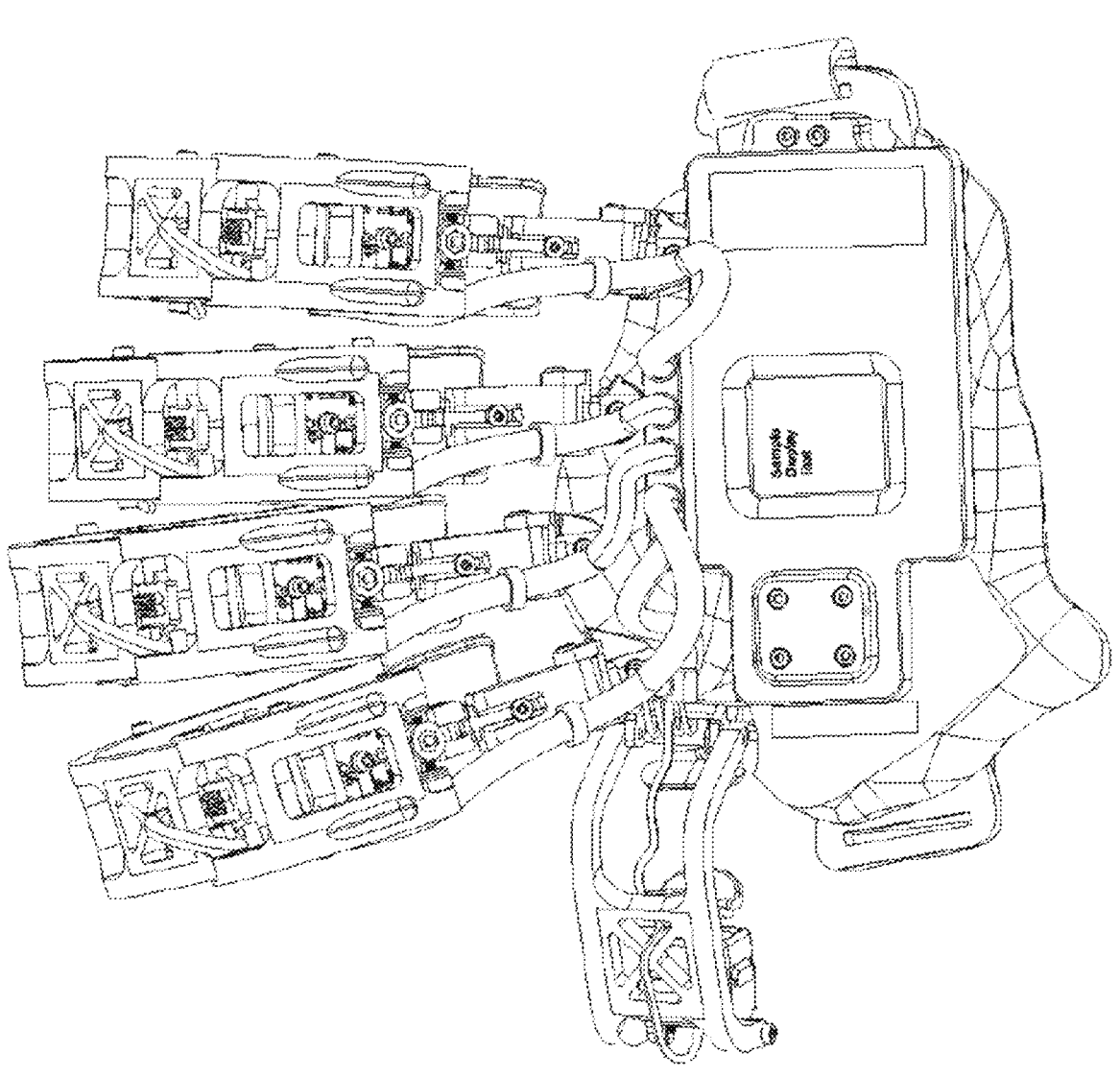

FIG. 64: Depicts bottom view of fully configured left-handed version.

FIG. 65: Optimized Hand Receiving Geometry Assembly with Integrated Strap Solves Background Problems 1)-4).

FIG. 66: Graduated Marks on Strap Used for Strap Size Approximation and Device Sizing.

FIG. 67: Example of Texture Which Can Optionally be Integrated into the User Contact Surfaces of component 1 and component 29

Figure 68:
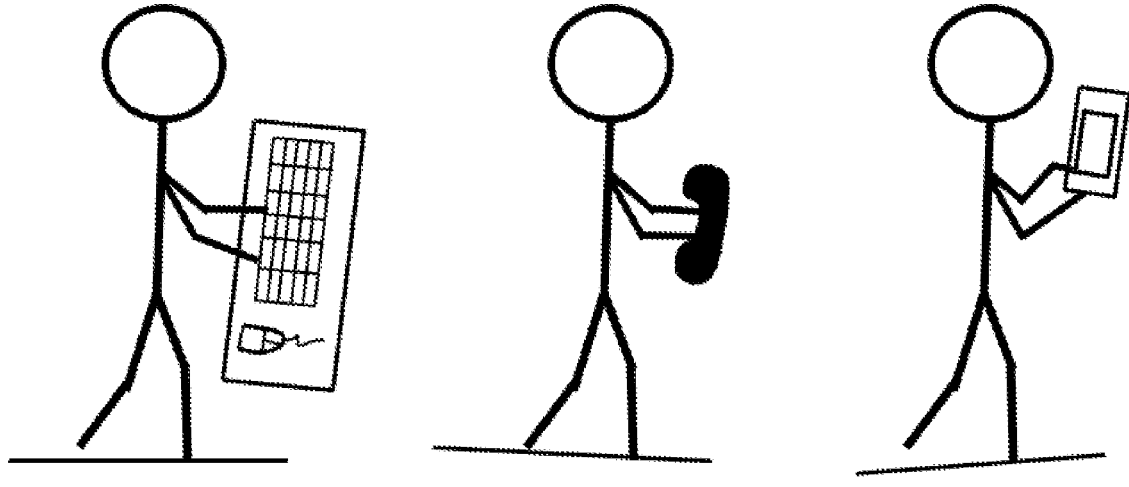

FIG. 68: Example of Dependence on Captive Posturing During Routine Data Interface with Existing Devices.

FIG. 69: Depicts an Example of Independence from Captive Posturing During Routine Data Interface while using The Present Invention.

FIG. 70: Depicts a flow chart displaying the process of development of the initial model of the present invention.

I claim:

1. A device, comprising:

a body containing a surface three-dimensionally contoured to a three-dimensional surface geometry of a palm of a hand of a user absent application of a grasping or straightening posture of said hand of said user;

at least four variable-state interface boundaries operated by at least four hand digits of said hand of said user, wherein:

a voluntary twitch of at least one said hand digit of said hand of said user relative to said at least one variable-state interface boundary changes at least one state of said at least one variable-state interface boundary;

each of at least four said variable-state interface boundaries is configured to an individual three-dimensional position and a three-dimensional angular orientation relative to a friction ridge skin surface on a distal section of a separate hand digit of said user, wherein:

each of at least four said variable-state interface boundaries is positioned to be approximately three-dimensionally centered and oriented to be approximately three-dimensionally angularly aligned with said individual friction ridge skin surfaces on said distal sections of separate said hand digits of said hand of said user absent application of a grasping, straightening, or adjustment force and/or posture of said hand of said user upon said device;

each said three-dimensional angular orientation of each of said at least four variable-state interface boundaries is configured to be approximately orthogonal relative to individual motion vectors of said voluntary twitch by said distal sections of separate said hand digits of said hand of said user absent application of a grasping, straightening, or adjustment force and/or posture of said hand of said user upon said device;

a wearing material containing a means of maintaining an approximately flush surface contact between said surface of said body of said device and said palm of said hand of said user absent a grasping, straightening, or adjustment force and/or posture of said hand of said user upon said device;

a grappling feature to enable donning and/or doffing of said device relative to a secondary object absent a grasping action of a separate hand of said user upon said device.

* * * * *